(12) United States Patent
Hartman et al.

(10) Patent No.: US 8,341,036 B2
(45) Date of Patent: Dec. 25, 2012

(54) COMBINING DISPARATE PURCHASES INTO A SINGLE PURCHASE ORDER FOR BILLING AND SHIPMENT

(75) Inventors: Peri Hartman, Seattle, WA (US);
Jeffrey P. Bezos, Seattle, WA (US);
Sheldon J. Kaphan, Seattle, WA (US);
Joel R. Spiegel, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 195 days.

(21) Appl. No.: 11/618,452

(22) Filed: Dec. 29, 2006

(65) Prior Publication Data

US 2007/0106570 A1    May 10, 2007

Related U.S. Application Data

(63) Continuation of application No. 09/318,447, filed on May 25, 1999, now abandoned, which is a continuation of application No. 08/928,951, filed on Sep. 12, 1997, now Pat. No. 5,960,411.

(51) Int. Cl.
G06Q 30/00    (2006.01)

(52) U.S. Cl. .................................. 705/26.81; 705/26.2

(58) Field of Classification Search .................. 705/26, 705/27, 26.1, 26.81, 26.2
See application file for complete search history.

(56) References Cited

U.S. PATENT DOCUMENTS

| | | |
|---|---|---|
| 4,305,059 A | 12/1981 | Benton |
| 4,371,979 A | 2/1983 | Vesterling |
| 4,525,779 A | 6/1985 | Davids et al. |
| 4,528,643 A | 7/1985 | Freeny, Jr. |
| 4,529,870 A | 7/1985 | Chaum |
| 4,555,781 A | 11/1985 | Baldry et al. |
| 4,578,530 A | 3/1986 | Zeidler |
| 4,734,858 A | 3/1988 | Schlafly |
| 4,739,310 A | 4/1988 | Yamamoto |
| 4,755,940 A | 7/1988 | Brachtl |
| 4,759,063 A | 7/1988 | Chaum |
| 4,759,064 A | 7/1988 | Chaum |
| 4,775,935 A | 10/1988 | Yourick |

(Continued)

FOREIGN PATENT DOCUMENTS

AU          730431         10/1997

(Continued)

OTHER PUBLICATIONS

Webtv java1, Parker, Tim "Key security unlocked", Canadian Computer Reseller, Aug. 6, 1997.*

(Continued)

Primary Examiner — Mark Fadok
(74) Attorney, Agent, or Firm — Fenwick & West LLP

(57) ABSTRACT

An order is placed by a purchaser at a client system and received by a server system. The server system receives purchaser information including identification of the purchaser, payment information, and shipment information from the client system. The server system then assigns a client identifier to the client system and associates the assigned client identifier with the received purchaser information. The server system sends to the client system the assigned client identifier. The client system receives and stores the assigned client identifier. In response to an order indication, the client system sends to the server system a request to purchase the identified item. The server system receives the request and combines at least one previous purchase associated with the client identifier of the client system to generate a single order for billing and shipment.

28 Claims, 11 Drawing Sheets

U.S. PATENT DOCUMENTS

| | | | |
|---|---|---|---|
| 4,795,890 A | 1/1989 | Goldman | |
| 4,799,156 A | 1/1989 | Shavit | |
| 4,812,628 A | 3/1989 | Boston et al. | |
| 4,827,508 A | 5/1989 | Shear | |
| 4,832,204 A | 5/1989 | Handy et al. | |
| 4,891,503 A | 1/1990 | Jewell | |
| 4,922,521 A | 5/1990 | Krikke et al. | |
| 4,926,480 A | 5/1990 | Chaum | |
| 4,935,870 A | 6/1990 | Burk, Jr. et al. | |
| 4,937,863 A | 6/1990 | Robert et al. | |
| 4,947,028 A | 8/1990 | Gorog | |
| 4,947,430 A | 8/1990 | Chaum | |
| 4,949,380 A | 8/1990 | Chaum | |
| 4,972,318 A | 11/1990 | Brown et al. | |
| 4,977,595 A | 12/1990 | Ohta et al. | |
| 4,982,346 A | 1/1991 | Girouard et al. | |
| 4,987,593 A | 1/1991 | Chaum | |
| 4,991,210 A | 2/1991 | Chaum | |
| 4,992,940 A | 2/1991 | Dworkin | |
| 4,996,711 A | 2/1991 | Chaum | |
| 5,025,373 A | 6/1991 | Keyser, Jr. et al. | |
| 5,057,915 A | 10/1991 | Von Kohorn | |
| 5,061,053 A | 10/1991 | Hirakawa | |
| 5,063,507 A | 11/1991 | Lindsey et al. | |
| 5,077,607 A | 12/1991 | Johnson et al. | |
| 5,105,184 A | 4/1992 | Pirani et al. | |
| 5,168,446 A | 12/1992 | Wiseman | |
| 5,204,897 A | 4/1993 | Wyman | |
| 5,208,748 A | 5/1993 | Flores et al. | |
| 5,220,501 A | 6/1993 | Lawlor et al. | |
| 5,227,874 A | 7/1993 | Von Kohorn | |
| 5,247,575 A | 9/1993 | Sprague et al. | |
| 5,260,999 A | 11/1993 | Wyman | |
| 5,276,736 A | 1/1994 | Chaum | |
| 5,283,734 A | 2/1994 | Von Kohorn | |
| 5,285,383 A | 2/1994 | Lindsey et al. | |
| 5,303,393 A | 4/1994 | Noreen et al. | |
| 5,305,195 A | 4/1994 | Murphy | |
| 5,311,584 A | 5/1994 | Bogart et al. | |
| 5,311,594 A | 5/1994 | Penzias | |
| 5,319,542 A | 6/1994 | King, Jr. et al. | |
| 5,321,751 A | 6/1994 | Ray et al. | |
| 5,329,589 A | 7/1994 | Fraser et al. | |
| 5,336,870 A | 8/1994 | Hughes et al. | |
| 5,339,392 A | 8/1994 | Risberg et al. | |
| 5,341,429 A | 8/1994 | Stringer et al. | |
| 5,347,632 A | 9/1994 | Filepp et al. | |
| 5,351,186 A | 9/1994 | Bullock et al. | |
| 5,351,293 A | 9/1994 | Michener et al. | |
| 5,383,113 A | 1/1995 | Kight et al. | |
| 5,414,833 A | 5/1995 | Hershey et al. | |
| 5,422,821 A | 6/1995 | Allen et al. | |
| 5,442,791 A | 8/1995 | Wrabetz et al. | |
| 5,444,192 A | 8/1995 | Shetye et al. | |
| 5,448,633 A | 9/1995 | Jamaleddin | |
| 5,451,998 A | 9/1995 | Hamrick | |
| 5,452,203 A | 9/1995 | Moore | |
| 5,457,797 A | 10/1995 | Butterworth et al. | |
| 5,467,269 A | 11/1995 | Flaten | |
| 5,469,206 A | 11/1995 | Strubbe et al. | |
| 5,485,369 A | 1/1996 | Nicholls et al. | |
| 5,513,117 A | 4/1996 | Small | |
| 5,515,268 A | 5/1996 | Yoda | |
| 5,521,631 A | 5/1996 | Budow et al. | |
| 5,535,229 A | 7/1996 | Hain, Jr. et al. | |
| 5,544,322 A | 8/1996 | Cheng et al. | |
| 5,550,734 A | 8/1996 | Tarter et al. | |
| 5,555,496 A | 9/1996 | Tackbary | |
| 5,557,516 A | 9/1996 | Hogan | |
| 5,557,518 A | 9/1996 | Rosen | |
| 5,557,798 A | 9/1996 | Skeen et al. | |
| 5,560,008 A | 9/1996 | Johnson et al. | |
| 5,577,209 A | 11/1996 | Boyle et al. | |
| 5,583,937 A | 12/1996 | Ullrich et al. | |
| 5,590,197 A | 12/1996 | Chen et al. | |
| 5,592,378 A | 1/1997 | Cameron et al. | |
| 5,594,910 A | 1/1997 | Filepp et al. | |
| 5,596,642 A | 1/1997 | Davis et al. | |
| 5,596,643 A | 1/1997 | Davis et al. | |
| 5,603,031 A | 2/1997 | White et al. | |
| 5,604,802 A | 2/1997 | Holloway | |
| 5,611,040 A | 3/1997 | Brewer et al. | |
| 5,613,012 A | 3/1997 | Hoffman et al. | |
| 5,621,456 A | 4/1997 | Florin et al. | |
| 5,621,797 A | 4/1997 | Rosen | |
| 5,623,547 A | 4/1997 | Jones et al. | |
| 5,627,940 A | 5/1997 | Rohra et al. | |
| 5,640,501 A | 6/1997 | Turpin | |
| 5,640,577 A | 6/1997 | Scharmer | |
| 5,642,418 A * | 6/1997 | Farris et al. | 380/211 |
| 5,642,419 A | 6/1997 | Rosen | |
| 5,646,992 A | 7/1997 | Subler | |
| 5,655,174 A | 8/1997 | Hirst | |
| 5,664,111 A | 9/1997 | Nahan et al. | |
| 5,666,493 A | 9/1997 | Wojcik et al. | |
| 5,675,507 A | 10/1997 | Bobo, II | |
| 5,677,955 A | 10/1997 | Doggett et al. | |
| 5,692,132 A | 11/1997 | Hogan | |
| 5,694,546 A | 12/1997 | Reisman | |
| 5,694,551 A | 12/1997 | Doyle et al. | |
| 5,704,044 A | 12/1997 | Tarter et al. | |
| 5,708,780 A | 1/1998 | Levergood et al. | |
| 5,710,887 A | 1/1998 | Chelliah | |
| 5,715,314 A | 2/1998 | Payne et al. | |
| 5,715,399 A * | 2/1998 | Bezos | 705/27 |
| 5,719,941 A | 2/1998 | Swift | |
| 5,724,424 A | 3/1998 | Gifford | |
| 5,724,472 A * | 3/1998 | Abecassis | 386/52 |
| 5,727,163 A * | 3/1998 | Bezos | 705/27 |
| 5,729,594 A * | 3/1998 | Klingman | 379/93.12 |
| 5,737,729 A | 4/1998 | Denman | |
| 5,740,252 A | 4/1998 | Minor et al. | |
| 5,745,681 A | 4/1998 | Levine et al. | |
| 5,754,939 A | 5/1998 | Herz et al. | |
| 5,758,126 A | 5/1998 | Daniels et al. | |
| 5,761,648 A | 6/1998 | Golden et al. | |
| 5,774,670 A | 6/1998 | Montulli | |
| 5,774,870 A | 6/1998 | Storey | |
| 5,774,873 A | 6/1998 | Berent et al. | |
| 5,784,565 A | 7/1998 | Lewine | |
| 5,790,793 A | 8/1998 | Higley | |
| 5,793,972 A | 8/1998 | Shane | |
| 5,794,006 A | 8/1998 | Sanderman | |
| 5,794,219 A | 8/1998 | Brown | |
| 5,809,144 A | 9/1998 | Sirbu et al. | |
| 5,809,483 A | 9/1998 | Broka et al. | |
| 5,812,668 A | 9/1998 | Weber | |
| 5,812,769 A | 9/1998 | Graber et al. | |
| 5,812,931 A * | 9/1998 | Yuen | 725/123 |
| 5,813,006 A | 9/1998 | Polnerow et al. | |
| 5,815,665 A | 9/1998 | Teper et al. | |
| 5,819,034 A * | 10/1998 | Joseph et al. | 709/201 |
| 5,826,241 A | 10/1998 | Stein et al. | |
| 5,826,242 A | 10/1998 | Montulli | |
| 5,831,860 A | 11/1998 | Foladare et al. | |
| 5,835,896 A | 11/1998 | Fisher et al. | |
| 5,845,260 A * | 12/1998 | Nakano et al. | 705/26 |
| 5,845,265 A | 12/1998 | Woolston | |
| 5,848,399 A | 12/1998 | Burke | |
| 5,850,446 A | 12/1998 | Berger et al. | |
| 5,857,175 A | 1/1999 | Day et al. | |
| 5,860,862 A * | 1/1999 | Junkin | 463/40 |
| 5,862,220 A * | 1/1999 | Perlman | 713/162 |
| 5,862,241 A | 1/1999 | Nelson | |
| 5,862,325 A | 1/1999 | Reed et al. | |
| RE36,116 E | 2/1999 | McCarthy | |
| 5,870,715 A | 2/1999 | Belitz et al. | |
| 5,870,716 A | 2/1999 | Sugiyama et al. | |
| 5,870,717 A | 2/1999 | Wiecha | |
| 5,878,141 A * | 3/1999 | Daly et al. | 705/78 |
| 5,887,062 A * | 3/1999 | Maeda et al. | 380/234 |
| 5,889,863 A | 3/1999 | Weber | |
| 5,890,137 A | 3/1999 | Koreeda | |
| 5,893,076 A * | 4/1999 | Hafner et al. | 705/28 |
| 5,893,080 A | 4/1999 | McGurl et al. | |
| 5,897,622 A | 4/1999 | Blinn et al. | |
| 5,898,919 A * | 4/1999 | Yuen | 455/420 |

| | | | |
|---|---|---|---|
| 5,899,980 A | 5/1999 | Wilf et al. | |
| 5,901,214 A | 5/1999 | Shaffer et al. | |
| 5,903,878 A | 5/1999 | Talati et al. | |
| 5,905,942 A | 5/1999 | Stoel et al. | |
| 5,905,975 A | 5/1999 | Ausubel | |
| 5,909,023 A | 6/1999 | Ono et al. | |
| 5,909,203 A | 6/1999 | Browning et al. | |
| 5,909,492 A | 6/1999 | Payne et al. | |
| 5,920,642 A * | 7/1999 | Merjanian | 382/126 |
| 5,920,696 A | 7/1999 | Brandt et al. | |
| 5,926,168 A | 7/1999 | Fan | |
| 5,943,424 A | 8/1999 | Berger et al. | |
| 5,946,665 A | 8/1999 | Suzuki et al. | |
| 5,948,040 A | 9/1999 | DeLorme et al. | |
| 5,949,044 A * | 9/1999 | Walker et al. | 235/379 |
| 5,960,069 A * | 9/1999 | Felger | 379/114.01 |
| 5,960,411 A | 9/1999 | Hartman et al. | |
| 5,960,412 A | 9/1999 | Tackbary et al. | |
| 5,963,915 A | 10/1999 | Kirsch | |
| 5,963,924 A | 10/1999 | Williams et al. | |
| 5,966,705 A | 10/1999 | Koneru et al. | |
| 5,970,472 A | 10/1999 | Allsop et al. | |
| 5,970,474 A | 10/1999 | LeRoy et al. | |
| 5,971,273 A | 10/1999 | Vallaire | |
| 5,973,692 A | 10/1999 | Knowlton et al. | |
| 5,974,418 A | 10/1999 | Blinn et al. | |
| 5,983,198 A | 11/1999 | Mowery | |
| 5,983,199 A | 11/1999 | Kaneko | |
| 5,983,200 A | 11/1999 | Slotznick | |
| 5,983,208 A | 11/1999 | Haller et al. | |
| 5,987,132 A | 11/1999 | Rowney | |
| 5,991,739 A | 11/1999 | Cupps et al. | |
| 5,995,626 A | 11/1999 | Nishioka et al. | |
| 5,995,943 A * | 11/1999 | Bull et al. | 705/14 |
| 5,999,914 A | 12/1999 | Blinn et al. | |
| 6,009,413 A | 12/1999 | Webber et al. | |
| 6,014,634 A | 1/2000 | Scroggie et al. | |
| 6,018,724 A * | 1/2000 | Arent | 705/44 |
| 6,021,398 A | 2/2000 | Ausubel | |
| 6,021,399 A * | 2/2000 | Demers et al. | 705/39 |
| 6,026,376 A | 2/2000 | Kenney | |
| 6,035,283 A | 3/2000 | Rofrano | |
| 6,044,205 A | 3/2000 | Reed et al. | |
| 6,049,785 A | 4/2000 | Gifford | |
| 6,058,373 A | 5/2000 | Blinn et al. | |
| 6,078,906 A | 6/2000 | Huberman | |
| 6,085,168 A | 7/2000 | Mori et al. | |
| 6,085,170 A | 7/2000 | Tsukuda | |
| 6,088,717 A | 7/2000 | Reed et al. | |
| 6,101,482 A | 8/2000 | DiAngelo et al. | |
| 6,101,483 A | 8/2000 | Petrovich et al. | |
| 6,108,673 A | 8/2000 | Brandt et al. | |
| 6,122,625 A | 9/2000 | Rosen | |
| 6,125,172 A * | 9/2000 | August et al. | 379/110.01 |
| 6,125,352 A | 9/2000 | Franklin et al. | |
| 6,138,106 A | 10/2000 | Walker et al. | |
| 6,141,666 A | 10/2000 | Tobin | |
| 6,144,945 A | 11/2000 | Garg et al. | |
| 6,149,055 A | 11/2000 | Gatto | |
| 6,151,582 A * | 11/2000 | Huang et al. | 705/8 |
| 6,154,738 A | 11/2000 | Call | |
| 6,167,378 A * | 12/2000 | Webber, Jr. | 705/8 |
| 6,167,380 A * | 12/2000 | Kennedy et al. | 705/10 |
| 6,182,072 B1 * | 1/2001 | Leak et al. | 707/10 |
| 6,192,407 B1 | 2/2001 | Smith et al. | |
| 6,193,155 B1 | 2/2001 | Walker et al. | |
| 6,195,649 B1 | 2/2001 | Gifford | |
| 6,202,052 B1 | 3/2001 | Miller | |
| 6,205,437 B1 | 3/2001 | Gifford | |
| 6,230,202 B1 | 5/2001 | Lewine | |
| 6,266,650 B1 | 7/2001 | Sugaya et al. | |
| 6,269,361 B1 | 7/2001 | Davis et al. | |
| 6,301,661 B1 | 10/2001 | Shambroom | |
| 6,336,100 B1 | 1/2002 | Yamada | |
| 6,345,288 B1 | 2/2002 | Reed et al. | |
| 6,373,950 B1 * | 4/2002 | Rowney | 380/255 |
| 6,379,251 B1 | 4/2002 | Auxier et al. | |
| 6,385,655 B1 | 5/2002 | Smith | |
| 6,397,387 B1 * | 5/2002 | Rosin et al. | 725/44 |
| 6,449,599 B1 | 9/2002 | Payne | |
| 6,484,150 B1 | 11/2002 | Blinn et al. | |
| 6,484,153 B1 | 11/2002 | Walker et al. | |
| 6,490,567 B1 | 12/2002 | Gregory | |
| 6,493,742 B1 | 12/2002 | Holland et al. | |
| 6,539,548 B1 * | 3/2003 | Hendricks et al. | 725/109 |
| 6,577,734 B1 * | 6/2003 | Etzel et al. | 380/277 |
| 6,594,692 B1 | 7/2003 | Reisman | |
| 6,615,226 B1 | 9/2003 | Hartman et al. | |
| 6,732,369 B1 * | 5/2004 | Schein et al. | 725/39 |
| 6,757,710 B2 | 6/2004 | Reed | |
| 6,769,009 B1 | 7/2004 | Reisman | |
| 7,006,989 B2 | 2/2006 | Bezos et al. | |
| 7,016,863 B1 * | 3/2006 | Kamakura et al. | 705/14.32 |
| 7,265,853 B1 | 9/2007 | Kara et al. | |
| 2001/0014884 A1 * | 8/2001 | Dillard et al. | 705/57 |
| 2002/0019776 A1 | 2/2002 | Simpson | |
| 2002/0178089 A1 | 11/2002 | Bezos et al. | |
| 2002/0194087 A1 | 12/2002 | Spiegel et al. | |
| 2005/0114218 A1 | 5/2005 | Zucker et al. | |
| 2007/0106570 A1 * | 5/2007 | Hartman et al. | 705/26 |

FOREIGN PATENT DOCUMENTS

| | | |
|---|---|---|
| AU | 199889488 A1 | 1/1999 |
| CA | 2186113 | 9/1995 |
| CA | 2222229 | 7/1998 |
| EP | 0680185 A2 | 11/1995 |
| EP | 0720090 A2 | 7/1996 |
| EP | 0828223 A2 | 3/1998 |
| EP | 0845747 A2 | 6/1998 |
| EP | 0855659 A1 | 7/1998 |
| EP | 0855687 A2 | 7/1998 |
| EP | 0883076 A2 | 12/1998 |
| EP | 0902381 A2 | 3/1999 |
| GB | 2315579 A | 2/1998 |
| JP | 61-195457 | 8/1986 |
| JP | 02-207645 | 8/1990 |
| JP | 04-153795 | 5/1992 |
| JP | 05-101078 | 4/1993 |
| JP | 06-068106 | 3/1994 |
| JP | 06-141100 | 5/1994 |
| JP | 3018299 | 9/1995 |
| JP | 08-506941 | 7/1996 |
| JP | 08 263729 A | 10/1996 |
| JP | 09-006849 | 1/1997 |
| JP | 09-114783 | 5/1997 |
| JP | 09-138725 | 5/1997 |
| JP | 09-154108 | 6/1997 |
| JP | 09-179912 | 7/1997 |
| JP | 09-220882 | 8/1997 |
| JP | 09-259018 | 10/1997 |
| WO | WO 95/16971 | 6/1995 |
| WO | WO 95/30961 | 11/1995 |
| WO | WO 96/13013 | 5/1996 |
| WO | WO 96/17466 | 6/1996 |
| WO | WO 96/31826 | 10/1996 |
| WO | WO 96/34491 | 10/1996 |
| WO | WO 96/36928 | 11/1996 |
| WO | WO 96/38799 | 12/1996 |
| WO | WO 96/42041 | 12/1996 |
| WO | WO 98/17042 | 4/1998 |
| WO | WO 98/21679 | 5/1998 |

OTHER PUBLICATIONS

Webtv java2, Phillips Business information Corp., "Thomson looks beyond web functionality to sell RCA NC: looks to netchannel for content partnerships", Multimedia week, Jul. 21, 1997.*

Webtv Java3, Clancy, Heather, "Webtv eyes business applications", Computer Reseller News, Jul. 7, 1997.*

Webtv java 4, Blackwell Gerry, "Is webtv an idea whose time has come?", Toronto Star, Jun. 26, 1997.*

Webtv java5, Foley, Mary Jo, "Webtv deal realigns Microsoft plans", Computer Reseller News, Apr. 21, 1997.*

Webtv java6, Maney Kevin, "The high-tech world according to Gore", USA Today, Feb. 6, 1997.*

Webtv Java7, Yoshida, Junko, "Consumer electronics players explore jaava subsets, HTML extentions to tune web to tv", Electronic Engineering Times, Dec. 23, 1996.*

Webtv java8, Chen, Elaine, "Sony, Philips license webtv", Electronic News, Jul. 15, 1996.*
Javacart1, "Java electronic commerce framework", Computer Reseller News, Sep. 23, 1996.*
Javacart2, Jones, Chris, "Oracle plans to join e-commerce initiative", Infor world, Mar. 31, 1997.*
Web TV, web page http://web.archive.org/web/19970213214025/ http://www.webtv.com, dated Feb. 13, 1997.*
DilGer, Karen, "The best way to get it there", Manufacturing systems, Apr. 1997.*
Traffic Masnagement, "Flexable Shipping spells economy", Aug. 1975.*
HITechPR, wb page, http://www.hitechpr.com/archives/prachives/120396_wesely.htm, dated Dec. 3, 1996.*
Andel, Tom,"Load plans make room for profit", Transportation & Distribution, Mar. 1996.*
Anonymous, "Advavce notice required", Logistics Management, Aug. 1997.*
Ramstad, Evan, "Little guys lower cost of browsing", Las Vegas Review, Jul. 10, 1996.*
Markoff, John, "Internet, cable tv battle in sight;, new system seeks to outbox Microsoft", New York Times, Sep. 11, 1997.*
Chris, Jones, "SGI will soon deliver virtual-store tools", Infoworld, San Mateo, Dec. 30, 1996.*
Identity Theft1, Davis, Kristen, "Guarding your financial privacy", Kiplinger's personal finance magazine, Aug. 1995.*
Identity Theft2, Ryrie, Tasker, "Bewre: Hacker attack!", Feb. 1997.*
Identity Theft3, Reece, Damian, "City: Fraud scare over Barclaycard Gold", The Sunday Telegraph, May 21, 1995.*
Klincewicz et al, "Planning and consolidating shipments from a warehouse", The Journal of the operational research society, dated Mar. 1997.*
Fulton, Roger, Article from IDS, Cite No. C251, restated here for ease of recovery from the file see particular thread from Roger Fulton subject RE: Q/prices dated Jan. 6, 1994 and p. 12 http://groups.google.com/group/rec.music.celtic/browse_thread/thread/12028002f2d1bae6?hl=en&q=%22combine+orders%22.*
Levy, Steven, The end of money?, Newsweek Oct. 10, 1995, Article from IDS, 2009, Cite No. C485 restated for ease of recovery.*
Mitchell, Jim, "Credit reports sent to wrong people over internet flood of requests to Experian's new cite prompts overload", Dallas Morning News , Aug. 16, 1997.*
U.S. Appl. No. 09/318,447, filed May 25, 1999, Bezos et al.
"Amazon.com Rolls Out New Features," Amazon.com, Inc., Internet News.com, Sep. 24, 1997, 1 page, [online] [retrieved on Jan. 18, 1999] Retrieved from the Internet: <URL: http://internal/dept/marketing/AmazonLibrary1/sept24internet.htm>.
"Amazon.com Catapults Electronic Commerce to Next Level with Powerful New Features," Amazon.com, Inc., Press Release: 3.0, Sep. 23, 1997, 2 pages, [online] [retrieved on Jan. 19, 1999] Retrieved from the Internet: <URL: http://internalfeatures/dept/marketing/AmazonLibrary1,sept23amazon.htm>.
"Auction Express Auction Sites—Auction Software That Puts You in the Drivers Seat, Auction Express Websites," Global Exchange Technologies Inc., 2001, 2 pages, [online] [retrieved on Jul. 23, 2001] Retrieved from the Internet: <URL: http://www.auction-express.net/>.
"Auction Express Auction Sites—Auction Software That Puts YOU in the Drivers Seat, Getting Started," Global Exchange Technologies Inc., 2001, 2 pages, [online] [retrieved on Jul. 23, 2001] Retrieved from the Internet: <URL: http://www.auction-express.net/html/getting_started.html>.
"Auction Express Auction Sites—Auction Software That Puts YOU in the Drivers Seat, Pricing," Global Exchange Technologies Inc., 2001, 3 pages, [online] [retrieved on Jul. 23, 2001] Retrieved from the Internet: <URL: http://www.auction-express.net/html/pricing.html>.
"Auction Features—Strictly Exchange Online Auction Software, Programming & Design Services," Strictly Exchange, 1998-2001, 2 pages, [online] [retrieved on Jul. 23, 2001] Retrieved from the Internet: <URL: http://www.strictlyexchange.com/custom/>.
"Auction Features—Strictly Exchange Online Auction Software, Software Package Pricing," Strictly Exchange, 1998-2001, 2 pages, [online] [retrieved on Jul. 23, 2001] Retrieved from the Internet: <URL:http://www.strictlyexchange.com/software/software.htm>.
"Auction Express Auction Sites—Auction Software That Puts YOU in the Drivers Seat, Software Features," Global Exchange Technologies Inc., 2001, 5 pages, [online] [retrieved on Jul. 23, 2001] Retrieved from the Internet: <URL: http://www.auction-express.net/html/software_options.html>.
"Demo Site, All Categories," Auction Express, 2001, 2 pages [online] [retrieved on Jul. 23, 2001] Retrieved from the Internet: <URL: http://www.usa4auction.com/demo/html/categories.htm>.
"Demo Site, New Member Registration," Auction Express, 2001, 2 pages [online] [retrieved on Jul. 23, 2001] Retrieved from the Internet: <URL:http://www.usa4auction.com/demo/html/create_account.htm>.
"Demo Site, Demo Site Site Manager," Auction Express, 2001, 2 pages [online] [retrieved on Jul. 23, 2001] Retrieved from the Internet: <URL:http://www.auctionexpre.../admin_manager.cgi?user=USA4&password=demo&menu=setup>.
Digicash Ecash—Starting a Shop—Do It Yourself (Running Your Own Shop-Server) [Added to the Wayback Machine on Nov. 2, 1996] [online], [retrieved on Aug. 10, 2008] Retrieved from the Internet <URL: http://web.archive.org/web/19961102104658/http://www.digicash.com/ecash/shop_self.html>.
"Features of the Next Generation Coke Machine," Walter's Coke Project Homepage, Date unknown, 1 page, [online] [retrieved on Jul. 23, 2001] Retrieved from the Internet: <URL: http://www.ugcs.caltech.edu/~walterfb/coke/features.html>.
"Elements of the Networked Coke Machine, Coke Machine Components," Walters Coke Project Homepage, Date unknown, 3 pages, [online] [retrieved on Jul. 23, 2001] Retrieved from the Internet: <URL: http://www.ugcs.caltech.edu/~walterfb/coke/parts.html>.
"JavaScript Tip of the Week for Nov. 25, 1996: Everything You Ever Wanted to Know About Cookies," Jupitermedia Corporation, Nov. 25, 1996, 12 pages.
"Netscape LivePayment White Paper," Netscape Communications Corporation, 1996, 14 pages [online] [retrieved on May 6, 2004] Retrieved from the Internet: <URL: http://www.archive.org/web/19961026221246/www3.netscape.com/comprod/products/iapps/platform/live...>.
"The Motley Fool," Amazon.com, Inc., Sep. 23, 1997, 1 page, [online] [retrieved on Jan. 12, 1999] Retrieved from the Internet: <URL:http://internal.amazon.com/dept/marketing/AmazonLibrary1/sep23motley.htm>.
"The Bidder Network Auction—Auction Sites and Auction Listings," The Bidder Network, 1998-2000, 3 pages, [online] [retrieved on Jul. 23, 2001] Retrieved from the Internet: <URL: http://www.bidder-network.com/>.
Buyer, L. J., et al., "Amazon.com, It's All About Efficiency," Internet/New Media, Deutsche Morgan Grenfell Technology Group, Oct. 10, 1997, p. 9.
Meeker, M., et al., "Amazon.com (AMZN—www.amazon.com): A Basic Report for an Un-Based Company," U.S. and the Americas Investment Research, Morgan Stanley Dean Witter, Dec. 30, 1997, pp. 15-16.
[online], [retrieved on Nov. 2, 2004] a record showing that the book: :"The Computer Privacy Handbook/Andre Bacard" was published on Mar. 2, 1995 Retrieved from the database of the US Copyright Office of the Library of Congress using the Internet: <URL: http://www.copyright.gov>.
[online], [retrieved on Nov. 2, 2004] A record showing that the book: :"Creating the virtual store: taking your website from browsing to buying/Magdalena Yesil" was published on Nov. 8, 1996 Retrieved from the database of the US Copyright Office of the Library of Congress using the Internet: <URL: http://www.copyright.gov>.
[online], [retrieved on Nov. 2, 2004] a record showing that the book: "Digital Money: The New Era of Internet Commerce / Daniel C. Lynch, Leslie Lundquist" was published on Dec. 29, 1995 Retrieved from the database of the US Copyright Office of the Library of Congress using the Internet <URL: http://www.copyright.gov>.
[online], [retrieved on Nov. 2, 2004] a record showing that the book: "Digital cash: Commerce on the Net / Peter Wayner," was published on Mar. 21, 1997 Retrieved from the database of the US Copyright Office of the Library of Congress using the Internet: <URL: http://www.copyright.gov>.

"09_539036_DynamicProductComparison.doc," Oct. 22, 2003, 16 pages.

"A Text-Based View of the HyperCard FAQ ver. 1.2.2," HyperCard FAQ—Table of Contents, Nov. 18, 1997, 10 pages, [online] [retrieved on Mar. 16, 2007] Retrieved from the Internet: <URL: http://www-psych.stanford.edu/~pinto/hc1.html>.

"AIXlink/X.25 Version 2.1 for AIX: Guide and Reference," IBM Corp., Sep. 2005, Eight Edition, pp. iii-348.

"Amazon.com Receives Patent for 1-Click," PR Newswire Association LLC, Oct. 12, 1999, 2 pages, [online] [retrieved on Mar. 16, 2007] Retrieved from the Internet: <URL: http://www.prnewswire.com/cgi-bin/stories.pl?ACCT=105&STORY=/www/story/10-12-1999/0001042392>.

"AOL," Wikipedia, Mar. 16, 2007, 15 pages, [online] [retrieved on Mar. 16, 2007] Retrieved from the Internet: <URL: http://en.wikipedia.org/wiki/America_Online>.

"AppleLink,"Wikipedia, Feb. 17, 2007, 3 pages, [online] [retrieved on Mar. 16, 2007] Retrieved from the Internet: <URL: http://en.wikipedia.org/wiki/AppleLink>.

"Bitnet," Wikipedia, Feb. 23, 2007, 2 pages, [online] [retrieved on Mar. 16, 2007] Retrieved from the Internet: <URL: http://en.wikipedia.org/wiki/Bitnet>.

"Borland Delphi," Wikipedia, Mar. 5, 2007, 6 pages, [online] [retrieved on Mar. 16, 2007] Retrieved from the Internet: <URL: http://en.wikipedia.org/wiki/Borland_Delphi>.

"Bulletin Board System," Wikipedia, Mar. 8, 2007, 6 pages, [online] [retrieved on Mar. 16, 2007] Retrieved from the Internet: <URL: http://en.wikipedia.org/wiki/Bulletin_board_system>.

"Citadel (software)," Wikipedia, Mar. 15, 2007, 7 pages, [online] [retrieved on Mar. 16, 2007] Retrieved from the Internet: <URL: http://en.wikipedia.org/wiki/Citadel_%28software%29>.

"CompuServe," Wikipedia, Mar. 6, 2007, 8 pages, [online] [retrieved on Mar. 16, 2007] Retrieved from the Internet: <URL: http://en.wikipedia.org/wiki/CompuServe>.

"Computer Reservations System," Wikipedia, Mar. 15, 2007, 7 pages, [online] [retrieved on Mar. 16, 2007] Retrieved from the Internet: <URL: http://en.wikipedia.org/wiki/Computer_reservations_system>.

"Computer Software, Information About Qmodem," Computer Hope.com, 1998-2007, 2 pages, [online] [retrieved on Mar. 16, 2007] Retrieved from the Internet: <URL: http://www.computerhope.com/software/qmodem.htm>.

"Control Functions for Coded Character Sets," ECMA, Standard ECMA-48, Fifth Edition, Jun. 1991, 108 pages, [online] [retrieved on Mar. 23, 2007] Retrieved from the Internet: <URL: http://www.ecma-international.org/publications/files/ECMA-ST/Ecma-048.pdf>.

"Data Storage Device," Wikipedia, Mar. 13, 2007, 6 pages, [online] [retrieved on Mar. 16, 2007] Retrieved from the Internet: <URL: http://en.wikipedia.org/wiki/Data_storage_medium>.

"DECnet,"Wikipedia, Mar. 7, 2007, 3 pages, [online] [retrieved on Mar. 16, 2007] Retrieved from the Internet: <URL: http://en.wikipedia.org/wiki/Decnet>.

"Digital Equipment Corporation," Wikipedia, Mar. 14, 2007, 11 pages, [online] [retrieved on Mar. 16, 2007] Retrieved from the Internet: <URL: http://en.wikipedia.org/wiki/Digital_Equipment>.

"Electronic In-Home Shopping: 'Our Stores are Always Open'," Chain Store Age Executive, Mar. 1985, 2 pages.

"FidoNet,"Wikipedia, Jan. 25, 2007, 7 pages, [online] [retrieved on Mar. 16, 2007] Retrieved from the Internet: <URL: http://en.wikipedia.org/wiki/Fidonet>.

"For Immediate Release: Introducing LiveCard," Royal Software, Inc., 1996, 2 pages, [online] [retrieved on Mar. 16, 2007] Retrieved from the Internet: <URL: http://web.archive.org/web/19990202232602/www.royalsoftware.com/descriptions/LiveCardpr1.html>.

"History, What This Page is About," TEXTFILESDOTCOM, 4 pages, [online] [retrieved on Mar. 16, 2007] Retrieved from the Internet: <URL: http://www.textfiles.com/history/>.

"HyperCard," Answers.com, 2007, 8 pages, [online] [retrieved on Mar. 21, 2007] Retrieved from the Internet: <URL: http://www.answers.com/topic/hypercard>.

"Intellectual Property Analysis of Amazon's U.S. Patent No. 5, 960,411,Amazon.com, Inc. v. Barnesandnoble.com, Inc.," Patently Obvious, Litigation Report, Mar. 2, 2001, pp. 1-6.

"Interactive System Productivity Facility (ISPF), User's Guide," IBM Corp., Version 4, Release 2 for MVS, 1980, 1995, 1196 pages, [online] [retrieved on Mar. 7, 2007] Retrieved from the Internet: <URL: http://publib.boulder.ibm.com/cgi-bin/bookmgr/BOOKS/ISPUGD02/CCONTENTS>.

"Internet Protocol, DARPA Internet Program Protocol Specification," Information Sciences Instutite, RFC: 791, Sep. 1981, 49 pages, [online] [retrieved on Mar. 16, 2007] Retrieved from the Internet: <URL: http://www.ietf.org/rfc/rfc0791.txt>.

"Internet Protocol Suite," Wikipedia, Mar. 14, 2007, 5 pages, [online] [retrieved on Mar. 16, 2007] Retrieved from the Internet: <URL: http://en.wikipedia.org/wiki/TCP/IP>.

"List of BBS Software," Wikipedia, Mar. 13, 2007, 7 pages, [online] [retrieved on Mar. 16, 2007] Retrieved from the Internet: <URL: http://en.wikipedia.org/wiki/List_of_BBS_software>.

"Minitel," Wikipedia, Mar. 13, 2007, 5 pages, [online] [retrieved on Mar. 16, 2007] Retrieved from the Internet: <URL: http://en.wikipedia.org/wiki/Minitel>.

"Norm!," Cheers: Norm's Quotation Page, Nov. 10, 1982, 7 pages, [online] [retrieved on Mar. 7, 2007] Retrieved from the Internet: <URL: http://web.archive.org/web/20010702004226/ourworld.compuserve.com/homepages/wildkingdom/normb.htm >.

"Object Pascal," Wikipedia, Mar. 14, 2007, 5 pages, [online] [retrieved on Mar. 16, 2007] Retrieved from the Internet: <URL: http://en.wikipedia.org/wiki/Delphi_programming_language>.

"OSI Model," Wikipedia, Mar. 15, 2007, 6 pages, [online] [retrieved on Mar. 16, 2007] Retrieved from the Internet: <URL: http://en.wikipedia.org/wiki/OSI_model>.

"OSI Protocols," Wikipedia, Feb. 21, 2007, 3 pages, [online] [retrieved on Mar. 16, 2007] Retrieved from the Internet: <URL: http://en.wikipedia.org/wiki/OSI_protocols>.

"Part III: Bulletin Board Systems," CTT, 6 pages, [online] [retrieved on Mar. 16, 2007] Retrieved from the Internet: <URL: http://freegroups.net/camsoc/ctt/part-3.html>.

"PowerBuilder," Wikipedia, Mar. 14, 2007, 4 pages, [online] [retrieved on Mar. 16, 2007] Retrieved from the Internet: <URL: http://en.wikipedia.org/wiki/Powerbuilder>.

"Prodigy (ISP),"Wikipedia, Feb. 17, 2007, 8 pages, [online] [retrieved on Mar. 16, 2007] Retrieved from the Internet: <URL: http://en.wikipedia.org/wiki/Prodigy_%28ISP%29>.

"Qube Simulcast Program Listing," May 8-31, 1979, Qube Simulcast, pp. 15-42.

"Set-Top Box, "Wikipedia, Mar. 2, 2007, 2 pages, [online] [retrieved on Mar. 16, 2007] Retrieved from the Internet: <URL: http://en.wikipedia.org/wiki/Set_top_box>.

"TAPCIS ®, The Access Program for the CompuServe Information Service," Support Group, Inc., 8 pages, [online] [retrieved on Mar. 16, 2007] Retrieved from the Internet: <URL: http://www.nfbnet.org/files/moderns/TAPCIS.TXT>.

"textfiles.com," TEXTFILESDOTCOM, 1 page, [online] [retrieved on Mar. 16, 2007] Retrieved from the Internet: <URL: http://www.textfiles.com/>.

"The Free Dictionary, Data-Storage Medium," Farlex, Inc., 2007, 2 pages, [online] [retrieved on Mar. 16, 2007] Retrieved from the Internet: <URL: http://www.thefreedictionary.com/data-storage+medium>.

"The Groupware Server for Web 2.0," Citadel, 2007, 2 pages, [online] [retrieved on Mar. 16, 2007] Retrieved from the Internet: <URL: http://www.citadel.org/doku.php>.

"The HyperActive Software "Save HyperCard" Campaign," HyperActive Software, Aug. 19, 2000, 2 pages, [online] [retrieved on Mar. 16, 2007] Retrieved from the Internet: <URL: http://www.hyperactivesw.com/SaveHC.html>.

"The Kermit Project," Columbia University, Dec. 14, 2006, 2 pages, [online] [retrieved on Mar. 16, 2007] Retrieved from the Internet: <URL: http://www.columbia.edu/kermit/>.

"The Multics History Project is Scanning and Preserving Multics History. Can you Help?," Multics, Mar. 10, 2007, 3 pages, [online] [retrieved on Mar. 16, 2007] Retrieved from the Internet: <URL: http://www.multicians.org/multics.html>.

"Transmission Control Protocol, DARPA Internet Program Protocol Specification," Information Sciences Institute, RFC: 793, Sep. 1981, 88 pages, [online] [retrieved on Ma. 16, 2007] Retrieved from the Internet: <URL: http://www.ietf.org/rfc/rfc0793.txt>.

"Troubleshooting X.25 Connections," Cisco Systems, Inc., Nov. 27, 2001, 10 pages, [online] [retrieved on Mar. 16, 2007] Retrieved from the Internet: <URL: http://www.cisco.com/univercd/cc/td/doc/cisintwk/itg_v1/tr1919.htm>.

"Usenet," Wikipedia, Mar. 12, 2007, 12 pages, [online] [retrieved on Mar. 16, 2007] Retrieved from the Internet: <URL: http://en.wikipedia.org/wiki/Usenet>.

"Visual Component Library," Wikipedia, Jan. 24, 2007, 1 page, [online] [retrieved on Mar. 16, 2007] Retrieved from the Internet: <URL: http://en.wikipedia.org/wiki/Visual_component_library>.

"VT100," Wikipedia, Jan. 26, 2007, 2 pages, [online] [retrieved on Mar. 16, 2007] Retrieved from the Internet: <URL: http://en.wikipedia.org/wiki/VT100>.

"VT220," Wikipedia, Mar. 12, 2007, 1 page, [online] [retrieved on Mar. 16, 2007] Retrieved from the Internet: <URL: http://en.wikipedia.org/wiki/VT220>.

"VT52," Wikipedia, Mar. 6, 2007, 2 pages, [online] [retrieved on Mar. 16, 2007] Retrieved from the Internet: <URL: http://en.wikipedia.org/wiki/VT52>.

"Welcome to the HyperCard FAQ—Table of Contents," HyperCard FAQ 1, FAQ Version 1.2.2, Nov. 18, 1997, 10 pages, [online] [retrieved on Mar. 16, 2007] Retrieved from the Internet: <URL: http://www.pfhyper.com/hcfaq/hcfaq1.html>.

"World Wide Web," Wikipedia, Mar. 14, 2007, 10 pages, [online] [retrieved on Mar. 16, 2007] Retrieved from the Internet: <URL: http://en.wikipedia.org/wiki/World_Wide_Web>.

"X.25," Wikipedia, Feb. 21, 2007, 5 pages, [online] [retrieved on Mar. 16, 2007] Retrieved from the Internet: <URL: http://en.wikipedia.org/wiki/X25>.

"X.25 Overview," Cisco Systems, Inc., Oct. 13, 2006, 7 pages, [online] [retrieved on Mar. 16, 2007] Retrieved from the Internet: <URL: http://www.cisco.com/univercd/cc/td/doc/cisintwk/ito_doc./x25.htm>.

"Xanadu Archive Page," Xanadu, Mar. 11, 2007, 3 page, [online] [retrieved on Mar. 16, 2007] Retrieved from the Internet: <URL: http://xanadu.com/XUarchive/>.

"Xanadu Secrets Become Udanax Open-Source," Udanax.com, 2 pages, [online] [retrieved on Mar. 16, 2007] Retrieved from the Internet: <URL: http://www.udanax.com/>.

"Xanadu Technologies—An Introduction," Xanadu, Aug. 23, 1999, 14 pages, [online] [retrieved on Mar. 16, 2007] Retrieved from the Internet: <URL: http://xanadu.com/tech/>.

"XMODEM," Wikipedia, Feb. 12, 2007, 6 pages, [online] [retrieved on Mar. 16, 2007] Retrieved from the Internet: <URL: http://en.wikipedia.org/wiki/Xmodem>.

"YMODEM," Wikipedia, Feb. 16, 2007, 1 page, [online] [retrieved on Mar. 16, 2007] Retrieved from the Internet: <URL: http://en.wikipedia.org/wiki/YMODEM>.

"ZMODEM," Wikipedia, Jan. 12, 2007, 2 pages, [online] [retrieved on Mar. 16, 2007] Retrieved from the Internet: <URL: http://en.wikipedia.org/wiki/ZMODEM>.

Albright, T. B., "Simple Internet Purchase Procedure," 1996, 2 pages, [online] [retrieved on Mar. 7, 2007] Retrieved from the Internet: <URL: http://www.archive.org/web/20010618164928/www.bountyquest.com/images/b1025_17a.jpg>.

Bailey, J. P., "Opening the Set-Top Box Market," RPCP Working Paper, Feb. 3, 1995, pp. 1-28, [online] [retrieved on Mar. 16, 2007] Retrieved from the Internet: <URL: http://itc.mit.edu/rpcp/Pubs/set-top_mkt/abstract.html>.

Berners-Lee, T., "Hypertext Markup Language—2.0," Network Working Group, MIT/W3C, Nov. 1995, 70 pages, [online] [retrieved on Mar. 7, 2007] Retrieved from the Internet: <URL: http://web.archive.org/web/20010627201434/www.cis.ohio-state.edu/cgi-bin/rfc/rfc1866.html>.

Chaffin, B., "John Sculley on Apple Today, & HyperCard Regrets," The Mac Observer, Inc., Oct. 3, 2003, 6 pages, [online] [retrieved on Mar. 16, 2007] Retrieved from the Internet: <URL: http://www.macobserver.com/article/2003/10/03.5.shtml>.

Ciolek, T. M., "Internet Structure and Development: On Strategic Uses of the Archetypes of the Networked Mind," Research School of Pacific and Asian Studies, Australian National University, Jan. 1999, 22 pages, [online] [retrieved on Mar. 16, 2007] Retrieved from the Internet: <URL: http://www.ciolek.com/PAPERS/pnc-taipei-99.html>.

Dawe, R. L., "Move it fast . . . eliminate steps," Transportation & Distribution, Penton Publishing and Marketing, Sep. 1997, 6 pages, [online] [retrieved on Feb. 27, 2003] Retrieved from ProQuest on the Internet: <URL: http://proquest.umi.com/pqdweb?Did=00000...6&Fmt=4&Deli=1&Mtd=1&Idx=1&Sid=9&RQT=309>.

Frenzel, C. W., "Management of Information Technology," Boyd & Fraser Publishing Company, 1992, 4 pages.

Grandemange, A., "Amazon 1-Click Analysis," PageBox, Jan. 25, 2006, 30 pages, [online] [retrieved on Mar. 26, 2007] Retrieved from the Internet: <URL: http://pagebox.net/1clickanalysis.html>.

Grandemange, A., "Software and Business Method Patents," PageBox, Jan. 22, 2006, 79 pages, [online] [retrieved on Mar. 16, 2007] Retrieved from the Internet: <URL: http://pagebox.net/businessmethod.html>.

Greenberg, L., "Client/Server Computing in 1994, The new Generation of C/S Development Tools," Aug. 5, 1996, 23 pages, [online] [retrieved on Mar. 16, 2007] Retrieved from the Internet: <URL: http://earthrenewal.org/cs94.htm>.

Gruner, R. S., "Everything Old is New Again: Obviousness Limitations on Patenting Computer Updates of Old Designs," Boston University Journal of Science & Technology Law, 2003, pp. 211-283, vol. 9.

Jones, G., "Alternatives to HyperCard," Nov. 23, 1999, 7 pages, [online] [retrieved on Mar. 16, 2007] Retrieved from the Internet: <URL: http://modena.intergate.ca/personal/gslj/hyperalternatives.html>.

King, C., "Amazon's Grasp on One-Click Patent May Be Slipping," Internetnews.com, Ecommerce, Mar. 14, 2001, 4 pages, [online] [retrieved on Oct. 23, 2003] Retrieved from the Internet: <URL: http://www.internetnews.com/ec-news/article.php/4_713681>.

Lambert, N., "BountyQuest Revisited: The Coin Has Two Sides," Apr. 2, 2001, 3 pages, [online] [retrieved on Mar. 16, 2007] Retrieved from the Internet: <URL: http://newsbreaks.infotoday.com/nbReader.asp?ArticleId=17623>.

Loney, K., "Oracle DBA Handbook," 1994, pp. 13, Osborne McGraw-Hill, Berkeley, CA.

Morgan, E. L., "Implementing TCP/IP Communications with HyperCard," Infomotions, Inc., Dec. 21, 1992, 19 pages, (Originally published in Information Technology and Librarys, Dec. 1992, pp. 421-432, vol. 11, No. 4), [online] [retrieved on Mar. 16, 2007] Retrieved from the Internet: <URL: http://www.infomotions.com/musings/tcp-communications/>.

Nelson, T. H., "A Publishing and Royalty Model for Networked Documents," Coalition for Networked Information, Jul. 3, 2002, 4 pages, [online] [retrieved on Mar. 16, 2007] Retrieved from the Internet: <URL: http://www.cni.org/docs/ima.ip-workshop/Nelson.html>.

Raymond, E. S., "Terminal Type Descriptions Source File," terminfo syntax, Version 11.0.1, 302 pages, [online] [retrieved on Mar. 23, 2007] Retrieved from the Internet: <URL: http://www.catb.org/~esr/terminfo/termtypes.ti.gz>.

Scardina, M., "Tapping the Treasures of CompuServe," HP Handheld Forum, 5 pages, [online] [retrieved on Mar. 16, 2007] Retrieved from the Internet: <URL: http://www.palmtoppaper.com/ptphtml/27/pt27002e.htm>.

Trewitt, G., "Using Tcl to Process HTML Forms," Digital Equipment Corporation, 1994, NSL TN-14, pp. 1-41.

Viescas, J. L., "The Official Guide to the Prodigy Service," Microsoft Press, 1991, 395 pages.

"CompuServe Trend," CompuServe, 1987, (as discussed on page 15 in "Opinion of the U.S. Court of Appeals, Federal Circuit," Tech Law Journal, 20 pages), [online] [retrieved on Mar. 28, 2007] Retrieved from the Internet: <URL: http://www.techlawjournal.com/courts1999/amazon_bn/20010214op.asp>.

"Default—Default Button—Default Home Page," definitions from Microsoft Press Computer Dictionary, Third Edition, Microsoft Corporation, 1997, pp. 137, Redmond Washington.

"Australian Cybermalls News, New Archives Oct. 1996," Australian Cybermalls Pty Ltd., Oct. 31, 1996, 9 pages, [online] [retrieved on Jan. 15, 2007] Retrieved from the Internet: <URL: http://ausmall.com.au/acnarch/acnews8.htm#961025>.

Furche, A., "True Electronic Cash on the Internet," DigiCash Slideshow, 1989, 10 pages.

"Nomura Research Institute Licenses Ecash™ Technology for Japan's First True Electronic Money System," DigiCash Pty. Ltd., Press Release, Tokyo, Japan, Apr. 2, 1997, 3 pages, [online] [retrieved on Jan. 15, 2007] Retrieved from the Internet: <URL: http://ntrg.cs.tcd.ie/mepeirce/Project/Press/japecash.html>.

Welch, C., "Using Electronic Cash Securely, Ecash™—The Internet Currency," Craig Welch & Associates Pte. Ltd., Slideshow, 1995, 11 pages.

"Foreign Language Press," Digicash, Jul. 1996, 5 Pages.

"Microsoft Announces "Normandy,"a New Platform for Commercial Internet Services; First Solution Designed Specifically for ISPs, Commercial Web Sites," Microsoft PressPass—Information for Journalists, Jun. 4, 1996, [Retrieved Online] [Retrieved in 2007] <URL:http://www.microsoft.com/presspass/press/1996/jun96/nrmndypr.mspx>.

"Digital Dollars," Online News Hour: Internet Commerce, Jul. 1, 1997.

"Persistent Client State HTTP Cookies," Client Side State—HTTP Cookies, Netscape Communications Corporation, 1997.

Walker, J.S., "MISC> Internet Surveys," Excerpts from CSS Internet News, Feb. 10, 1997, 5 Pages.

"Advanced Bank First to Provide DigiCash's ecashTM System in Australia," News Release DigiCash, Oct. 24, 1996.

"The Check is in the E-Mail," Netguide, Apr. 1996, pp. 72-76.

Strassel, K. A., "Deutsche Bank, DigiCach Plan 'E-Cash' Trial," The Wall Street Journal, May 10, 1996.

Bloom, J. K., "Deutsche Bank Helps Digital Coin to Make its Mark," American Banker, May 7, 1996.

Hansell, S., "Today, Shoppers on Internet Get Access to Electronic Cash," The New York Times, Oct. 23, 1995.

Kutler, J., "Digicash to Test Live Internet Cash System with Mo. Bank," American Banker, Oct. 23, 1995.

Deutschman, A., "Money wants to be Anonymous," Worth, Oct. 1995, pp. 95-104.

Cortese, A., "What's the color of cybermoney?"Business Week, Feb. 27, 1995.

Kutler, J., "A Different Drummer on the Data Highway," American Banker, May 12, 1995.

"No hiding place," The Economist, Aug. 7-13, 1993.

"Letters," The Economist, Sep. 4-10, 1993.

Strassel, K. A., "Dutch Software Concern Experiments With Electronic 'Cash; in Cyberspace," The Wall Street Journal, Apr. 17, 1995.

Levy, S., "E-Money (That's what I want)," Wired, Dec. 1994.

Lewis, P. H., "Paperless Cash to be Tested for Internet Use," The New York Times, Oct. 19, 1994.

Rawethom, A., "$1m to give away-in cyber-bucks," Financial Times, Nov. 10, 1994.

Loro, L., "Downside for public is privacy issue," Advertising Age, Oct. 2, 1995.

Knecht, B., "Is Big Brother Watching Your Dinner and Other Worries of Privacy Watchers," The Wall Street Journal, Nov. 9, 1995.

"Forum on Risks to the Public in Computers and Related Systems," The Risks Digest, Nov. 15, 1996, vol. 18, Issue 61.

"DigiCash's EcashTM to be Issued by Deutsche Bank," News Release Digicash, May 7, 1996.

"Mars Electronics International Signs Worldwide Deal With Digicash," News Release Digicash, Mar. 26, 1996.

"Europeans Can Now Make Cash Purchases on the Information Superhighway," News Release Digicash, Mar. 13, 1996.

"Mark Twain Bank Launches Electronic Cash," News Release Digicash, Oct. 23, 1995.

"World's first electronic cash payment over computer networks," News Release Digicash, May 27, 1994.

Chaum, D., "Achieving Electronic Privacy," Scientific American, Aug. 1992, pp. 96-101.

"Digicash Appoints Ceo, Increases Outside Investment, and Moves Headquarters to California," News Release Digicash, Apr. 28, 1997.

"World Wide Web Home Page," Digicash Publications, Digicash, Jul. 1996, 1 Page.

"The Ease of Using Ecash," Digicash Publications, Digicash, Jul. 1996, 11 Pages.

"List of Technical Publications," Digicash Publications, Digicash, Jul. 1996, 3 Pages.

DigiCash Press Releases, Digicash, Jul. 1996, 2 Pages.

"Ecash Media Coverage and Publications," Digicash, Jul. 1996, 16 Pages.

"Ecash 2.3-The Ease of Using ecash (DB)," User Manual—Digicash, 1994-1996, 5 Pages.

Annonymous, "Industry Briefs: FDC Speeds Approval Process," Credit Risk Management Report, Apr. 21, 1996, vol. 7, No. 7.

Annonymous, "3COM: 3Com Announces Winners of the First Annual Retail Network Innovation Awards," M2 Presswire, May 22, 1997.

Annonymous, "Kao Infosystems Launches I-Reg, Integrated Registration for Customer Focused Marketing," PR Newswire, Oct. 17, 1996.

Anonymous, "SilverPlatter to offer NewsNet's NewsFlash, Bowker databases," Information Today, Apr. 1997, pp. 1-2, vol. 14, Iss. 4, Medford.

Bowen, B., "How popular sites use cookie technology," Netscape World—Heal World Cookies, Apr. 1997 [online] [Retrieved on Mar. 26, 2004] Retrieved from the internet URL: http://projekte.snm-hgkz.ch/1998.../4/JunkBuster/cookies%20Use.htm>.

Broadvision, "Interactive Commerce Management System, V1.0 Marketing Requirements Documents," BroadVision Marketing, Dec. 7, 1994.

Byrt, F., "Shopping at the high-tech mall; Fresh out of college, this Nashua group opens a store on the Internet computer network," Business, Jun. 19, 1994.

Chabrow, Data is part of the package shipment tracking technology, InformationWEEK, Dec. 25, 1995, p. 43-44, No. 559, ISSN 8750-6874, CMP Publications.

Correspondence between Fleurop Interflora Netherlands and Switzerland, Mar. 27, 1996 and Apr. 1, 1996.

Crone, R., et al., "Internet Payment Competition Heats Up," Financial Services Report, Jul. 17, 1996, vol. 13, Issue 15.

Cringely, R.X., "Potholes," Forbes 155 (5) Feb. 27, 1995 (Forbes ASAP), p. 89.

"EShop" 1993-2008, [online] [Retrieved on Mar. 4, 2008] Retrieved from the internet <URL: http://www.sattlers.org/mickey/history/eshop/index.html>.

Fleurop Interflora International Flower Ordering Service, 1995, [online] [Retrieved on Jan. 31, 2006] Retrieved from the internet <URL: http://www.fleurop.com/01/31/2006>.

Fryxell, D. A., "Spotlight: NewsNet" Link-Up, Jul./Aug. 1992, pp. 10-11.

Fryxell, D. "Resources for the business traveler; online services can save time and money; Online Travel Planning," Link-Up, Jan. 1990, vol. 7 No. 1, p. 18.

Hapgood, F., "What Makes Virtual Vineyards Rule?" Inc. magazine, Jun. 15, 1996, [online] [Retrieved on Nov. 3, 1999] Retrieved from the internet <URL: http://www.inc.com/articles/details/0,6378,ART1966_CNT53,00.html>.

Hawkins, L "Eaasy Sabre users can go places," Austin American-Statesman, Apr. 6, 1995.

Johnson, S.C., et al., "Language Development Tools," The Bell System Technical Journal, Jul.-Aug. 1978, vol. 57, No. 6, Part 2.

Jaffee, L., "CUC International Buys Internet Firm," DM News, vol. 16, No. 43, Nov. 21, 1994.

Johannessen, V., et al., "Feedback," Data Based Advisor, Feb. 1, 1990, p. 10, vol. 8, Issue 2.

Klingener, A., "NewsNet Smart-mail: Push delivery gets smart," Online, Sep./Oct. 1997, pp. 46-47, vol. 21, Iss. 5, Wilton.

Kosiur, D., "Understanding Electronic Commerce," Apr. 1997, Microsoft Press, Redmond.
Lee, T.M. "Planes, Trains, and Modems; Travel Reservations Online," Smart Computing, Jul. 1994, vol. 5 Issue 7.
Lewis, Peter H., "Attention Shoppers: Internet Is Open," New York Times-Business Day, Aug. 12, 1994.
Mcburney, M., "A Day With Generation X in Cyberspace," Swarthmore College Bulletin, Nov. 1994, p. 12.
McQuillan, J.M., "Nutshell Information Manager," Modem Office Technology, Aug. 1984, p. 111, vol. 29.
Pack, T., "All About Books Online," Online, Inc., Feb.-Mar. 22, 1997, pp. 12-13, 16-21, vol. 20, No. 1.
Pereira, P., "Live Wire: Enhanced Website Key Access Graphics Plan," Computer Reseller New, Jan. 22, 1996, pp. 105, 107.
Pietrucha, B., "A tale of three Web sites," The Journal of Business Strategy, Jan./Feb. 1996, p. 28, vol. 17, Iss. 1, Boston.
Poulios, N., "Tame the Tiger: Electronic Forms, Coupled with Workflow Management and Support for Client Computers, Can Increase Worker Productivity and Effectiveness," LAN Magazine, Sep. 1992, p. 77, vol. 7, No. 9.
Preset, A., "Graduates Capitalize on Internet," The Phoenix (Swarthmore College, Swarthmore, Pennsylvania), vol. 115, No. 19, Apr. 29, 1994.
Purpura, L., "Web-Based Couponing, Ads Tested at Randalls," Supermarket News, Jun. 2, 1997 vol. 47, No. 22.
Sabre, "Eaasy Sabre User's Guide—A product of SABRE Travel Information Network," 1989.
Sabre, Eaasy SABRE Reference Guide, 1994.
Source Code for DPP version of CompuServe Trend program, CompuServe Incorporated, Copyright © 1993.
Steiner, E., "SCO and Pizza Hut Announce Pilot Program for Pizza Delivery on the Internet," Press Release from SCO, Aug. 22, 1994, [online] [Retrieved on Jan. 31, 2006] Retrieved from the Internet <URL: http://www.interesting-peopltorg/archives/interesting-people/199408/msg00057.html>.
The NetMarket Co., Source codes for receiving order information and displaying orders, 1994.
Wagner, M:, "New Products to Shore Up the Net; Offers service to sell products on World Wide Web enhance Internet Security," Open Systems Today, Aug. 15, 1994.
Wolff, M., "Buying a Car on the Net," Forbes ASAP, Feb. 27, 1995, p. 79, 155 (5).
"Here and now with new Tesltra SureLink," Brochure-Tesltra SureLink electronic payment service, Feb. 1997.
"SureLink Buyer Guide," (V1.2) Aug. 1997.
"DA Information Services," DA Information Services Pty Ltd., Oct. 1996, Added to the Wayback machine on Nov. 2, 1996, [online] [Retrieved on Apr. 4, 2008] Retrieved from the internet <URL:http://web.archive.org/web/19961102002319/http://www.dadirect.com.au/>.
"DA Information Services—About US," DA Information Services Pty Ltd., Oct. 1996, Added to the Wayback machine on Nov. 2, 1996, [online] [Retrieved on Apr. 4, 2008] Retrieved from the internet <URL:http://web.archive.org/web/19961102002330/http://www.dadirect.com.au/aboutus/index.html>.
"DA Information Services—Title Search," DA Information Services Pty Ltd., Oct. 1996, Added to the Wayback machine on Mar. 28, 1997, [online] [Retrieved on Apr. 4, 2008] Retrieved from the internet <URL:http://web.archive.org/web/19970328211833/titlesearch.bookshop.dadirect.com.au/cgi-bin/da.exe/dab001>.
"DA Information Services—Your Order," DA Information Services Pty Ltd., Oct. 1996, Added to the Wayback machine on Mar. 28, 1997 [online] [Retrieved on Apr. 4, 2008] Retrieved from the internet <URL:http://web.archive.org/web/19970328212221/titlesearch.bookshop.dadirect.com.au/cgi-bin/da.exe/dab021%5eJB0HOI8RJB0HOGD1>.
"Greater Security for Payments Over the Net—A Reality," Business Wire, Feb. 11, 1997, [online] [Retrieved on Mar. 10, 2008] Retrieved from the internet <URL: http://findarticles.com/p/articles/mi_m0EIN/is_1997_Feb_11/ai_19108108>.
Greenia, M., Lexikon's History of Computing, 1982, [online] [Retrieved on May 13, 2008] Retrieved from the internet: <URL:http://web.archive.org/web/20040726150252/http://www.computermuseum.li/Testpage/01HISTORYC D-Glossory.htm#B>.
Copeland, D., et al., "Airline Reservations Systems: Lessons from History," MIS Quarterly, Sep. 3, 1988, p. 353-370, vol. 12, No. 3.
Hopper, M., "Rattling SABRE—New Ways to complete on information," Harvard Business Review, May/Jun. 1990, p. 118-125, vol. 68, Issue 4.
Zampetakis, H., "Banks to Cancel 'Stolen' Cards," The Financial Review, Apr. 18, 1995, p. 3.
Robotham, J., "Stolen credit card details to round the world," The Sydney Morning Herald, Apr. 18, 1995, p. 2.
"AUUG on Net Trade," The Age, Sep. 17, 1996.
"Risks and Rewards in Net Sales," The Australian, Nov. 5, 1996.
Bogle, D., "Credit Card Security Fears Spook Internet Christmas Shoppers," The Australian, Nov. 23, 1996.
Lewis, S., Sales on Net Get Security of Payment, The Financial Review, Feb. 10, 1997.
Needham, K., "Netshop Needs Known Names," The Sydney Morning Herald, Jul. 14, 1997.
"Hackers Steal Card Number," The Daily Telegraph, Aug. 20, 1997.
Lawrence, M., "Risks Receding for e-commerce," The Age, Sep. 1, 1997.
"Bank Austria and Den norske Bank to issue ecash™—The electronic cash for the Internet," News Release, DigiCash, Apr. 14, 1997.
"First Bank to Launch Electronic Cash—Mark Twain Bank-begins operating DigiCash's ecash™ on the Internet with U.S. Dollars," News Release, DigiCash, Oct. 23, 1995.
Electronic Commerce Report, Nov./Dec. 1996, vol. 4, No. 1.
"ECash How digital "coins" will finance Internet transactions," Computer Daily News, Mar. 26, 1996, Issue No. 954.
Hickman, B., Net mall brings e-cash online, The Australian, Jul. 7, 1997.
"Innovators Putting Bytes in the Bank," Business Review Weekly, Nov. 11, 1996.
Bloomberg, "Lines drawn for e-cash battle," Banking & Finance, The Australian Financial Review, Oct. 8, 1996.
Davidson, J., "Electronic 'coin' advances," Information, The Australian Financial Review, Jun. 11, 1997.
"Advance on Net," Business, The Sydney Morning Herald, Oct. 25, 1996.
Prodraman, A., "Advance Bank is first to plunge into electronic system," Computerworld, Jun. 20, 1997.
"Clever Currency," Syte, The Weekend Australian, Jun. 21-22, 1997.
"Advance goes ahead to e-cash transactions," Smart Banking, The Australian, Aug. 14, 1997.
"Money on the line," Computers &Communications, The Sydney Morning Herald, Jun. 11, 1996.
Cornell, A.,"Advance Bank moving towards Internet cash," Banking & Finance, The Australian, Oct. 25, 1996.
Garfinkel, S., "Chapter 6, Digital Identification Techniques," Web Serving & Commerce, Jun. 1997, p. 101-104.
Clarke, R., "Human Identification in Management Challenges and Issues," Dec. 1994, [online] [Retrieved on Nov. 10, 2006] Retrieved from the Internet <URL:http:www.anu.edu.au/people/Roger.Clarke/DV/HumanID.html>.
Clarke, R., "Public Interests on the Electronic Frontier, Their Relevence to Policy—Formation for I.T. Security Techniques," Aug. 14 & 15, 1997, [online] [Retrieved on Nov. 10, 2006] Retrieved from the internet <URL:http:www.anu.edu.au/people/Roger.Clarke/II/IIRSecy97.html>.
Schneider, B., "3.2 Authentication," Applied Cryptography, Second Edition, 1996, p. 52, John Wiley & Sons, Inc.
Garfinkel, S., "Access Control Strategies," Web Security & Commerce, Jun. 1997, p. 279.
Clarke, R., "Cryptography Issues in Plant Text," Privacy Law and Policy, 1996, [online] [Retrieved on Nov. 10, 2006] Retrieved from the internet <URL:http:www.austlii.edu.au/au/journals/PLPR/1996/23.html>.
Garfinkel, S., "Chapter 1: The Web Security Landscape—Credit Cards, Encryption, and the Web," Web Security & Commerce, Jun. 1997, p. 14-20.
"The Cartit commerce System 12,791 Registered Users & Developers in 112 countries!," Cartit—Free Shopping Software for Internet Commerce, 1996, [online] [Retrieved on Sep. 6, 2006] Retrieved from the internet <URL: http://www.cartit.com>.

"Makers of the First Ever Turnkey E-Commerce Solution!" EC Ware, 1995, [online] [Retrieved on Oct. 17, 2006] Retrieved from the internet <URL: http://www.ecware.com/company>.

Wilson, R., "How to know whether you need a Shopping Cart Program, or Outgrowing a Simple Order Form," Web Marketing Today, Mar. 19, 1996, Issue 9.

Clarke, R., "The SET Approach to Net-based payments," Nov. 27, 1996, [online] [Retrieved on Nov. 10, 2006] Retrieved from the Internet <URL:http:www.anu.edu.au/people/Roger.Clarke/EC/SEToview.html>.

Wilson, R., "Unraveling the Mysteries of Merchant Credit Card Accounts for Web Commerce," Web Commerce Today, Aug. 1, 1997, Issue 1.

Yesil, M., "Creating the Virtual Store," Wiley Computer Publishing, 1996, 1997, pp. 34-160, 302-364.

Secure Electronic Transaction (SET) Specification, Book 1: Business Description, Jun. 17, 1996, p. 53-60.

Archived Usenet posts dated before Sep. 12, 1997, showing that Lech Janczewski used Usenet for both personal and professional communications, Google Groups, Google Search, May 12, 1981-Sep. 12, 1997.

Archived Usenet dated before Sep. 12, 1997, which uses the phrase "One-click shopping" as early as 1992, Google Groups, Google Search, May 12, 1981-Sep. 12, 1997.

Archived Usenet posts dated before Sep. 12, 1997, which refer to the use of cookies to remember the "state" in a shopping cart so that a user can place an order without logging in, Google Groups, Google Search, May 12, 1981-Sep. 12, 1997.

Archived Usenet posts dated before Sep. 12, 1997, which refer to the process of logging in to change account information, Google Groups, Google Search, May 12, 1981-Sep. 12, 1997.

"Rocketmail" Screen snapshots taken from www.archive.org of website www.rocketmail.com, Added to the Wayback machine on Jul. 1, 1997, [online], [Retrieval date unknown] Retrieved from the Internet <URL:http://web.archive.org/web/19970601114957/http://www.rocketmail.com>.

"Hotmail" Screen snapshots taken from www.archive.org of website www.hotmail.com, Added to the Wayback machine on Apr. 27, 1997, [online], [Retrieval date unknown] Retrieved from the Internet <URL:http://web.archive.org/web/19970427180239/ www.hotmail.com/features_logout.html>.

Schneider, B., "Email Security: How to keep your electronic messages private," 1995, pp. 54-56, 69.

McFadden, F., et al., "Modern Database Management," 4$^{th}$ Edition, 1994, pp. 7, 8, 30, 429.

"Getting your business on the Internet," IDG Publications, 1996, p. 60.

Crumlish, C., The Internet Dictionary—The essential guide to netspeak, 1995.

Lynch, M., et al., Internet system handbook, 1993, pp. 185, 422, 423.

Comer, D., "Chapter 19—Client-Server Models of Interaction," Internetworking with TCP/IP, Principles, protocols, and architecture, vol. 1, 1995, pp. 325, 330-333, and 565.

Dern, D., "Electronic Mail, Usenet, Remote Login, and File Transfer," The Internet Guide for New Users, 1994, pp. 120-123.

"BNZ—Direct Debit Interface," Feb. 7, 1996.

"Payments Processing Policy-Draft Only," Jan. 7, 1997.

"Home Supermarket Shopping on the Internet Trial Launched—"The Great New Zealand Shopping Mall" Launches Beta Test," Draft press lease for TGNZSM, Aug. 27, 1996.

Voullaire, J., "Let your mouse do the Walking," Southern Skies Magazine, Aug. 1997.

Press Clippings related to on-line commerce in New Zealand on or prior to Sep. 12, 1997.

"Armchair shopping in the virtual mall," NZ Leisure Times, Sep. 1996.

"Checking out the Cybermarket Shelves," Weekend Magazine, NZ Herald, Feb. 22, 1997.

"Online grocery Shopping arrives in Auckland," NZ Evening Post, Jun. 23, 1997.

"The Great New Zealand Shopping Mall," Added to the Wayback machine on Jun. 6, 1997, [online], [retrieved on Jan. 6, 2006] Retrieved from the Internet <URL:http://web.archive.org/web/19970606211120/www.shoppingmall.co.nz/faq2.html>.

"Welcome to NZ Internet Shop," 1996, Added to the Wayback machine on Nov. 17, 1996, [online], [retrieved on Jan. 10, 2006] Retrieved from the Internet <URL:http://web.archive.org/web/19961117070045/shop.co.nz/info.html>.

"Gamescape," Added to the Wayback machine on Mar. 27, 1997, [online], [retrieved on Jan. 10, 2006] Retrieved from the Internet <URL:http://web.archive.org/web/19970327013415/http://www.gamescape.co.nz/>.

Archived Usenet posts by Dennis Viehland dated before Sep. 12, 1997, commenting on the OBI system referred to in the Statement of Case, Google Groups, Google Search, May 12, 1981-Sep. 12, 1997.

Ando, K., et al., "Comments of Eric Johnson Concerning Consumer On-line Privacy-P954807—An Examination of the Role of Clickstream Data in marketing through the Internet," May 12, 1997.

Viehland, D., "Internet Resources for Librarians: Developing Skills to Serve Your Clients," Nov. 20-23, 1995, p. 40.

Ives, B., et al., "The Customer Service Life Cycle: Looking Through the Customer's Eyes," Oct. 6, 1995.

Ives, B., et al., "The Customer Service Life Cycle—Acquisition," Oct. 6, 1995.

Gilbert, A., "Start-up gives online shopping a makeover," CNET News.com, Copyright 1995-2006, [online] [Retrieved on Feb. 7, 2006] Retrieved from the internet <URL:http://www.news.com/Start-up-gives-up-online-shopping-a-makeover/2100-1032_3-5857314.html>.

Rosa, J., "Channels: GTSI Revamps Web Site, To Add Configuration Engine," Computer Reseller News, Jul. 28, 1997, p. 133.

Newdom, J., The New Shopping Network, Computerworld Retail Journal, Jun. 1, 1996, p. R11.

"Bizcom International, Bizcom releases SmartCart Shopping Cart software," M2 Presswire, Mar. 21, 1997.

"Cable A content delivery system," BeComm™ Corporation, Dec. 3, 1996.

"Portal™ Remote a Truly Universal Consumer Remote," BeComm™ Corporation, Aug. 20, 1996.

"Consumer Network Tap™ A Portal™ to the content world," BeComm™ Corporaion, Oct. 22, 1996.

"Portal™ Operating System A White Paper," BeComm™ Corporation, Dec. 11, 1996.

DA Direct, Correspondence from DA Direct to customer, Apr. 19, 1995.

DA Direct, User Manual, 1992, pp. 2-38.

Da Direct, Registration Form and Agreement, Apr. 6, 1995.

DA Direct, Internet Bookshop—Customer Orders, Nov. 14, 1996.

"Open market and leading Service Providers Commerce-Enable the World Wide Web," Open Market-Corporate Overview, Date unknown, [online] [Retrieved on Jul. 30, 1997] Retrieved from the internet <URL:http://www.openmarket.com/partners/commsp.htm>.

Allard, T., "Telstra may take on banks in the payments system," The Sydney Morning Herald, May 11, 1997.

"Telstra Surelink™: Welcome to the Telstra SureLink™—making life easier," Telstra Corporation Limited, 1997, [online] [Retrieved on Jul. 23, 1997] Retrieved from the internet <URL:http://www.surelink.com.au>.

"Telstra Surelink™: Saving time and money by making life easier, with Telstra Surelink™," 1997, [online][Retrieved on Jul. 23, 1997] Retrieved from the internet <URL:http://www.surelink.com.au/c1.htm>.

"Telstra Surelink™: What can I buy; here and now with Telstra Surelink™," 1997, [online] [Retrieved on Jul. 23, 1997] Retrieved from the internet <URL:http://www.surelink.com.au/c3.htm>.

"Telstra Surelink™: Payment and delivery; making life easier with Telstra Surelink™," 1997, [online] [Retrieved on Jul. 23, 1997] Retrieved from the internet <URL:http://www.surelink.com.au/c4.htm>.

"Telstra Surelink™: The answers to Frequently Asked Questions; making life easier with Telstra Surelink™," 1997, [online] [Retrieved on Jul. 23, 1997] Retrieved from the internet <URL:http://www.surelink.com.au/c5.htm>.

"Telstra Surelink™: Secure Transaction; here and now with Telstra Surelink™," 1997, [online] [Retrieved on Jul. 23, 1997] Retrieved from the internet <URL:http://www.surelink.com.au/t0.htm>.

"SureLink Merchant Guide," (V2.0) Jul. 1997, p. 1-85.

Telstra SureLink Overview, Aug. 1997, p. 1-12.

"Salescart—Electronic Shopping Cart," SalesCart™, A division of ComCity® LLC, 1995-2008, [online] [Retreived on Apr. 19, 2008] Retreived from the internet <URL:http://www.salescart.com/company.htm>.

Archive of "Welcome to Harris Technology on the Internet," Harris Technologies, 1996, [online] [Archived by http://web.archive.org on Dec. 22, 1996; Retreived on Aug. 14, 2008] Retrieved from the internet <URL:http://web.archive.org/web/19961222113745/http://www.ht.com.au/>.

Messmer, E., "Microsoft opens doors on Net store tools," Network World, Oct. 21, 1996, p. 16, vol. 13, No. 43.

Cousins, S., et al., "InterPay: Managing Multiple Payment Mechanisms in Digital Libraries," Annual Conference on Digital Libraries, 1995, Can be retreived from the internet <URL: http://www.dbai.tuwien.ac.at/staff/herzog/DL/DL95/papers/cousins/cousins.html>.

Hauser, R., et al., "Generic Extensions of WWW Browers," Proceedings of the First USENIX Workshop on Electronic Commerce, Jul. 1995, New York, NY.

Tang, L., "A Set of Protocols for Micropayments in Distributed Systems," Proceedings of the First USENIX Workshop on Electronic Commerce, Jul. 1995, New York, NY.

Patent Prosecution File History for U.S. Appl. No. 10/068,341, Reed et al., filed Feb. 5, 2002, claiming priority to an application filed Feb. 29, 1996 and an application filed Sep. 27, 1996.

Patent Prosecution File History for U.S. Appl. No. 08/722,314, Reed et al., filed Sep. 27, 1996, claiming priority to an application filed Feb. 29, 1996.

Patent Prosecution File History for U.S. Appl. No. 08/609,115, Reed et al., filed Feb. 29, 1996.

Patent Prosecution File History for U.S. Appl. No. 09/143,888, Reed et al., filed Aug. 31,1998, claiming priority to an application filed Feb. 29, 1996 and an application filed Sep. 27, 1996.

Patent Prosecution File History for U.S. Appl. No. 09/570,675, Reed et al., filed May 15, 2000, claiming priority to an application filed Feb. 29, 1996 and an application filed Sep. 27, 1996.

"Information Manager," CompuServe, Nov. 1989, pp. 182-183, 185, 242-248, 273-278.

Ad for "CompuServe Mall," CompuServe Magazine, May 1994, p. 8.

Bellare, M., et al., "iKP—A Family of Secure Electronic Payment Protocols," First USENIX Workshop on Electronic Commerce, Jul. 1995 / Aug. 2, 1995, 19 Pages.

"Netscape Publishing System," Netscape Products, Netscape Communications Corporation, 1997, 2 Pages.

"Netscape Publishing System—A Comprehensive Online Publishing System," Netscape Products, Netscape Communications Corporation, 1997, 6 Pages.

"Netscape Publishing System FAQ," Netscape Products, Netscape Communications Corporation, 1997, 4 Pages.

Jones, Chris. "Java Shopping Cart and Java Wallet; Oracles plans to join e-commerce initiative." Mar. 31, 1997, InfoWorld Media Group.

"Pacific Coast Software Software creates virtual shopping cart." Sep. 6, 1996. M2 Communications Ltd 1996.

"Software Creates Virtual Shopping Cart." Sep. 5, 1996. Business Wire, Inc.

Terdoslavich, William. "Java Electronic Commerce Framework." Computer Reseller News, Sep. 23, 1996, CMP Media, Inc., 1996, pp. 126, http://www.elibrary.com/id/101/101/getdoc...rydocid=902269@library.sub.-d&dtype=0.about.0&dinst=. [Accessed Nov. 19, 1998].

"Internet Access: Disc Distributing Announces Interactive World Wide." Cambridge Work-Group Computing Report, Cambridge Publishing, Inc., 1995, http://www.elibrary.com/id/101/101/getdoc...docid=1007497@library.sub.-a&dtype=0.about.0&dinst=0. [Accessed Nov. 19, 1998].

Nance, Barry, "Reviews: A Grand Opening for Virtual Storefront With Middleware." Jun. 1, 1997, CMP Media, Inc. 1997, p. 80, http://www.elibrary.com/getdoc.egi?id=117...docid=1257247@library.sub.-- a&dtype=0.about.0&dinst=0. [Accessed Nov. 19, 1998].

"Go-Cart Shopping Cart Software Features." 1996 Go International, Inc. http://www.go-cart.com/features.html. [Accessed Nov. 19, 1998].

"PerlShop Manual (version 2.2)." 1996, ARPAnct Corp. http://www.w3u.com/grokksoft/shop/perlman.html. [Accessed Nov. 19, 1998].

"Sax Software Announces Sax NetSell; Sax NetSell's design-time ActiveX controls make Internet commerce easy."1997, Sax Software Corp.

Baron, Chris and Bob Weil, "Implementing a Web Shopping Cart," Dr. Dobb's Journal, Sep. 1996, pp. 64, 66, 68-69, and 83-85.

Hoque, Reaz, "A Shopping Cart Application with JavaScript," Web Techniques, May 1998, pp. 63, 65-66, and 68.

"ACME Computers Web Shots," 25 pages, [online] Retrieved from the Internet: <URL: http://morwood.arl.wustl.edu/web-basket/acme/>.

"*Amazon.com* v. *BarnesandNoble.com, Inc.*," Opinion of U.S. District Court for the Western District of Washington, Seattle Division, 73 F.Supp.2d 1228, 1999 U.S. Dist., Dec. 1, 1999.

"*Amazon.com* v. *BarnesandNoble.com, Inc.*," United States Court of Appeals for the Federal Circuit, 239 F.3d 1343, 2001, Feb. 14, 2001.

"Amazon Web Page Containing Product Details of "Creating the Virtual Store" Providing Publish Date of Nov. 8, 1996," Amazon.com, Feb. 26, 2003, [online] Retrieved from the Internet: <URL: http://www.amazon.com/exec/obidos/tg/detail/-/40471164941/002-1591839-2687212?vi=glance>.

"ASX, A Chronology of Key Events in ASX's Evolution," Australian Stock Exchange, Jun. 28, 2004, 3 pages.

"Auction Features—Strictly Exchange Online Auction Software, Flexible, Powerful, Affordable, and Creative . . ." Strictly Exchange, 1998-2001, [online] [retrieved on Jul. 23, 2001] Retrieved from the Internet: <URL: http://www.auctionhosting.com>.

"Australian Purchasing & Supply," The Official Magazine of the Australian Institute of Purchasing & Materials Management, Jul./Aug. 1993, pp. 1-64.

"Banks Issue DigiCash Wallets," Bank Systems & Technology [online], New York, May 1996, vol. 33, Iss. 5; p. 10, 1 pgs [Retrieved on Sep. 27, 2005] Retrieved from ABI INFORM.

"Business Innovation Through Telecommunications," Keen Innovations, 1996, 12 pages.

"Client-Server," Wikipedia, 3 pages, [online] [retrieved on Dec. 28, 2006] Retrieved from the Internet: <URL: http://en.wikipedia.org/wiki/Client-server>.

"Clip-Art Window Shopper Users Manual," Adonis Corporation, 33 pages.

"CompuServe Classic Service—Company Analyzer Screen Shots," Nov. 11, 1999, 3 pages.

"Cookies, Client-Side Persistent Information and Their Use," Jul. 28, 1995, 2 pages.

"Cookies—What Every Web Designer Should Know," Journal of Design Science, Ignition, Inc., 1997-2001, 7 pages, [online] [retrieved on May 7, 2002] Retrieved from the Internet: <URL: www.ignitiondesign.com/journal/cookies>.

"CyberCash in the News," Sep. 30, 1996, [Added to the Wayback machine on Mar. 10, 2000] [online], [retrieved on Sep. 2, 2005] Retrieved from the Internet URL:http://web.archive.org/web/20000410142725/www.cybercash.com/cybercash/company/news/1996head line.html>.

"Dave Kristol's "State-Info" Proposal," Email from Shel Kaphan to www-talk@w3.org, Aug. 10, 1995, 2 pages, [online] [retrieved on Nov. 15, 1999] Retrieved from the Internet: <URL: http://www19.w3.org/Archives/Public/www-talk/1995JulAug/0338.html>. [Also cited as: "Email from Shel Kaphan to www-talk@w3.org," Aug. 10, 1995].

"Del-Way Publishing," Added to the Wayback Machine on Dec. 12, 1996, [online] [retrieved on Aug. 1, 2005] Retrieved from the Internet <URL:http://web.archive.org/web/19961212135234/http://www.skylinemall.com/del-way/>.

"Digicash—An Introduction to Ecash," Added to the Wayback Machine on Nov. 2, 1996, [online] [retrieved on Aug. 1, 2005] Retrieved from the Internet <URL:http://web.archive.org/web/*/ http://www.digicash.com/publish/ecash_intro/ecash_intro.html>.

"Digicash Ecash—About Ecash," Added to the Wayback Machine on Nov. 2, 1996, [online] [retrieved on Aug. 1, 2005] Retrieved from the Internet <URL:http://web.archive.org/web/19961102103150/digicash.com/ecash/about.html>.

"Digicash Ecash—About the Ecash Trial," Added to the Wayback Machine on Nov. 2, 1996, [online] [retrieved on Aug. 1, 2005] Retrieved from the Internet <URL:http://web.archive.org/web/19961102105315/digicash.com/ecash/trial.html>.

"Digicash Ecash—Cybershops Alphabetical List," Added to the Wayback Machine on Nov. 2, 1996, [online] [retrieved on Sep. 10, 2005] Retrieved from the Internet <URL:http://web.archive.org/web/19970111164309/www.digicash.com/shops/alpha.html>.

"Digicash Ecash—Ecash Issuers," Added to the Wayback Machine on Nov. 2, 1996, [online] [retrieved on Aug. 1, 2005] Retrieved from the Internet <URL:http://web.archive.org/web/19961102103233/digicash.com/ecash/ecash-issuers.html>.

"Digicash Ecash—Frequently Asked Questions," Added to the Wayback Machine on Nov. 2, 1996, [online] [retrieved on Aug. 1, 2005] Retrieved from the Internet <URL:http://web.archive.org/web/19961102103430/digicash.com/ecash/faq.html>.

"Digicash Ecash—Help—Client User Interface Quick Reference," Added to the Wayback Machine on Nov. 2, 1996, [online] [retrieved on Aug. 1, 2005] Retrieved from the Internet <URL:http://web.archive.org/web/19961102104108/digicash.com/ecash/quickref.html>.

"Digicash Ecash—Interface Between the Ecash Shop Software and CGI Scripts," Added to the Wayback Machine on Nov. 2, 1996, [online] [retrieved on Sep. 9, 2005] Retrieved from the Internet <URL:http://web.archive.org/web/19961102104713/http://digicash.com/ecash/options.html>.

"Digicash Ecash—Payment Failed," Added to the Wayback Machine on Nov. 22, 1996, [online] [retrieved on Sep. 10, 2005] Retrieved from the Internet URL:http://web.archive.org/web/1996122060308/soundwire.com/cgi-bin/charge/samples/StressedOut.mp2>.

"Digicash Ecash—Sample CGI Peri Script," Added to the Wayback Machine on Nov. 2, 1996, [online] [retrieved on Sep. 9, 2005] Retrieved from the Internet <URL:http://web.archive.org/web/19961102104735/http://digicash.com/ecash/perl.html>.

"Digicash Ecash—Sample CGI Shell Script," Added to the Wayback Machine on Nov. 2, 1996, [online] [retrieved on Sep. 9, 2005] Retrieved from the Internet <URL:http://web.archive.org/web/19961102104759/http://digicash.com/ecash/shell.html>.

"Digicash Ecash—Starting a Trial Shop—Main Page," Added to the Wayback Machine on Nov. 2, 1996, [online] [retrieved on Sep. 9, 2005] Retrieved from the Internet <URL:http://web.archive.org/web/19961102104646/http://digicash.com/ecash/startshop.html>.

"Digicash Home Page," Added to the Wayback Machine on Nov. 2, 1996, [online] [retrieved on Aug. 1, 2005] Retrieved from the Internet <URL:http://web.archive.org/web/19961102102838/http://digicash.com/>.

"Digicash Mac Ecash—Preferences Dialog Box," Added to the Wayback Machine on Nov. 2, 1996, [online] [retrieved on Aug. 1, 2005] Retrieved from the Internet <URL:http://web.archive.org/web/19961102103£343/digicash.com/ecash/mac/setupb.html>.

"Digicash Mac Ecash—Spending and Receiving Money," Added to the Wayback Machine on Nov. 2, 1996, [online] [retrieved on Aug. 1, 2005] Retrieved from the Internet <URL:http://web.archive.org/web/19961102103855/digicash.com/ecash/macispend.html>.

"Digicash News—Hot News," Added to the Wayback Machine, on Nov. 2, 1996, [online] [retrieved on Aug. 1, 2005] Retrieved from the Internet <URL:http://web.archive.org/web/19961102115004/digicash.com/news/hotnews.html>.

"Digicash—Publications on Digicash," Added to the Wayback Machine on Nov. 2, 1996, [online] [retrieved on Sep. 10, 2005] Retrieved from the Internet <URL:http://web.archive.org/web/19970111164549/http://www.digicash.com/publish/pu_on_dc.html>.

"Digicash Unix Ecash—Ecash Window," Added to the Wayback Machine on Nov. 2, 1996, [online] [retrieved on Aug. 1, 2005] Retrieved from the Internet <URL:http://web.archive.org/web/19961102111243/digicash.com/ecash/unix/ecwin.html>.

"Digicash Unix Ecash—Setup Dialog Box," Added to the Wayback Machine on Nov. 2, 1996, [online] [retrieved on Aug. 1, 2005] Retrieved from the Internet <URL:http://web.archive.org/web/19961102111559/digicash.com/ecash/unix/setupb.html>.

Digicash Unix Ecash—Spending and Receiving Money, Added to the Wayback Machine on Nov. 2, 1996, [online] [retrieved on Aug. 1, 2005] Retrieved from the Internet <URL:http://web.archive.orgiweb/19961102111612/digicash.com/ecash/unix/spend.html>.

"Digicash Windows Ecash—Spending and Receiving Money," Added to the Wayback Machine on Nov. 2, 1996, [online] [retrieved on Aug. 1, 2005] Retrieved from the Internet <URL:http://web.archive.org/web/19961102112207/digicash.com/ecash/win/spend.html>.

"Distributors Rush to the Web," Purchasing [online]. New York: Oct. 1996. vol. 120, Iss. 1; p. 128, 1pgs [Retrieved on Sep. 27, 2005] Retrieved from ABI INFORM.

"Doonesbury Comics," The Doonesbury Company, 1993, 6 pages, [online] Retrieved from the Internet: <URL: http://www.doonesbury.com/flashbacks/pages/1993/05/db930505.1>.

"Ecash Payment Mechanism," Added to the Wayback Machine on Nov. 2, 1996, [online] [retrieved on Aug. 1, 2005] Retrieved from the Internet <URL:http://web.archive.org/web/19961102104301/http://digicash.com/ecash/shop/paymethod.html>.

"Ecash Shop Behind a Firewall," Added to the Wayback Machine on Nov. 2, 1996, [online] [retrieved on Aug. 1, 2005] Retrieved from the Internet <URL:http://web.archive.org/web/19961102104223/digicash.com/ecash/shopffirewall.html>.

"Ecash—Starting a Shop—Do it Yourself, Running Your Own Shop-Server on Windows NT/Windows 95 Web Server," Added to the Wayback Machine on Nov. 2, 1996, [online] [retrieved on Sep. 9, 2005] Retrieved from the Internet <URL:http://web.archive.org/web/19961102104436/http://digicash.com/ecash/shop_win.html>.

"Elcom, 10-K405 Annual Report," Elcom International, Inc., Mar. 25, 1997, Securities and Exchange Commission, Commission File No. 000-27376, Washington, DC.

"European Patent Office 2005 Seminar on Search and Documentation Methods," Workshop 5, Internet as a source of prior art, p. 50-53 [online], [retrieved on Oct. 3, 2005] Retrieved from the Internet URL:http://www.european-patent-office.org/dgl/searchseminar/2005/_pdf/sfa_2005_ws_05_sideris_handouts.pdf>.

"Everything You Ever Wanted to Know About Cookies," JavaScript Week, Nov. 25, 1996, 12 pages.

"F&M Picture Shop," Added to the Wayback Machine on Oct. 10, 1999, [online] [retrieved on Aug. 2, 2005] Retrieved from the Internet <URL:http://web.archive.org/web/19991010224623/http://kyyp-pari.hkkk.ft/~k22749/shop/sale.html>.

"Funny Money," The Economist [online], London, Sep 10, 1994. vol. 332, Iss. 7880; p. 74 [Retrieved on Sep. 27, 2005] Retrieved from ABI INFORM.

"Have any Cyberbucks?," The kiNETic e-cash page, Added to the Wayback Machine on Oct. 30, 1996, [Last Modified: Sep. 19, 1995] [online] [retrieved on Aug. 2, 2005] Retrieved from the Internet <URL:http://web.archive.org/web/19990220011624/http://kyyp-pari.hkkk.fi/~k22749/shop/store.html>.

"Help Support the LPVA, last updated: Dec. 12, 1996," Added to the Wayback Machine on Dec. 12, 1996, [online] [retrieved on Aug. 1, 2005] Retrieved from the Internet <URL:http://web.archive.org/web/19961212141050/www.skylinemall.com/Ipva/donate.html>.

"How to Set Up an Ecash Accepting Shop," Added to the Wayback Machine Nov. 2, 1996, [online] [retrieved on Aug. 1, 2005] Retrieved from the Internet <URL:http://web.archive.org/web/19961102103938/digicash.com/ecash/mt/buildshop.html>.

"How to Use Ecash Through a Firewall," Added to the Wayback Machine on Nov. 2, 1996, [online] [retrieved on Aug. 1, 2005] Retrieved from the Internet <URL:http://web.archive.org/web/19961102105003/digicash.com/ecash/techsupp/firewall.html>.

"In a Silicon Society, Who Will be King of Electronic Cash," Bank Systems & Technology [online], New York, May 1996, vol. 33, Iss. 5; p. 72, 1 pgs [Retrieved on Sep. 27, 2005] Retrieved from ABI-INFORM.

"Interactive System Productivity," ISPF V4R2.0 User's Guide (unable to obtain) Oct. 9, 1995.

"Internet Archive Frequently Asked Questions," [online], [retrieved on Oct. 9, 2005]. Retrieved from the Internet URL:http://www.archive.org/about/faqs.php>.

"Internet Archive Wayback Machine: Advanced Search," [online], [retrieved on Oct. 14, 2005]. Retrieved from the Internet URL:http://web.archive.org/collections/web/advanced.html>.

"Internet Money is Blue Not Green," Newswire, Jun. 27, 1997, 1 page.

"JJL Shop," Oct. 5, 1994, Added to the Wayback Machine Dec. 5, 1998, [online] [retrieved on Aug. 2, 2005] Retrieved from the Internet <URL:http://web.archive.org/web/19981205133543/http://www.primenet.com/commercial/jjlshop.html>.

"Lloyd's Coke Machine, A Complete Description of a Networked Coke Machine," Walter's Coke Project Homepage, Feb. 27, 1996, 2 pages, [online] [retrieved on Jul. 23, 2001] Retrieved from the Internet: <URL: http://www.ugcs.caltech.edu/~walterfb/coke/coke.html>. [Original cite 8 pages—now separated (different URLs)].

"Make an Ecash Donation," Updated Feb. 1996, [Added to the Wayback machine on Feb. 21, 1999] [online] [retrieved on Sep. 10, 2005] Retrieved from the Internet URL:http://web.archive.org/web/19990221192142/www.delorie.com/ecash-donation.html>.

"Management of Information Technology," Boyd & Fraser Publishing Company, 1992, 4 pages.

"Microsoft Excel User's Guide, Version 5.0," Microsoft Corporation, 1993, pp. 259-373.

"Netbanking with your PC," Bank of Montreal MBANX, Jul. 7, 1997.

Netscape Merchant System, Getting Started, Netscape Communications Corporation, 1996 (100 pages).

"Netscape Merchant System, Getting Started, Version 1.5," Netscape Communications Corporation, 1995, pp. 5-100.

"Netscape Merchant System, Site Administrator's Handbook," Netscape Communications Corporation, 1996, 336 pages.

"Oliver's Market, The Ordering System," 5 pages, [online] [retrieved on May 21, 2003] Retrieved from the Internet: <URL: http://www.sonic.net/~raptor/current/how2ordr.html>.

"One Click E-Commerce Marketing Agreement with CableData," The Gale Group, PR Newswire, Nov. 24, 1998, 3 pages.

"Open Buying on the Internet (OBI) Standard Release V1.0," The OBI Consortium, May 1997.

"Overview of MacEcash Scriptability with AppleEvents," Added to the Wayback Machine on Nov. 2, 1996, [online] [retrieved on Sep. 9, 2005] Retrieved from the Internet <URL:http://web.archive.org/web/19961102104203/http://digicash.com/ecash/shop/applescript.html>.

"Pay with a CyberCoin," Link—up [online], Medford, Nov./Dec. 1996, vol. 13, Iss. 6; p. 1, 2 pgs [Retrieved on Sep. 27, 2005] Retrieved from ABI INFORM.

"Payment failed!," Added to the Wayback Machine on Dec. 12, 1996, [online] [retrieved on Aug. 1, 2005] Retrieved from the Internet <URL:http://web.archive.org/web/19961212150032/www.skylinemall.com/cgibin/nph-charge.cgi?Ipval.html>.

"Payment Failed!," Added to the Wayback Machine on Dec. 12, 1996, [online] [retrieved on Aug. 1, 2005] Retrieved from the Internet <URL:http://web.archive.org/web/19961212141412/www.skylinemall.com/cgibin/nph-charge.cig?I_Did_lt.sit.bin>.

"Payment Timeout," Added to the Wayback Machine on Nov. 2, 1996, [online] [retrieved on Oct. 13, 2005] Retrieved from the Internet <URL:http://web.archive.org/web/19961102104744/digicash.com/ecash/charge.txt>.

"Preliminary Injunction Lifted in "One-Click" Patent Battle," Intellectual Property & Technology Law Journal, May 2001, 2 pages, vol. 13, No. 5.

"Press Release—Cybercash," Sep. 30, 1996, [Added to the Wayback machine on Jun. 3, 2000] [online], [retrieved on Sep. 2, 2005] Retrieved from the Internet <URL:http://web.archive.org/web/20000603125102/cybercash.com/cybercash/company/news/releases/1996/96sept30.html>.

"Qube Advertisement," 27 pages.

"Qube Program Guide," May 1979, 41 pages.

"Remembrances of Sites Past," Newsweek, New York, [online] Nov. 12, 2001, p. 73, 1 pgs , vol. 138, Issue 20, [Retrieved on Sep. 27, 2005] Retrieved from ABI-INFORM.

"Sentence Printing," Microsoft Word for Windows, User's Guide Version 6.0, First Edition, Jul. 15, 1994, pp. 537-556, Chapter 23.

"Shopping Cart," Wikipedia, Jun. 2004, 1 page, [online] Retrieved from the Internet: <URL: http://www://en.wikipedia.org/wiki/Shopping_cart>.

"Sound Wire's Demo Store," Soundwire, Inc., 1995, Added to the Wayback Machine on Feb. 20, 1997, [online], [retrieved on Sep. 10, 2005] Retrieved from the Internet URL:http://web.archive.org/web/19970220052103/soundwire.com/ecash_goodies.html>.

"Sponsor with Ecash," Jun. 16, 1995, Added to the Wayback Machine on Jan. 29, 1998, [Last change, Jun. 16, 1995] [online] [retrieved on Aug. 2, 2005] Retrieved from the Internet <URL:http://web.archive.org/web/19980129202410/hplyot.obspm.fr/~dl/inc/ecash.shtml>.

"Star Trek," Television Series, 1987-1997, 2 pages, [online] [retrieved on Mar. 7, 2007] Retrieved from the Internet: <URL: http://web.archive.org/web/20010330052126/www.startrek.com/>, (as cited with link on page 7 in "Bounty Quest, 1-Click Prior Art," Bounty Quest, 8 pages, [online] [retrieved on Jan. 17, 2007] Retrieved from the Internet: <URL: http://web.archive.org/web/20010405100818/www.bountyquest.com/patentinfo/onedickart>.).

"Starting a Shop," Added to the Wayback Machine on Nov. 2, 1996, [online] [retrieved on Aug. 1, 2005] Retrieved from the Internet <URL:http://web.archive.org/web/19961102105156/digicash.com/ecash/techsupp/start_shop.html>.

"Subscriber Systems Model 8550 Remote Control Unit," Scientific-Atlanta, Inc., 1996, pp. 14-59-14-60.

"Subscriber Systems Series 8590 Addressable Home Terminal with Volume Control," Scientific-Atlanta, Inc., 1996, pp. 14-37-14-40.

"Supplynet, Remote Requisitioning Systems," Femtree Computer Corporation.

"Supplynet, Requisitioning Training," Oct. 1993, pp. 1-91.

"Telecom Plus, Supplynet User Manual," Telecom, Australia 1990. 330 pages.

"Telvue Corp. 10-Q for Sep. 30, 1995," Securities and Exchange Commission, Nov. 7, 1995, pp. 1-18, Commission File No. 0-17170, [online] [retrieved on Jul. 23, 2001] Retrieved from the Internet: <URL: http://www.secinfo.com/dpJXs.a6.htm>.

"Typical Use of Ecash in Scripts," Added to the Wayback Machine on Nov. 2, 1996, [online] [retrieved on Sep. 9, 2005] Retrieved from the Internet <URL:http://web.archive.org/web/19961102104404/http://digicash.com/ecash/shop/usage.html>.

"Welcome to BAPS—The BitArt Painting Shop," Jan. 18, 1995, Added to the Wayback Machine on May 4, 1997, [Page last modified: Jan. 18, 1995] [online] [retrieved on Aug. 2, 2005] Retrieved from the Internet <URL:http://web.archive.org/web/19970504075536/http://www.ericsson.nl/people/acb/shop.html>.

"Welcome to the F&M Picture Shop," Added to the Wayback Machine on Feb. 20, 1999, [Last Modified: Sep. 19, 1995] [online] [retrieved on Aug. 2, 2005] Retrieved from the Internet <URL:http://web.archive.org/web/19990220011624/http://kyyp-parl.hkkk.fi/~k22749/shop/store.html>.

"What are These Cyber-Things," ABA Bank Compliance [online], Washington, May/Jun. 1996, vol. 17, Iss. 5; p. 13, 2 pgs [Retrieved on Sep. 27, 2005] Retrieved from ABI INFORM.

Bacard, A., "Computer Privacy Handbook," Peachpit Press, CA, 1995, pp. 87-90.

Berners-Lee, T., et al., "Weaving the Web—The Original Design and Ultimate Destiny of the World Wide Web by Its Inventors," HarperColins Publishers, Inc., New York, 1999, pp. 7-23, Chapter 2.

Bers, J. S., "In Memory of Money," Bank Systems & Technology [online], New York, Sep. 1995. vol. 32, Iss. 9, p. 42, 4 pgs [Retrieved on Sep. 27, 2005] Retrieved from ABI INFORM.

Bers, J. S., "Mark Twain Bank Licenses Ecash," Bank Systems & Technology [online]. New York: Dec. 1995. vol. 32, Iss. 12, p. 14, 1 pgs [Retrieved on Sep. 27, 2005] Retrieved from ABI INFORM.

Buck, S. P., "Electronic money: So much for the cashless society," The Economist, [online] London, Nov. 26, 1994. vol. 333, Iss. 7891; p. 21, 3 pgs [Retrieved on Sep. 27, 2005] Retrieved from ABI-INFORM.

Buck, S. P. "Electronic commerce—would, could, should you use current Internet payment mechanisms?". Internet Research. [online] Bradford: 1996. vol. 6. Issue 2/3.

Carroll, J., et al., "1997 Canadian Internet Handbook," 1997, pp. 176-180, 317, Prentice-Hall Canada Inc.

Cash, J. Jr., et al., "Corporate Information Systems Management Text and Cases," Second Edition 1988 Irwin, 3 pages.

Castelluccio, M., "The Three-Cent Nickel is Back," Management Accounting, [online] Montvale, Sep. 1996. vol. 78, Iss. 3; p. 45, 1 pgs [Retrieved on Sep. 27, 2005] Retrieved from ABI INFORM.

Chaum, D., "Digicash Keynote Address given at Internet@Telecom 95," Oct. 8, 1995, Geneva, Switzerland, [retrieved on Sep. 9, 2005] Retrieved from the Internet:URL:http://www.itu.int/TELECOM/wt95/pressdocs/papers/chaum.html>.

Chaum, D., "Chief Technology Officer and Chairman, DigiCash" Network Computing [online]. Manhasset: Sep. 1, 1996. p. 76 [Retreived on Sep. 27, 2005] Retrieved from AB1-INFORM.

Chaum, D., "Money for the Information Age," Credit Union Management [online], Madison, Feb. 1996. vol. 19, Iss. 2; p. 40, 2 pgs [Retrieved on Sep. 27, 2005] Retrieved from ABI INFORM.

Clarke, R., "Case Study: OM Financial Derivative Exchanges," Xamax Consultancy Pty Ltd., Jun. 19, 1994, 11 pages.

Clarke, R., "Commodity Futures Trading at the CBOT," Xamax Consultancy Pty Ltd., Mar. 1994, 5 pages.

Clarke, R., "Cookies," Jun. 1, 1998, 8 pages.

Clarke, R., "FAST: Food for Strategic Thought," Xamax Consultancy Pty Ltd., Dec. 17, 1993, 7 pages.

Clarke, R., "Net-Based Payment Schemes," Dec. 1, 1996, 9 pages.

Clarke, R., "The Birth of Web Commerce," Xamax Consultancy Pty Ltd., Oct. 21, 2002, 4 pages.

Clarke, R., "The Strategic Intent of On-Line Trading Systems: A Case Study in National Livestock Marketing," Aug. 16, 1992, 20 pages.

Clemmet, A., "Digital Cash," Work Study [online], London, May/Jun. 1995, vol. 44, Iss. 3, p. 25, 1 pgs [Retrieved on Sep. 27, 2005] Retrieved from ABI INFORM.

Coggins, W. W., "Prior Art in the Field of Business Method Patents—When is an Electronic Document a Printed Publication for Prior Art Purposes?" Presented at AIPLA, Fall, 2002, USPTO, [online], [retrieved on Oct. 13, 2005] Retrieved from the Internet URL:http://www.uspto.gov/web/menu/pbmethod/aiplafal102paper.htm>.

Cooper, A., "About Face—The Essentials of User Interface Design," IDG Books Worldwide, Inc., 1995, Chapters 11-15, Foster City, CA.

Davidson, S., "PC-Based Home Banking, Part II," America's Community Banker [online], Washington, Jun. 1996, vol. 5, Iss. 6; p. 44, 3 pgs [Retrieved on Sep. 27, 2005] Retrieved from ABI-INFORM.

Downing, D. A., et al., "Dictionary of Computer Terms," Barron's Educational Series, Inc., New York, pp. 44, 47, 57, 62, 87, 88, 148, 149, 202, 243, 285.

Edwards, E., "Ephemeral to Enduring: The Internet Archive and its Role in Preserving Digital Media," Information Technology and Libraries, [online], Chicago, p. 3, 6 pgs, vol. 23, Issue 1, [Retrieved on Sep. 27, 2005] Retrieved from ABI-INFORM.

Eisenberg, A., "Doing Business on the Net," Scientific American, Nov. 1995, p. 111.

Freed, K., "When Cable Went Qubist," Media Visions Webzine, May 5, 2000, 7 pages, [online] [retrieved on Oct. 8, 2000] Retrieved from the Internet: <URL: http://www.kenfreed.org/itv-qube.html>.

Frezza, B., "The Coming Clash Over Digital Cash Java and ActiveX Are Still Brewing," Network Computing [online], Manhasset, Oct. 1, 1996. p. 35 [Retrieved on Sep. 27, 2005] Retrieved from ABI INFORM.

Furche, A., et al., "Computer Money," Heidelberg, 1996, pp. 53-63, 101-103.

Gibbs, M., "Piling Up the Virtual Money," Network World [online]. Framingham: Sep. 11, 1995. vol. 12, Iss. 37, p. SS17, 3 pgs [Retrieved on Sep. 27, 2005] Retrieved from ABI INFORM.

Godbey, R., "The Law of the Line, The Pros and Cons of Patents," Hawaii Business, Nov. 2003, 3 pages, [online] Retrieved from the Internet: <URL: http://www.hawaiibusiness.cc/hb82001/default.cfrn?articleid=13>.

Gomes, L., "Web 'Cookies' May be Spying on You," San Jose Mercury News, Feb. 13, 1996, 2 pages.

Greenspun, P., "Philip and Alex's Guide to Web Publishing, Chapter 14: ecommerce," 31 pages, [online] [retrieved on Jul. 23, 2001] Retrieved from the Internet: <URL: http://www.arsdigita.com/books/panda/ecommerce.

Groenfeldt, T., "First Union Testing Electronic Wallet," Bank Systems & Technology [online], New York, Apr. 1997, vol. 34, Iss. 4; p. 19, 1 pgs [Retrieved on Sep. 27, 2005] Retrieved from ABI INFORM.

Hapgood, F., "Sex Sells, Inc.," [online], Boston, 1996, vol. 18, Iss. 17; p. 45, 4 pgs [Retrieved on Sep. 27, 2005] Retrieved from ABI INFORM.

Herbst, K., "Webstock'94," Internet World, Feb. 1995, pp. 82-85.

Herbst, K., "Web-posium," Internet World, Oct. 1994, pp. 74-76.

Hewitt, M. J., "Cash-in-hand or E-Cash on the Internet," Link-up [online], Medford, Nov./Dec. 1994, vol. 11, Iss. 6; p. 14, 1 pgs [Retrieved on Sep. 27, 2005] Retrieved from ABI INFORM.

Higgins, J., "Net Profit," Auckland Penguin, 1997, pp. 147-156.

Holland, K., et al., "The Future of Money," Business Week, Jun. 12, 1995, pp. 36-46.

Howard, T., "Banks Look to Electronic Future," Australian Accountant, Melbourne, Apr. 1997, 3 pages, [online] vol. 67, Iss. 3; [Retrieved on Sep. 27, 2005] Retrieved from ABI-INFORM.

Karpinski, R., "Web Commerce Services Take to Air Waves," CMP Media Inc., InternetWeek, Sep. 8, 1997, 2 pages, [online] [retrieved on Jan. 30, 2007] Retrieved from the Internet<URL:http://www.lexis.com/research/retrieve?_m=7cc672d04f2cc735ccc75713f0df21c0&_brow...>.

Kleiner, K., "Banking on Electronic Money," New Scientist, Apr. 8, 1995, pp. 26-30.

Kristol, D., et al., "HTTP State Management Mechanism," HTTP Working Group Internet Draft, Jul. 19, 1996, [online] [retrieved on Nov. 8, 1999] Retrieved from the Internet: <URL: http://portal.research.bell-labs.com/~dmk/cookie-2.29.txt>.

Lewis, P., "Attention Internet Shoppers: E-Cash is Here," The New York Times, Oct. 19, 1995, p. D4.

Levy, S., "The End of Money'?" Newsweek, Oct. 30, 1995, pp. 62-65.

Lockwood, J., "Web-Basket," 2 pages, [online] [retrieved on Oct. 24, 1999] Retrieved from the Internet: <URL: http://morwood.art.wustl.edu/web-basket/>.

Lockwood, J., "Web-Basket Documentation," 3 pages, [online] [retrieved on Oct. 24, 1999] Retrieved from the Internet: <URL: http://morwood.arl.wustl.edu/web-basket/wbdoc.html>.

Lynch, D. C., et al., "Digital Money," John Wiley & Sons, 1996, pp. 28-31.

Madamas, N., "Options in Electronic Payment Systems," Telemarketing & Call Center Solutions [online], Norwalk, Sep. 1996, vol. 15, Iss. 3; p. 76, 4 pgs [Retrieved on Sep. 27, 2005] Retrieved from ABI INFORM.

Marks, P., "Way back when . . . ," New Scientist, [online], London, pp. 46, vol. 176, Issue 2370, [Retrieved on Sep. 27, 2005] Retrieved from ABI-INFORM.

Morgan, L., "Cashing in," Internet World, Feb. 1995, pp. 48-51.

Morris, W., "The American Heritage Dictionary," Houghton Mifflin, 1991, pp. 320, 538, 1005.

Narten, T., "File Server," Encyclopedia of Computer Science, Third Edition, Ralston, Anthony and Reilly, Edwin Editors, London, Chapman & Hall, 1993, pp. 554-555.

Nelson, R., "Essential Technology Guide: Money & Finance," Popular Science [online], New York, Mar. 1996. vol. 248, Iss. 3; p. 65, 4 pgs [Retrieved on Sep. 27, 2005] Retrieved from ABI INFORM.

Nielsen, J., "Jacob Nielsen's Alertbox for Jan. 1997: Trends for the Web in 1997," Alertbox, Jan. 1997, 3 pages, [online] [retrieved on Jan. 19, 2007] Retrieved from the Internet: <URL: http://www.useit.corn/alertbox/9701.html>.

Notess, G. R., "The Wayback Machine: The Web's Archive," Online, Medford, Mar./Apr. 2002, p. 59, 3 pgs, vol. 26, Issue 2, [Retrieved on Sep. 27, 2005] Retrieved from ABI-INFORM.

Notess, G. R., "The Wayback Machine: The Web's Archive," Wayback Machine, Retrieved on Oct. 9, 2005.

Panurach, P., "Money in Electronic Commerce: Digital Cash, Electronic Fund Transfer, and Ecash," Association for Computing Machinery, Communications of the ACM [online], New York, Jun. 1996, vol. 39, Iss. 6; p. 45, 6 pgs [Retrieved on Sep. 27, 2005] Retrieved from ABI INFORM.

Perry, T. S., "The Trials and Travails of Interactive TV," IEEE Spectrum, Apr. 1996, pp. 22-28.

Prince, C. J., Getting into a No-Load Micropayments Business without Abandoning. Bank Brand Identity,Bank Systems & Technology [online] New York: Oct. 1996. vol. 33, Iss. 10, p. 18, 1 pgs [Retrieved on Sep. 27, 2005] Retrieved from ABI INFORM.

Pyle, I. C., et al., "Dictionary of Computing," Oxford University Press, Inc., New York, Fourth Edition, pp. 54, 57, 76, 231, 318, 373, 444, 543, 544.

Quittner, J., "Betting on Virtual Vegas," Time, Jun. 12, 1995, pp. 48-49.

Rowley, J., "Retailing and Shopping on the Internet," International Journal of Retail & Distribution Management, [online] Bradford, 1996, pp. 26, vol. 24, Issue 3, [Retrieved on Sep. 27, 2005] Retrieved from ABI INFORM.

Schneiderman, B., "Hypertext," Encyclopedia of Computer Science, Third Edition, Ralston, Anthony and Reilly, Edwin, Editors, London, Chapman & Hall, 1993, pp. 632-635.

Sheils, M., "More than simply cyber cents," Chief Executive [online] New Yor, Dec. 1995., Iss. 109; p. 23, 1 pgs [Retrieved on Sep. 27, 2005] Retrieved from ABI-INFORM.

Siong, N. B., "On-Line Trading at the Singapore Hog Auction Market (HAM)," Jul. 25, 1992, 14 pages.

Swatman, P., et al., "Integrating EDI into the Organization's Systems: A Model of the States of Integration," 12 pages.

Trommer, D., "A New Wave in Online Credit," Electronic Buyers News, Mar. 4, 1996, pp. 58.

Wayner, P., "Digital Cash-Commerce on the Net," AP Professional, Second Edition, London, 1997, pp. 155-158, 189-197, 217-227, 341-343.

Welz, G., "New Deals," Internet World, Jun. 1995, pp. 36-41.

Yesil, M., "Creating the Virtual Store," Wiley Computer Publishing, 1997, pp. 150-151, 170, 185, 289-301.

Yesil, M., "Creating the Virtual Store," Wiley Computer Publishing, 1997, pp. 118-121, 326-327.

Yesil, M., "Creating the Virtual Store," Netscape Communications Corporation, 1996, pp. 321-337, Appendix F.

"Sound Wire's Demo Store," Soundwire, Inc., 1995, Added to the Wayback Machine on Feb. 20, 1997, [online], [retrieved on Jun. 9, 2009] Retrieved from the Internet <URL:http://web.archive.org/web/19970220052103/soundwire.com/ecash_goodies.html>.

"Star Trek," Television Series, 1987-1997, 2 pages, [online] [retrieved on Mar. 7, 2007] Retrieved from the Internet: <URL: http://web.archive.org/web/20010330052126/www.startrek.com/>, (as cited with link on page 7 in "Bounty Quest, 1-Click Prior Art," Bounty Quest, 8 pages, [online] [retrieved on Jan. 17, 2007] Retrieved from the Internet: <URL: http://web.archive.org/web/20010405100818/www.bountyquest.com/patentinfo/oneclickart>.).

Australian Patent Office Notice of Hearing, Australian Patent No. 762175, Jul. 16, 2010, two pages.

Canadian Intellectual Property Office Examiner's Report, Canadian Patent Application No. 2,650,298, Jun. 3, 2010, five pages.

United States Patent and Trademark Office Notice of Intent to Issue Ex Parte Reexamination Certificate, U.S. Appl. No. 90/007,946, Mar. 2, 2010, 56 pages.

Granlich, W., "Annotation System Issues," 1994, [online] [Archived on May 2, 1997; Retrieved on Nov. 25, 2008] Retrieved from the internet <URL:http://web.archive.org/web/19970502122333/http:/pla...und.sun.com/~gramlich/1994/annote/issues/index.html>.

Bharat, K., et al., "Newscape-An Interactive, Personalized, Online Newspaper," May 30, 1995.

Hamilton, A., "How to Buy Information with a First Virtual Account," Apr. 11, 1994.

Email from Lou Montulli to Multiple Recipients Re: Session tracking, Apr. 18, 1995.

Staff Writer of CNET News.com, "Wave chip sets up online credit cards," CNET News.com, Feb. 21, 1996.

Borenstein, N., et al., "Perils and Pitfalls of Practical CyberCommerce—The Lessons of First Virtual's First Year," Oct. 1995.

Markhoff, J., "Company News: A Credit Card for On-Line Sprees," The New York Times, Oct. 15, 1994.

"Getting Set Up as a First Virtual Seller," First Virtual Holdings Incorporated, 1996, [online] [Archived on www.web.archive.org on Nov. 4, 1996; Retrieved on Nov. 1, 2004] Retrieved from the internet <URL:http://web.archive.org/web/19961104175011/www.fv.com/info/sellersetup.html>.

"Making Sales," First Virtual Holdings Incorporated, 1996, [online] [Archived on www.web.archive.org on Nov. 4, 1996; Retrieved on Nov. 1, 2004] Retrieved from the internet <URL: http://web.archive.org/web/19961104175004/www.fv.com/info/sellersales.html>.

"Supporting Your Customers," First Virtual Holdings Incorporated, 1996, [online] [Archived on www.web.archive.org on Nov. 4, 1996; Retrieved on Nov. 1, 2004] Retrieved from the internet <URL: http://web.archive.org/web//1996110417501/www.fv.com/info/sellersupport.html>.

"Maintaining Records," First Virtual Holdings Incorporated, 1996, [online] [Archived on www.web.archive.org on Nov. 4, 1996; Retrieved on Nov. 1, 2004] Retrieved from the internet <URL: http://web.archive.org/web/1996110417495/www.fv.com/info/seller-reconcile.html>.

"Software for Automating Sales," First Virtual Holdings Incorporated, 1996, [online] [Archived on www.web.archive.org on Nov. 4, 1996; Retrieved on Nov. 1, 2004] Retrieved from the internet <URL: http://web.archive.org/web/19961104175920/www.fv.com/info/codesources.html>.

"Additional Messages for Accounting," First Virtual Holdings Incorporated, 1996, [online] [Archived on www.web.archive.org on Nov. 4, 1996; Retrieved on Nov. 1, 2004] Retrieved from the internet <URL:http://web.archive.org/webil9961104175108/www.fv.com/infohaus/helpmeister/accountin...>.

"Adding Payment Authorization Support to Your Software," First Virtual Holdings Incorporated, 1996, [online] [Archived on www.web.archive.org on Nov. 4, 1996; Retrieved on Nov. 1, 2004] Retrieved from the internet <URL:http://web.archive.org/web/19961104180004/www.fv.com/tech/pa-adding.html>.

"Express Letter," First Virtual Holdings Incorporated, 1996, [online] [Archived on www.web.archive.org on Nov. 4, 1996; Retrieved on Nov. 1, 2004] Retrieved from the internet <URL:http://web.archive.org/web/19961104180217/www.fv.com/whatsnew/expressletter.html>.

"The Problem and The Solution," First Virtual Holdings Incorporated, 1996, [online] [Archived on www.web.archive.org on Nov. 4, 1996; Retrieved on Nov. 1, 2004] Retrieved from the internet<URL:http://web.archive.org/web/19961104174218/www.fv.comiccdanger/summary.html>.

"How to Build a First Virtual—Enabled Membership Form," First Virtual Holdings Incorporated, 1994, [online] [Archived on www.web.archive.org on Nov. 4, 1996; Retrieved on Nov. 1, 2004] Retrieved from the internet <URL:http://web.archive.org/web/19961104180034/www.fv.com!tech/member-doc.txt>.

"Vulnerability of Software-Based Credit Card Encryption," First Virtual Holdings Incorporated, 1994, [online] [Archived on www.web.archive.org on Nov. 4, 1996; Retrieved on Nov. 1, 2004] Retrieved from the internet <URL:http://web.archive.org/web/19961104174225/www.fv.com/ccdanger/techreview.html>.

"Payment System Summary (Buying and Selling)," First Virtual Holdings Incorporated, 1994, [online] [Archived on www.web.archive.org on Nov. 4, 1996; Retrieved on Nov. 1, 2004] Retrieved from the internet <URL:http://web.archive.org/web/19961104174903/www.fv.com/info/intro.html>.

Lewis, P., "Advertising: Technology for the Cybermarketing Age" the New York Times CyberTimes, Sep. 18, 1996, [online] [Archived on www.web.archive.org on Nov. 4, 1996; Retrieved on Nov. 1, 2004] Retrieved from the internet <URL:http://web.archive.org/web/19961104180147/www.fv.comigabletxt/ny_times9_I8_96.html>.

"Partial List of Merchants Accepting First Virtual," Where to Shop, First Virtual Holdings Incorporated, 1996, [online] [Archived on www.web.archive.org on Jun. 25, 1997; Retrieved on Nov. 1, 2004] Retrieved from the internet <URL:http://web.archive.org/web/19970625174353/www.fv.com/info/index.html>.

"Directory of VirtualPIN Integrators," First Virtual Vip Alliance, First Virtual Holdings Incorporated, [online] [Archived on v%/wvv.web.

archive.org on Jun. 25, 1997; Retrieved on Nov. 1, 2004] Retrieved from the internet <Url:http://web.archive/org/web/19970625175733/www.fv.com/developeriintegrators.html>.

"First Virtual Holdings Upgrades to 10 Million User Capability," Press Release, May 12, 1997, First Virtual Holdings Incorporated, [online] [Archived on www.web.archive.org on Jun. 25, 1997; Retrieved on Nov. 3, 2004] Retrieved from the internet <URL:http://web.archive/org/web/19970625174604/www.fv.com/press/release5_12_97.html>.

"First Virtual Holdings Launches New Cyber Shopping Experience with 1 Virtual Place," Press Release, Apr. 28, 1997, First Virtual Holdings Incorporated, [online] [Archived on www.web.archive.org on Jun.25, 1997; Retrieved on Nov. 3, 2004] Retrieved from the internet <URL:http://web.archive/org/web/19970625180545/www.fv.com/press/release4_28_97.html>.

"First Virtual Holdings, First Data, and First USA Paymentech Complete Major Sale of VirtualPINS^SM," Press Release, Apr. 24, 1997, First Virtual Holdings Incorporated, [online] [Archived on www.web.archive.org on Jun. 25, 1997; Retrieved on Nov. 3, 2004] Retrieved from the internet <URL:http://web.archive/org/web/19970625180555/www.fv.com/press/release4_24_97.html>.

"Point-of-Sale Banners Putting Your Money Where Your Mouse Is," E Business Magazine, Apr. 1997, [online] [Archived on www.web.archive.org on Jun. 25, 1997; Retrieved on Nov. 1, 2004] Retrieved from the internet <URL:http://web.archive/org/web/19970625180613/www.fv.com/press/Ebusiness_vtag_4_97.html>.

"First Virtual Holdings Announces New Distribution Channel for Internet Payment System," Press Release, Apr. 8, 1997, First Virtual Holdings Incorporated, [online] [Archived on www.web.archive.org on Jun.25, 1997; Retrieved on Nov. 1, 2004] Retrieved from the internet <URL:http://web.archive/org/web/19970625180624/www.fv.com/press/release4_8_97.html>.

"First Virtual Holdings Chairman to Appear on New Tv Series Caspar Weinberger's World Business Review," Press Release, Mar. 18, 1997, First Virtual Holdings Incorporated, [online] [Archived on www.web.archive.org on Jun. 25, 1997; Retrieved on Nov. 1, 2004] Retrieved from the internet <URL:http://web.archive/org/web/19970625180646/www.fv.com/press/release3_18_97.html>.

"First Virtual Holdings and First USA Offer Internet Shopping Start-Up Kit to Millions of Cardholders," Press Release, Feb. 24, 1997, First Virtual Holdings Incorporated, [online] [Archived on www.web.archive.org on Jun. 25, 1997; Retrieved on Nov. 1, 2004] Retrieved from the internet <URL:http://web.archive/org/web/19970625180657/www.fv.com/press/release2_24_97.html>.

"Saatchi & Saatchi and First Virtual Holdings Launch the First Animated, Transactional Telecommunications Banner Ad for Bell Atlantic," Press Release, Feb. 19, 1997, First Virtual Holdings Incorporated, [online] [Archived on www.web.archive.org on Jun. 25, 1997; Retrieved on Nov. 1, 2004] Retrieved from the internet <URL:http://web.archive/org/web/19970625180713/www.fv.com/press/release2_19_97.html>.

"First Virtual Holdings lo Provide Internet Payment System for Sun's Java Commerce Toolkit," Press Release, Jan. 31, 1997, First Virtual Holdings Incorporated, [online] [Archived on www.web.archive.org on Jun. 25, 1997; Retrieved on Nov. 1, 2004] Retrieved from the internet <URL:http://web.archive/org/web/19970625180720/www.fv.com/press/release_sun.html>.

"World-Renown Black Tie Roses® Now Available At 1 Virtual Place," Press Release, Jan. 29, 1997, First Virtual Holdings Incorporated, [online] [Archived on www.web.archive.org on Jun. 25, 1997; Retrieved on Nov. 1, 2004] Retrieved from the internet <URL:http://web.archive/org/web/19970625180730/www.fv.com/press/release1_29_97.html>.

"First Virtual Holdings Incorporated Announces Fourth-Quarter and Year-End Results," Press Release, Jan. 31, 1997, First Virtual Holdings Incorporated, [online] [Archived on www.web.archive.org on Jun. 25, 1997; Retrieved on Nov. 1, 2004] Retrieved from the internet <URL:http://web.archive/org/web/19970625180739/www.fv.com/press/release1_31_97.html>.

"Jacksonville Jaguars Score Touchdown With First Virtual Holdings for Safe and Secure Ticket Sales on The Internet," Press Release, Jan. 9, 1997, First Virtual Holdings Incorporated, [online] [Archived on www.web.archive.org on Jun. 25, 1997; Retrieved on Nov. 1, 2004] Retrieved from the internet <URL:http://web.archive/org/web/19970625180754/www.fv.com/press/release_jags.html>.

"First Virtual Holdings Incorporated Completes Initial Public Offering," Press Release, Dec. 13, 1996, First Virtual Holdings Incorporated, [online] [Archived on www.web.archive.org on Jun. 25, 1997; Retrieved on Nov. 1, 2004] Retrieved from the internet <URL:http://web.archive/org/web/19970625180809/www.fv.com/press/release_ipo.html>.

"First Virtual Holdings Selected by InterNIC to Process Online Registration Payments," Press Release, Dec. 4, 1996, First Virtual Holdings Incorporated, [online] [Archived on www.web.archive.org on Jun. 25, 1997; Retrieved on Nov. 1, 2004] Retrieved from the internet <URL: http://web.archive/org/web/19970625180820/www.fv.com/press/release_NIC.html>.

"Electronic Frontier Foundation Chooses First Virtual for Online Fundraising," Press Release, Nov. 25, 1996, First Virtual Holdings Incorporated, [online] [Archived on www.web.archive.org on Jun. 25, 1997; Retrieved on Nov. 1, 2004] Retrieved from the internet <URL:http://web.archive/org/web/19970625180834/www.fv.com/press/release_eff.html>.

"First Data, First USA Paymentech, GE Capital Invest in First Virtual Holdings," Press Release, Sep. 19, 1996, First Virtual Holdings Incorporated, [online] [Archived on www.web.archive.org on Jun. 25, 1997; Retrieved on Nov. 1, 2004] Retrieved from the internet <URL:http://web.archive/org/web/19970625180856/www.fv.com/press/release_9_17_96.html>.

"Paying through the Net Virtual credit good at Net sites everywhere," Press Release, Jan. 29, 1996, Examiner First Virtual Holdings Incorporated, [online] [Achived on www.web.archive.org on Jun. 25, 1997; Retrieved on Nov. 1, 2004] Retrieved from the internet <URL:http://web.archive/org/web/19970625180946/www.fv.com/press/sjm2_1_29_96.html>.

Harman, L., "Eclectic traveler from Tinseltown to cyberspace," San Diego Business Journal, Nov. 14, 1994, [online] [Archived on www.web.archive.org on Jun. 25, 1997; Retrieved on Nov. 1, 2004] Retrieved from the internet <URL:http://web.archive/org/web/19970625181002/www.fv.com/press/sdbj.html>.

"Perils and Pitfalls of Practical Internet Commerce (Part I)," The Lessons of First Virtual's First Year, 1996, [online] [Archived on www.web.archive.org on Nov. 4, 1996; Retrieved on Nov. 10, 2004] Retrieved from the internet <URL:http://web.archive/org/web/199611041743262/www.fv.com/company/first_year.html>.

"Perils and Pitfalls of Practical Internet Commerce (Part II)," The Lessons of First Virtual's First Year, 1996, [online] [Archived on www.web.archive.org on Nov. 4, 1996; Retrieved on Nov. 10, 2004] Retrieved from the internet <URL:http://web.archive/org/web/19961104174338/www.fv.com/company/first_year2.html>.

"Corporate Brochure" First Virtual Holdings Incorporated, 1995, [online] [Archived on www.web.archive.org on Nov. 4, 1996; Retrieved on Nov. 1, 2004] Retrieved from the internet <URL:http://web.archive/org/web/19961104174319/www.fv.com/brochure/instoc.html>.

"First Virtual Overview" First Virtual Holdings Incorporated, 1996, [online] [Archived on www.web.archive.org on Nov. 4, 1996; Retrieved on Nov. 10, 2004] Retrieved from the internet <URL:http://web.archive/org/web/19961104174918/www.fv.com/info/overview.html>.

"Encryption and Internet Commerce" First Virtual Holdings Incorporated 1996 [online] [Archived on www.web.archive.org on Nov. 4, 1996; Retrieved on Nov. 10, 2004] Retrieved from the internet <URL:http://web.archive/org/web/19961104174829/www.fv.com/info/encryption.html>.

"Software for Automating Sales" First Virtual Holdings Incorporated 1996 [online] [Archived on www.web.archive.org on Nov. 4, 1996; Retrieved on Nov. 10, 2004] Retrieved from the internet <URL:http://web.archive/org/web/19961104180103/www.fv.com/tech/www.html>.

"Index to Technical Information" First Virtual Holdings Incorporated 1996 [online] [Archived on www.web.archive.org on Nov. 4, 1996; Retrieved on Nov. 10, 2004] Retrieved from the internet <URL:http://web.archive/org/web/19961104180020/www.fv.com/tech/index.html>.

Stein, L., et al., "The Green Commerce Model," May 1996, [online] [Archived on www.web.archive.org on Nov. 4, 1996; Retrieved on Nov. 10, 2004] Retrieved from the internet <URL:http:/web.archive.org/web/19961104175746/www.fv.com/pubdocs/green-model.txt>.

Rose, M., et al., The Simple MIME eXchange Protocol, May 1996, [online] [Archived on www.web.archive.org on Nov. 4, 1996; Retrieved on Nov. 10, 2004] Retrieved from the internet <URL:http://web.archive.org/web/19961104175839/www.fv.com/pubdocs/smxp-spec.txt>.

Document regarding use of websale.tcl, [online] [Archived on www.web.archive.org on Nov. 4, 1996; Retrieved on Nov. 10, 2004] Retrieved from the internet <URL:http:/web.archive.org/web/19961104180056/www.fv.com/tech/websale-doc.txt>.

"InfoHaus Guide," First Virtual Holdings Incorporated, May 1, 1996 [online] [Archived on www.web.archive.org on Nov. 4, 1996; Retrieved on Nov. 10, 2004] Retrieved from the internet <URL:http://web.archive.org/web/19961104174606/www.fv.com/guide/index.html>.

"InfoHaus Seller's Guide," Chapter Two, First Virtual I Internet Payment System, Revised May 1, 1996 [online] [Archived on www.web.archive.org on Nov. 4, 1996; Retrieved on Nov. 10, 2004] Retrieved from the internet <URL:http://web.archive/org/web/19961104175801/www.fv.com/pubdocs/infohaus-guide-2.txt>.

"InfoHaus Seller's Guide," Chapter Three, First Virtual I Internet Payment System, Revised May 1, 1996 [online] [Archived on www.web.archive.org on Nov. 4, 1996; Retrieved on Nov. 10, 2004]Retrieved from the internet <URL:http://web.archive/org/web/19961104175809/www.fv.com/pubdocs/infohaus-guide-3.txt>.

"InfoHaus Seller's Guide," Chapter Four, First Virtual I Internet Payment System, Revised May 1, 1996 [online] [Archived on www.web.archive.org on Nov. 4, 1996; Retrieved on Nov. 10, 2004] Retrieved from the internet <URL:http://web.archive/org/web/19961104175816/www.fv.com/pubdocs/infohaus-guide-4.txt>.

"InfoHaus Seller's Guide," Chapter Five, First Virtual I Internet Payment System, Revised May 1, 1996 [online] [Archived on www.web.archive.org on Nov. 4, 1996; Retrieved on Nov. 10, 2004] Retrieved from the internet <URL:http://web.archive/org/web/19961104175824/www.fv.com/pubdocs/infohaus-guide-5.txt>.

"The InfoHaus HelpMeister," First Virtual Holdings Incorporated 1996 [online] [Archived on www.web.archive.org on Nov. 4, 1996; Retrieved on Nov. 10, 2004] Retrieved from the internet <URL:http://web.archive/org/web/19961104175043/www.fv.com/infohaus/helpmeister/>.

"Adding Forms—Transactions," First Virtual Holdings Incorporated 1996 [online] [Archived on www.web.archive.org on Nov. 4, 1996; Retrieved on Nov. 10, 2004] Retrieved from the internet <URL:http://web.archive/org/web/19961104175210/www.fv.com/infohaus/helpmeister/email_p...>.

"Adding Forms—Customer Response," First Virtual Holdings Incorporated 1996 [online] [Archived on www.web.archive.org on Nov. 4, 1996; Retrieved on Nov. 10, 2004] Retrieved from the internet <URL:http://web.archive/org/web/19961104175202/www.fv.com/infohaus/helpmeister/email_fo...>.

"Buying Your Products Through E-mail," First Virtual Holdings Incorporated 1996 [online] [Archived on www.web.archive.org on Nov. 4, 1996; Retrieved on Nov. 10, 2004] Retrieved from the internet <URL:http://web.archive/org/web/19961104175350/www.fv.com/infohaus/helpmeister/quickbu...>.

"Contacting your Customers," First Virtual Holdings Incorporated 1996 [online] [Archived on www.web.archive.org on Nov. 4, 1996; Retrieved on Nov. 10, 2004] Retrieved from the internet <URL:http://web.archive/org/web/19961104175126/www.fv.com/infohaus/helpmeister/contact...>.

"How to Use Periodicals," First Virtual Holdings Incorporated 1996 [online] [Archived on www.web.archive.org on Nov. 4, 1996; Retrieved on Nov. 10, 2004] Retrieved from the internet <URL:http://web.archive/org/web/19961104175329/www.fv.com/infohaus/helpmeister/periodic...>.

"InfoHaus Fees for Sellers," First Virtual Holdings Incorporated 1996 [online] [Archived on www.web.archive.org on Nov. 4, 1996; Retrieved on Nov. 10, 2004] Retrieved from the internet <URL:http://web.archive/org/web/19961104175231/www.fv.com/infohaus/helpmeister/fees.html>.

"Designating Which VirtualPIN to Charge," First Virtual Holdings Incorporated 1996 [online] [Archived on www.web.archive.org on Nov. 4, 1996; Retrieved on Nov. 10, 2004] Retrieved from the internet <URL:http://web.archive/org/web/19961104175404/www.fv.com/infohaus/helpmeister/whichPI...>.

"If You Change Your E-mail Address," First Virtual Holdings Incorporated 1996 [online] [Archived on www.web.archive.org on Nov. 4, 1996; Retrieved on Nov. 10, 2004] Retrieved from the internet <URL:http://web.archive/org/web/19961104175155/www.fv.com/infohaus/helpmeister/email.html>.

"Changing Your Account Information," First Virtual Holdings Incorporated 1996 [online] [Archived on www.web.archive.org on Nov. 4, 1996; Retrieved on Nov. 10, 2004] Retrieved from the internet <URL:http://web.archive/org/web/19961104174624/www.fv.com/help/change.html>.

"Additional Messages for Accounting," First Virtual Holdings Incorporated 1996 [online] [Archived on www.web.archive.org on Nov. 4, 1996; Retrieved on Nov. 10, 2004] Retrieved from the internet <URL:http://web.archive/org/web/19961104175108/www.fv.com/infohaus/helpmeister/accounti...>.

"Terms and Conditions," First Virtual Holdings Incorporated 1996 [online] [Archived on www.web.archive.org on Nov. 4, 1996; Retrieved on Nov. 10, 2004] Retrieved from the internet <URL:http://web.archive/org/web/19961104175024/www.fv.com/info/terms.html>.

"First Virtual Operating Rules," Oct. 25, 1996 [online] [Archived on www.web.archive.org on Nov. 4, 1996; Retrieved on Nov. 10, 2004] Retrieved from the internet <URL:http://web.archive/org/web/19961104175832/www.fv.com/pubdocs/op-rules.txt>.

"Buyer's Agreement with First Virtual Holdings Incorporated," Dec. 16, 1995 [online] [Archived on www.web.archive.org on Nov. 4, 1996; Retrieved on Nov. 10, 2004] Retrieved from the internet <URL:http://web.archive/org/web/19961104175848/www.fv.com/pubdocs/tacs-buyer.txt>.

"Pioneer Seller's Agreement With First Virtual Holdings Incorporated," Oct. 25, 1996 [online] [Archived on www.web.archive.org on Nov. 4, 1996; Retrieved on Nov. 10, 2004] Retrieved from the internet <URL:http://web.archive/org/web/19961104175912/www.fv.com/pubdocs/tacs-pioneer.txt>.

"Express Seller's Agreement With First Virtual Holdings Incorporated," Oct. 25, 1996 [online] [Archived on www.web.archive.org on Nov. 4, 1996; Retrieved on Nov. 10, 2004] Retrieved from the internet <URL:http://web.archive/org/web/19961104175856/www.fv.com/pubdocs/tacs-express.txt>.

"Agreement on the use of the First Virtual InfoHaus," Dec. 16, 1995 [online] [Archived on www.web.archive.org on Nov. 4, 1996; Retrieved on Nov. 10, 2004] Retrieved from the internet <URL:http://web.archive/org/web/19961104175904/www.fv.com/pubdocs/tacs-inhaus.txt>.

"Test Account Application," First Virtual Holdings Incorporated [online] [Archived on www.web.archive.org on Nov. 4, 1996; Retrieved on Nov. 10, 2004] Retrieved from the internet <URL:http://web.archive/org/web/19961104175526/www.fv.com/newacct/testsetup.html>.

"First Virtual Account Application," First Virtual Holdings Incorporated 1996 [online] [Archived on www.web.archive.org on Nov. 4, 1996; Retrieved on Nov. 10, 2004] Retrieved from the internet <URL:http://web.archive/org/web/19961104175513/www.fv.com/newacct/index.html>.

"International Users Guide," First Virtual Holdings Incorporated 1996 [online] [Archived on www.web.archive.org on Nov. 4, 1996; Retrieved on Nov. 10, 2004] Retrieved from the internet <URL:http://web.archive/org/web/19961104174856/www.fv.com/info/intlinfo.html>.

"First Virtual General Information FAQ," Apr. 12, 1996 [online] [Archived on www.web.archive.org on Nov. 4, 1996; Retrieved on Nov. 10, 2004] Retrieved from the internet <URL:http://web.archive/org/web/19961104175635/www.fv.com/pubdocs/FAQ.txt>.

"First Virtual Signup FAQ," Apr. 24, 1996 [online] [Archived on www.web.archive.org on Nov. 4, 1996; Retrieved on Nov. 10, 2004] Retrieved from the internet <URL:http://web.archive/org/web/19961104175635/www.fv.com/pubdocs/FAQ.txt>.

"First Virtual Buying FAQ," Mar. 20, 1996 [online] [Archived on www.web.archive.org on Nov. 4, 1996; Retrieved on Nov. 10, 2004] Retrieved from the internet <URL:http://web.archive/org/web/19961104175542/www.fv.com/pubdocs/FAQ-buying.txt>.

"First Virtual Infohaus FAQ," Mar. 20, 1996 [online] [Archived on www.web.archive.org on Nov. 4, 1996; Retrieved on Nov. 10, 2004] Retrieved from the internet <URL:http://web.archive/org/web/19961104175618/www.fv.com/pubdocs/FAQ-selling.txt>.

"First Virtual Selling FAQ," Mar. 20, 1996 [online] [Archived on www.web.archive.org on Nov. 4, 1996; Retrieved on Nov. 10, 2004] Retrieved from the internet <URL:http://web.archive/org/web/19961104175549/www.fv.com/pubdocs/FAQ-infohaus.txt>.

"First Virtual Problems FAQ," Nov. 3, 1995 [online] [Archived on www.web.archive.org on Nov. 4, 1996; Retrieved on Nov. 10, 2004] Retrieved from the internet <URL:http://web.archive/org/web/19961104175603/www.fv.com/pubdocs/FAQ-problems.txt>.

"First Virtual International FAQ," Jul. 25, 1996 [online] [Archived on www.web.archive.org on Nov. 4, 1996; Retrieved on Nov. 10, 2004] Retrieved from the internet <URL:http://web.archive/org/web/19961104175556/www.fv.com/pubdocs/FAQ-international.txt>.

"First Virtual Background FAQ," Jul. 18, 1996 [online] [Archived on www.web.archive.org on Nov. 4, 1996; Retrieved on Nov. 10, 2004] Retrieved from the internet <URL:http://web.archive/org/web/19961104175535/www.fv.com/pubdocs/FAQ-background.txt>.

"First Virtual Security FAQ," Nov. 3, 1995 [online] [Archived on www.web.archive.org on Nov. 4, 1996; Retrieved on Nov. 10, 2004] Retrieved from the internet <URL:http://web.archive/org/web/19961104175610/www.fv.com/pubdocs/FAQ-security.txt>.

"Facts and Figures," First Virtual Holdings Incorporated, 1996, [online] [Archived on www.web.archive.org on Nov. 4, 1996; Retrieved on Nov. 10, 2004] Retrieved from the internet <URL:http://web.archive/org/web/19961104174239/www.fv.com/pubdocs/factsfigs.html>.

"First Virtual Corporate Brochure Inserts," First Virtual Holdings Incorporated, 1995, [online] [Archived on www.web.archive.org on Nov. 4, 1996; Retrieved on Nov. 10, 2004] Retrieved from the internet <URL:http://web.archive/org/web/19961104174306/www.fv.com/brochure/allinserts.html>.

"Pointers to Electronic Commerce Web Sites," 1996, Charles River Media, Inc.

"Software for Automating Sales," First Virtual Holdings Incorporated, 1996, [online] [Archived on www.web.archive.org on Nov. 4, 1996; Retrieved on Jan. 4, 2005] Retrieved from the internet <URL:http://web.archive/org/web/19961104175920/www.fv.com/selling/codesources.html>.

Rose, M., et al., "Listing for First Virtual," Draft of The Simple Green Commerce Protocol, Oct. 7, 1994, 8 Pages.

Stein, L., et al., Internet-Draft regarding "The Green Commerce Model," Oct. 1994.

Various Articles and Presentations from Spring Internet World '95, 1995.

Compact Disc of Various Source Codes regarding First Virtual dated prior to Sep. 12, 1997.

"Digital Cash Commerce on the Net," Wayner, P., with Compact Disc, 1996.

Loshin, P., "Selling Online With . . . First Virtual Holdings, Inc." with Compact Disc, 1996, 406 Pages, Charles River Media, Inc., Parts I and II were Previously cited in Supplemental Information Disclosure Statement filed May 5, 2009.

Guedes, P., et al., Writing a Client-Server Application in C++, in Proceedings of the USENIX C++ conference, 1992, 15 pages.

"COM/COBRA Interworking RFP Part A," Object Management Group, Aug. 3, 1995, 56 Pages.

Lewis, T., et al., "Where is Client/Server Software Headed?" Cybersquare, Apr. 1995, pp. 49-55.

Andrews, G., "Paradigms for Process Interaction in Distributed Programs," ACM Computing Surveys, Mar. 1991, pp. 49-90, vol. 23, No. 1.

Sinha, A., "Client-Server Computing-Time-Shared Computing," Communications of the ACM, Jul. 1992, pp. 77-98, vol. 35, No. 7.

Martin, B., "The Separation of Interface of Implementation in C++," Proceedings of the Third Usenix C++ Conference, Apr. 1991, 14 Pages.

"Methods," W3C:D, 1992, 1 Page.

Rumbaugh, J., et al., "Object-Oriented Modeling and Design," 1991, pp. 2, 3, 27.

The Common Object Request Broker: Architecture and Specification, Revision 2.0, Object Management Group Jul. 1995, 463 Pages.

The Common Object Request Broker: Architecture and Specification, Object Management Group, 1991, 174 Pages.

"Teletel Around the World," FT (Teletel International), 1990, 109 Pages.

Merz, M., et al., "Trusted Third-party Services in COSM," EM-Electronic Markets, Sep. 1994, No. 12, pp. 7-8.

Abadi, M. et al., "Authentication and Delegation with Smart-Cards," Report 67, Systems Research Center, Digital Equipment Corporation, Palo Alto, California, Oct. 22, 1990, revised Jul. 30, 1992, pp. 1-24.

Anderson, R., "Why Cryptosystems Fail." Proc. $1^{st}$ Conf. Computer and Comm. Security, pp. 215-227, Nov. 1993.

Aronson, D., "Access and session control," WWW-TALK thread, Sep. 15, 1994, 1 page.

Bieber, M., "Issues in Modeling a 'Dynamic' Hypertext Interface for NonHypertext Systems," Hypertext '91 Proceedings, Dec. 1991, pp. 203-217.

Bina E., et al., "Secure Access to Data over the Internet." Proc. Third Int'l IEEE Conf. on Parallel and Distributed Information Systems (Austin, TX) Sep. 28-30, 1994, pp. 99-102.

Bos et al., "SmartCash: A Practical Electronic Payment System," pp. 1-8, Aug. 1990.

Burk, H., et al., "Value Exchange Systems Enabling Security and Unobservability," Computers & Security, vol. 9, No. 8, pp. 715-721, 1990.

Chaum, D.L. et al., "Implementing Capability-Based Protection Using Encryption," Electronics Research Laboratory, College of Engineering, University of California, Berkeley, California, Jul. 17, 1978, 12 pages.

Chaum et al., "Untraceable Electronic Cash," Advances in Cryptology, pp. 319-327, 1988.

Choudhury, A., et al., "Copyright Protection for Electronic Publishing Over Computer Networks," IEEE Network, The Magazine of Computer Communications, vol. 9, No. 3, pp. 12-20, May 1995.

Cohen, Danny, "Electronic Commerce," University of Southern California Information Sciences Institute, Research Report ISIIRR-89-244, Oct. 1989, pp. 1095-1100.

Dukach, S., "SNPP: A Simple Network Payment Protocol," MIT Laboratory for Computer Science, Cambridge, Massachusetts, 1993, 7 pages.

English, J., "Re: Identifying Mosaic session," WWW-TALK thread, Dec. 21, 1994, 1 page.

Gifford, D., "Cryptographic Sealing for Information Secrecy and Authentication." Stanford University and Xerox Palo Alto Research Center, Communications of the ACM, vol. 25, No. 4, Apr. 1982, pp. 274-286.

Gifford, D., "Notes on Community Information Systems," MIT LCS TM-419, Dec. 1989, pp. 1-5.

Gligor, V. D. et al., "Object Migration and Authentication," IEEE Transactions on Software Engineering, vol. SE-5, No. 6, Nov. 1979, pp. 607-611.

Harty et al., "Case Study: The VISA Transaction Processing System," May 30, 1988, 12 pages.

Kiuchi, T., et al., "C-HTTP—The Development of a Secure, Closed HTTP based Network on the Internet," IEEE, 1996, pp. 64-75.

Krajewski, M., "Concept for a Smart Card Kerberos," $15^{th}$ National Computer Security Conference, Oct. 1992, 9 pages.

Krajewski, M., "Smart Card Augmentation of Kerberos." Privacy and Security Research Group Workshop on Network and Distributed System Security, Feb. 1993, 5 pages.

Krajewski, M. et al., "Applicability of Smart Cards to Network User Authentication" Computing Systems, vol. 7, No. 1,1994, pp. 75-89.

McCartney, T. D., email "Rhythm of The Pridelands Info," Nov. 21, 1994, also known as "CDNow.".

Medvinsky et al., "NetCash: A Design for Practical Electronic Currency on the Internet," Proc. $1^{st}$ ACM Conf. on Compo and Comm. Security, Nov. 1993, 5 pages.

Medvinsky et al. "Electronic Currency for the Internet," Electronic Markets, Sep. 1993, pp. 30-31.

Neuman, B.C., "Proxy-Based Authorization and Accounting for Distributed Systems," Proc. 13$^{th}$ Int. Conf. on Dist. Compo Systems, May 1993, pp. 283-291.

Pitkow, J., et al., "Results from the First World-Wide Web User Survey." Journal of Computer Networks and ISDN Systems, May 1994, 15 pages, vol. 27, No. 2.

Ramanathan, S., et al., "Architectures for Personalized Multimedia," IEEE Multimedia, vol. 1, No. 1, Computer Society, pp. 37-46, 1994.

Rescorla, E., et al., "The Secure HyperText Transfer Protocol," Enterprise Integration Technologies, Jun. 1994, 35 pages.

Rivest, R., "The MD5 Message-Digest Algorithm." MIT Laboratory for Computer Science and RSA Data Security, Inc., Apr. 1992, 20 pages.

Schamuller-Bichl, I., "IC-Cards in High-Security Applications," Selected Papers from the Smart Card 2000 Conference, Springer Verlag, pp. 177-199, 1991.

Voydock, V. et al., "Security Mechanisms in High-Level Network Protocols," Computer Surveys, vol. 15, No. 2, Jun. 1981, pp. 135-171.

Wiil, U., et al., "Hyperform: Using Extensibility to Develop Dynamic, Open and Distributed Hypertext Systems," Milano, Nov. 3-Dec. 4, 1992, pp. 251-281.

American National Standard: "Financial Institution Retail Message Authentication" ANSI X9.19, 1986, 40 pages.

Gifford, D., et al., "Case Study: The CIRRUS Banking Network," Comm. ACM 8, 28, pp. 797-807, Aug. 1985.

"International Standard: Bank Card Originated Messages Interchange Message Specifications—Content for Financial Transactions," International Organization for Standardization, ISO 8583, 1987, 36 pages.

"Mosaic Communications Unveils Network Navigator and Server Software for the Internet," Mosaic Communications Corp. press release, Sep. 12, 1994, 3 pages.

"Upgrading NCSA HTTPd," Aug. 1, 1995, [online] [Retrieved on Aug. 18, 2005] Retrieved from the Internet <URL:http://hoohoo.ncsa.uiuc.edu/docs/Upgrade.html>, 11 pages.

Bowen, C., et al., "How to get the most out of CompuServe," 5$^{th}$ Edition 1993, 495 pages.

"HTTP Request fields," W3C:D, 1992, 5 pages.

"Object Metalnformation," W3C:D, 1992, 7 pages.

"Request," W3C:D, 1992, 2 pages.

"Response," W3C:D, 1992, 1 page.

Flynn, M.J., et al., "Lecture Notes in Computer Science," Operating Systems an Advance Course, 1978, pp. 393-481.

Lampson, B., et al., "Crash Recovery in a Distributed Data Storage System," Jun. 1, 1979, 28 pages.

Skeen, D., "Nonblocking Commit Protocols," ACM, 1981, pp. 133-142.

"Apple Planning On-Line Shift," Jun. 26, 1995, The New York Times, 1 page.

Berson, A., "Client/Server Architecture," 1992, pp. 114-115, 140-145.

"Basic HTTP as defined in 1992," W3C:D, 1992, 3 pages.

Lan, Z., et al., "The Challenge of Teaching Information Technology Use and Management in a Time of Information Revolution," American Review of Public Administration, Jun. 1994, p. 207, vol. 24, No. 2.

Pathman, D. E., et al., "Medical Edcuation and the Retention of Rural Physicians," Health Services Research, Apr. 1994, p. 39, vol. 29, No. 1.

Anonymous, "Houston Firm Goes Begging to Stay Alive," St. Louis Post Dispatch, Five Star Edition, Business Section, May 19, 1988, p. 11D.

Ravindran, K., et al., "A Naming System for Feature-based Service Specification in Distributed Operating Systems," Proceedings of the 1991 SIGSMALL/PC Symposium on Small Systems published by ACM Press, 1991, pp. 12-21.

Birrell, A., et al., "Implementing Remote Procedures Calls," ACM Transactions on Computer Systems, Feb. 1984, p. 39-59, vol. 2, No. 1.

Hill, D., et al., "Internet Christmas Shoppers at Risk from Credit Card Fraud," Times of London, Features section, Oct. 19, 1997.

U.S. Appl. No. 11/751,483, filed May 26, 2009, 20 Pages.

Official Notice of Final Decision of Rejection for Japanese Patent Application No. 298,123/1999, Oct. 2, 2009, 6 pages (With English Translation).

Aikawa, N., "Windows 95 Trouble Rescue," DOS/V Power Report, Annex to Sep. '97, vol. 7, No. 9, pp. 29-30, Impress Corporation, Japan, Sep. 1, 1997 (Partial English Translation Attached).

Preston Gralla, "Best Web Tools," The Windows, Softbank Mobile Corp., vol. 7, No. 6, pp. 116-119, Japan, Jun. 1, 1997(Partial English Translation Attached).

Makoto Funakiri, "Beginner's JavaScript, 7$^{th}$, Cookie," C Magazine, Softbank Mobile Corp., vol. 9, No. 4, pp. 83-89, Japan, Apr. 1, 1997(Partial English Translation Attached).

"Privacy Is Not Protected on the Internet," Nikkei Personal Computing, Nikkei Business Publications, Inc., No. 284, pp. 343-350, Mar. 10, 1997(Partial English Translation Attached).

Microsoft Computer Dictionary Fourth Edition, "Definition of Log in," Circa 1999, p. 274.

"Internet," Wikipedia, Mar. 16, 2007, 15 pages, [online] [retrieved on Mar. 16, 2007] Retrieved from the Internet: <URL: http://en.wikipedia.org/wiki/Internet>. Previously cited as C49 in IDS filed Jan. 9, 2009.

Postel, J., "User Datagram Protocol," ISI, RFC 768, Aug. 28, 1980, 3 pages, [online] [retrieved on Mar. 16, 2007] Retrieved from the Internet: <URL: http://www.ietf.org/rfc/rfc0768.txt>. Previously cited as C104 in IDS filed Jan. 9, 2009.

Grandemange, A., "PageBox, 1-click prior art," PageBox.net, Feb. 7, 2006, 121 pages, [online] [retrieved on May 1, 2007] Retrieved from the Internet: http://pagebox.net/1clickpriorartForPrinters.html>. Previously cited as C111 in IDS filed Jan. 9, 2009.

"J-3100 Word/Excel Operation Manual," A1 Edition, Feb. 25, 1994, pp. 94-98. With English Summary. Previously cited as C171 in IDS filed Jan. 9, 2009.

"DA Information Services-Sorry," DA Information Services Pty Ltd., Oct. 1996, Added to the Wayback machine on Mar. 28, 1997, 1 page [online] [Retrieved on May 5, 2008] Retrieved from the internet <URL:http://web.archive.org/web/19970328212511/titlesearch.bookshop.dadirect.com.au/cgi-bin/da.exe/dab101%5eJBOH018RJBOHTCV7>. Previously cited as C199 in IDS filed Jan. 9, 2009.

Archived Usenet posts dated before Sep. 12, 1997, which refer to systems for ordering a virtual item in a computer game using a single action without the requirement to log in, Google Groups, Google Search, May 12, 1981-Sep. 12, 1997, 10 Pages. Previously cited as C244 in IDS filed Jan. 9, 2009.

Archived Usenet posts dated before Sep. 12, 1997, referring to interactive TV systems in which pay-per-view or TV shopping used a button with a "single action" to purchase, Google Groups, Google Search, May 12, 1981-Sep. 12, 1997, 10 Pages. Previously cited as C245 in IDS filed Jan. 9, 2009.

Archived Usenet posts dated before Sep. 12, 1997, referring to dialer programs in which a customer who wished to view certain content would click to view on a website or download a player, Google Groups, Google Search, May 12, 1981-Sep. 12, 1997, 27 pages. Previously cited as C246 in IDS filed Jan. 9, 2009.

Archived Usenet posts dated before Sep. 12, 1997, which refer to systems for ordering an item using a single action with the requirement to log in, Google Groups, Google Search, May 12, 1981-Sep. 12, 1997, 19 Pages. Previously cited as C247 in IDS filed Jan. 9, 2009.

Archived Usenet posts dated before Sep. 12, 1997, commenting on the OBI system referred to in the Statement of Case, Google Groups, Google Search, May 12, 1981-Sep. 12, 1997, 5 pages. Previously cited as C249 in IDS filed Jan. 9, 2009.

Archived Usenet posts dated before Sep. 12, 1997, describing the combination of orders placed within a certain time interval, Google Groups, Google Search, May 12, 1981-Sep. 12, 1997, 10 pages. Previously cited as C251 in IDS filed Jan. 9, 2009.

"Netscape White Papers," Netscape Merchant System White Paper, 1997, Added to the Wayback Machine on May 23, 1997, 25 Pages. [online] [Retrieved on Sep. 12, 2004] Retrieved from the internet:

<URL:http://www.archive.org/web/19970523141802/www.netscape.com/comprod/products/ia...> Previously cited as C252 in IDS filed Jan. 9, 2009.
Frost, S., "Extracts from Dadirect information services FoxPro code showing trolley logic and credit card usage," DA Direct, Jan. 1996, 9 Pages. Previously cited as C291 in IDS filed Jan. 9, 2009.
"Wednesday, Jan. 29th" PC Week Online, 1996, Added to the Wayback machine on Apr. 11, 1997, 3 Pages, [online] [Retrieved on Jun. 18, 2008] Retrieved from the internet <URL:http://web.archive.org/web/19970411081004/www.pcweek.com.au/p...>. Previously cited as C292 in IDS filed Jan. 9, 2009.
"Thursday, Sep. 26th" PC Week Online, 1996, Added to the Wayback machine on Apr. 11, 1997, 3 Pages, [online] [Retrieved on Jun. 18, 2008] Retrieved from the internet <URL:http://web.archive.org/web/19970411082633/www.pcweek.com.au/p...>. Previously cited as C293 in IDS filed Jan. 9, 2009.
"OM-Transact™: A Technical Overview," Open Market Technical White Paper, Dec. 10, 1996, pp. 1-23. Previously cited as C294 in IDS filed Jan. 9, 2009.
"Telstra Surelink™: Secure, convenient shopping: with Telstra Surelink™," 1997, 1 page, [online] [Retrieved on Jul. 23, 1997] Retrieved from the internet <URL:http://www.surelink.com.au/c0.htm>. Previously cited as C298 in IDS filed Jan. 9, 2009.
Harty et al., "Case Study: The VISA Transaction Processing System," May 30, 1988, 12 pages. (Best Available).
Medvinsky et al. "Electronic Currency for the Internet," Electronic Markets, Sep. 1993, pp. 30-31. (Best Available).
"International Standard: Bank Card Originated Messages Interchange Message Specifications—Content for Financial Transactions," International Organization for Standardization, ISO 8583, 1987, 36 pages. (Best Available).
Fielding, R., et al., Hypertext Transfer Protocol—HTTP/1.1, HTTP Working Group, Internet-Draft Request for Comments, Apr. 23, 1996, 118 Pages.
Fielding, R., et al., Hypertext Transfer Protocol—HTTP/1.1, HTTP Working Group, Internet-Draft Request for Comments, Jun. 1999, 114 Pages.
Fielding, R., et al., Hypertext Transfer Protocol—HTTP/1.1, HTTP Working Group, Internet-Draft Request for Comments, Nov. 22, 1995, 80 Pages.
Fielding, R., et al., Hypertext Transfer Protocol—HTTP/1.1, HTTP Working Group, Internet-Draft Request for Comments, Jun. 3, 1996, 105 Pages.
Fielding, R., et al., Hypertext Transfer Protocol—HTTP/1.1, HTTP Working Group, Internet-Draft Request for Comments, Aug. 12, 1996, 108 Pages.
Fielding, R., et al., Hypertext Transfer Protocol—HTTP/1.1, HTTP Working Group, Internet-Draft Request for Comments, Nov. 21, 1997, 112 Pages.
Fielding, R., et al., Hypertext Transfer Protocol—HTTP/1.1, HTTP Working Group, Internet-Draft Request for Comments, May 2, 1996, 108 Pages.
Berners-Lee, T., et. Al., Hypertext Transfer Protocol—HTTP/1.0, HTTP Working Group, Internet-Draft Request for Comments, Mar. 8, 1995, 61 Pages.
Berners-Lee, T., et. Al., Hypertext Transfer Protocol—HTTP/1.0, HTTP Working Group, Internet-Draft Request for Comments, Aug. 3, 1995, 68 Pages.
Berners-Lee, T., et. Al., Hypertext Transfer Protocol—HTTP/1.0, HTTP Working Group, Internet-Draft Request for Comments, Aug. 13, 1995, 46 Pages.
Berners-Lee, T., et. Al., Hypertext Transfer Protocol—HTTP/1.0, HTTP Working Group, Internet-Draft Request for Comments, Sep. 4, 1995, 47 Pages.
Berners-Lee, T., et. Al., Hypertext Transfer Protocol—HTTP/1.0, HTTP Working Group, Internet-Draft Request for Comments, Oct. 14, 1995, 49 Pages.
Berners-Lee, T., et. Al., Hypertext Transfer Protocol—HTTP/1.0, HTTP Working Group, Internet-Draft Request for Comments, Nov. 1995, 78 Pages.
Berners-Lee, T., et. Al., Hypertext Transfer Protocol—HTTP/1.0, HTTP Working Group, Internet-Draft Request for Comments, May 1996, 60 Pages.
Berners-Lee, T., et. Al., Hypertext Transfer Protocol—HTTP/2.0, HTTP Working Group, Internet-Draft Request for Comments, May 6, 1995, 87 Pages.
Berners-Lee, T., et. Al., Hypertext Transfer Protocol—HTTP/2.0, HTTP Working Group, Internet-Draft Request for Comments, May 31, 1995, 86 Pages.
Berners-Lee, T., et. Al., Hypertext Transfer Protocol—HTTP/2.0, HTTP Working Group, Internet-Draft Request for Comments, Jun. 16, 1995, 167 Pages.
Berners-Lee, T., et. Al., Hypertext Transfer Protocol—HTTP/2.0, HTTP Working Group, Internet-Draft Request for Comments, Aug. 8, 1995, 143 Pages.
Berners-Lee, T., et. Al., Hypertext Transfer Protocol—HTTP/2.0, HTTP Working Group, Internet-Draft Request for Comments, Nov. 28, 1994, 97 Pages.
Berners-Lee, T., et. Al., Hypertext Transfer Protocol—HTTP/2.0, HTTP Working Group, Internet-Draft Request for Comments, Feb. 8, 1995, 81 Pages.
Borenstein, M., et al., "The application/green-commerce MIME Content-type," Network Working Group, First Virtual Holdings, Oct. 1994, 78 Pages.
Borenstein, M., et al., "The application/green-commerce MIME Content-type," Network Working Group, First Virtual Holdings, Jun. 1995, 71 Pages.
Borenstein, M., et al., "The application/green-commerce MIME Content-type," Network Working Group, First Virtual Holdings, Oct. 2, 1996, 103 Pages.
Kristol, D., et al., Proposed HTTP State Management Mechanism, HTTP Working Group, Internet-Draft Request for Comments, AT&T Bell Laboratories, Aug. 25, 1995, 8 Pages.
Kristol, D., et al., Proposed HTTP State Management Mechanism, HTTP Working Group, Internet-Draft Request for Comments, Netscape Communications, Feb. 16, 1996, 8 Pages.
Kristol, D., et al., Proposed HTTP State Management Mechanism, HTTP Working Group, Internet-Draft Request for Comments, Netscape Communications, Feb. 19, 1996, 9 Pages.
Kristol, D., et al., Proposed HTTP State Management Mechanism, HTTP Working Group, Internet-Draft Request for Comments, Netscape Communications, Feb. 21, 1996, 10 Pages.
Kristol, D., et al., Proposed HTTP State Management Mechanism, HTTP Working Group, Internet-Draft Request for Comments, Netscape Communications, Feb. 22, 1996, 11 Pages.
Kristol, D., et al., Proposed HTTP State Management Mechanism, HTTP Working Group, Internet-Draft Request for Comments, Netscape Communications, Aug. 25, 1995, 5 Pages.
Kristol, D., et al., Proposed HTTP State Management Mechanism, HTTP Working Group, Internet-Draft Request for Comments, Netscape Communications, Apr. 15, 1996, 12 Pages.
Kristol, D., et al., Proposed HTTP State Management Mechanism, HTTP Working Group, Internet-Draft Request for Comments, Netscape Communications, Apr. 15, 1996, 13 Pages.
Kristol, D., et al., Proposed HTTP State Management Mechanism, HTTP Working Group, Internet-Draft Request for Comments, Netscape Communications, Apr. 25, 1996, 12 Pages.
Kristol, D., et al., Proposed HTTP State Management Mechanism, HTTP Working Group, Internet-Draft Request for Comments, Netscape Communications, Apr. 22, 1996, 12 Pages.
Kristol, D., et al., Proposed HTTP State Management Mechanism, HTTP Working Group, Internet-Draft Request for Comments, Netscape Communications, Jun. 13, 1996, 12 Pages.
Kristol, D., et al., Proposed HTTP State Management Mechanism, HTTP Working Group, Internet-Draft Request for Comments, Netscape Communications, Jul. 19, 1996, 13 Pages.
Kristol, D., et al., Proposed HTTP State Management Mechanism, HTTP Working Group, Internet-Draft Request for Comments, Netscape Communications, Nov. 1, 1996, 13 Pages.
Gramlich, W., "Annotation Types," 1994, 1 page [online] [Archived on May 2, 1997; Retrieved on Nov. 25, 2008] Retrieved from the internet <URL: http://web.archive.org/web/19970502123755/playground.sun.com/~gramlich/1994/annote/issues/types.html >.
Gramlich, W., "Authoring," 1994, 1 page [online] [Archived on May 2, 1997; Retrieved on Nov. 25, 2008] Retrieved from the internet <URL:http://web.archive.org/web/19970502123812/playground.sun.com/~gramlich/1994/annote/issues/authoring.html>.

Gramlich, W., "Deployment," 1994, 1 page [online] [Archived on May 2, 1997; Retrieved on Nov. 25, 2008] Retrieved from the internet <URL:http://web.archive.org/web/19970502123819/playgrou...n.com/~gramlich/1994/annote/issues/deployment.html>.

Gramlich, W., "HTML Extensions," 1994, 1 page [online] [Archived on May 2, 1997; Retrieved on Nov. 25, 2008] Retrieved from the internet <URL:http://web.archive.org/web/19970502123826/playground.sun.com/~gramlich/1994/annote/issues/html.html>.

Gramlich, W., "In-Line Annotations," 1994, 1 page [online] [Archived on May 2, 1997; Retrieved on Nov. 25, 2008] Retrieved from the internet <URL:http://web.archive.org/web/19970502123833/playground.sun.com/~gramlich/1994/annote/issues/inline.html>.

Gramlich, W., "Moderation," 1994, 2 pages [online] [Archived on May 2, 1997; Retrieved on Nov. 25, 2008] Retrieved from the internet <URL:http://web.archive.org/web/19970502123842/play...m/~gramlich/1994/annote/issues/moderation.html >.

Gramlich, W., "Notification," 1994, 1 page [online] [Archived on May 2, 1997; Retrieved on Nov. 25, 2008] Retrieved from the internet <URL:http://web.archive.org/web/19970502123850/playgroun...com/~gramlich/1994/annote/issues/notification.html>.

Gramlich, W., "Scalability/Latency," 1994, 1 page [online] [Archived on May 2, 1997; Retrieved on Nov. 25, 2008] Retrieved from the internet <URL:http://web.archive.org/web/19970502123857/playgroun..n.com /~gramlich/1994/annote/issues/scalability.html>.

Gramlich, W., "Storage," 1994, 2 pages [online] [Archived on May 2, 1997; Retrieved on Nov. 25, 2008] Retrieved from the internet <URL:http://web.archive.org/web/19970502123904/playg...n.com/~gramlich/1994/annote/issues/storage.html>.

Gramlich, W., "Voting/Rating," 1994, 2 Pages [online] [Archived on May 2, 1997; Retrieved on Nov. 25, 2008] Retrieved from the internet <URL:http://web.archive.org/web/19970502123918/play...un.com/~gramlich/1994/annote/issues/voting.html >.

Markhoff, J., "Company News: A Credit Card for On-Line Sprees," The New York Times, Oct. 15, 1994, 3 pages.

"First Virtual: Buying—complete details," First Virtual Holdings Incorporated, 1996, 6 pages [online] [Archived on www.web.archive.org on Nov. 4, 1996; Retrieved on Nov. 1, 2004] Retrieved from the internet <URL:http:/web.archive.org/web/19961104174814/www.fv.com/info/buyerdetails.html>.

"Account Application Help," First Virtual Holdings Incorporated 1996 [online] [Archived on www.web.archive.org on Nov. 4, 1996; Retrieved on Nov. 10, 2004] Retrieved from the internet <URL:http://web.archive/org/web/19961104175520/www.fv.com/newacct/setup_help.html>.

Ingram, C., et al., "Krakatoa Chronicle Design Document," Feb. 26, 1996, total of 260 pages [online] [Retrieved on Feb. 10, 2009] Retrieved from the internet <URL:http://www.cc.gatech.edu/classes/cs3302_96winter/projects/groups/Krakatoa/design.html>.

Notice of Intent to Issue Ex Parte Reexamination Certificate, U.S. Appl. No. 90/007,946, U.S. Patent No. 5,960,411, Mar. 2, 2010.

"The Web Maestro: An Interview with Tim Berners-Lee," MIT Technology Review, Jul. 1996, 11 pages. (Previously submitted).

Heins, M., "MiniVend—Multi-Catalog Shopping Cart and Mall," Online MiniVend Reference Guide, pp. 1-194, [online] [retrieved on Dec. 30, 2003] Retrieved from the Internet: <URL: http://www.snowcrest.net/cgi/catalog01/minivend.html>. [Also cited as "MiniVend—Multi-Catalog Shopping Cart and Mall," Online Minivend Reference Guide and "Online Minivend Reference Guide—Multi-Catalog Shopping Cart and Mall," Mar. 14, 1997] (Previously submitted).

Ketchpel, S. P., et al., "Shopping Models: A Flexible Architecture for Information Commerce," Proceedings of the 2nd ACM International Conference on Digital Libraries, Jul. 25-28, 1997, pp. 65-74. (Previously submitted).

Swift, T., "The Everchanging Marketplace: From the Neighborhood Grocery to the Hyperstores of Today," The Forum, Aug. 18, 1999, 7 pages, [online] [retrieved on Dec. 30, 2003] Retrieved from the Internet: <URL: http://www.in-forum.com/specials/century/jan3/week34.html>. (Previously submitted).

Tarsala, M., "OpenTV Claims 'One Click' Technology Rights," CBS MarketWatch, Oct. 5, 2000, 2 page. (Previously submitted).

Wasserman, E., "Close is Enough to Earn Amazon's Bounty," PC World, Mar. 16, 2001, 1 pages, [online] [retrieved on Dec. 8, 2009] Retrieved from the Internet: <URL: http://www.pcworld.com/resource/printable/article/0,aid,44702,00.asp>. (Previously submitted).

Extended European Search Report for European Patent Application No. EP 10012803.2, Feb. 11, 2011, 6 pages.

Adobe Type Manager® version 3.01 for Windows, Release Notes, Oct. 6, 1994, 6 Pages.

ATM® 3.01 for Windows, Technical Reference Guide, Oct. 6, 1994, 17 Pages.

"Internet Billing Server," Information Network Institute, Carnegie Mellon University, Prototype Scope Document, Oct. 14, 1993, 29 pages.

"Description of Shopping Cart Options," The Online Exchange, Inc., Aug. 28, 1997, 1 page, [online] [retrieved on Dec. 8, 2009] Retrieved from the Internet: <URL: http://web.archive.org/web/20010517041004/www.onlinex.com/>.

Summary of Applicant's Submissions, filed by Amazon.com, Inc. on Feb. 7, 2011, Australian Patent Application No. 762175, 99 Pages.

Amended Summary of Applicant's Submissions, filed by Amazon.com, Inc. on Feb. 10, 2011, Australian Patent Application No. 762175, 108 Pages.

Outline of Submissions on Behalf of Telstra Corporation, filed on Feb. 10, 2011, Australian Patent Application No. 762175, 71 Pages.

Communication pursuant to Article 94(3) EPC, European Patent Application No. EP 10012803.2, Apr. 11, 2011, 4 Pages.

Decision from Intellectual Property Office of New Zealand, for Opposition of Patent Application No. 503311, mailed Jul. 21, 2011, 60 Pages.

"Respondent's Memorandum of Fact and Law," Filed by Respondent Amazon.com, Inc., file on Apr. 4, 2011, Federal Court of Appeal Court File No. A-435-10, 47 pages.

Official Notice of Rejection mailed on Sep. 13, 2011 for Japanese Patent Application No. 2010-021455, 9 Pages.

Interrogation for Japanese Patent Application No. 298,123/1999, Appeal No. 2010-002268, mailed Jun. 24, 2011, 6 pages.

Takeuchi, Y., et al., "MMOD and Cybermall System," NEC Technical Report vol. 49, No. 7, Jul. 30, 1996, pp. 162-168, vol. 49, No. 7.

Wada, F., "Credit Cards & Tele-marketing Service in the U.S.," CardWave, Aug. 10, 1995, pp. 45-48, vol. 8, No. 9.

Decision to Grant a Patent for Japanese Patent Application No. JP 2010-021455 mailed Mar. 9, 2012, 6 pages.

* cited by examiner

105 {
Thank you for your 1-Click order!

A quantity of 1 of [the item] will be shipped to you as soon as possible. We will do our best to minimize your shipping costs by combining your 1-Click orders into as few shipments a possible.

Please continue browsing.

Review or change your 1-Click orders
}

101 { Summary description of item }

*Fig. 1B*

Summary of 1-Click express orders

Press this button if you [changed quantities] of any item below. If you don't press it, your changes won't "stick."
You can set the quantity to 0 (zero) to cancel an item.

The 1-Click order below (available in 3 or fewer days) will be shipped together.

106 {
Order# 098337

| | | |
|---|---|---|
| [1] | Item 1 | $ 10.00 |
| [1] | Item 2 | $ 15.00 |
| | Total | $ 25.00 |

The 1-Click orders below (available in one week or more) will be shipped together.

107 {
Order# 098336

| | | |
|---|---|---|
| [1] | Item 3 | $ 20.00 |
| [1] | Item 4 | $  6.00 |
| | Total | $ 26.00 |

108 {
Ship to:            John Doe at home

Shipment method:    Standard domestic shipping

Payment method:     **__*1_2345

[continue shopping]

1-Click express shipping policies

*Fig. 1C*

START

A: Customer Name & Address

B: Customer Financial Info

C: Customer Employment Info

D: Customer Education Info

A: First Name :　[　　　　　　　]

M.I. :　[　]

Last Name :　[　　　　　　　]

Street :　[　　　　　　　　　]

City :　[　　　　　　]

State :　[　]　　Zip :　[　　]

[Next]　[Previous]

B: Customer Financial Info

C: Customer Employment Info

D: Customer Education Info

A: Customer Name & Address

B: Net Worth:

Annual Income:

Spouse's Annual Income:

Other Income:

[ Next ]   [ Previous ]

C: Customer Employment Info

D: Customer Education Info

COMBINING DISPARATE PURCHASES INTO A SINGLE PURCHASE ORDER FOR BILLING AND SHIPMENT

CROSS-REFERENCE TO RELATED APPLICATION(S)

This application is a continuation of U.S. patent application Ser. No. 09/318,447, filed on May 25, 1999, which is a continuation of U.S. patent application Ser. No. 08/928,951, filed Sep. 12, 1997 (now U.S. Pat. No. 5,960,411), which applications are incorporated by reference herein in their entireties.

TECHNICAL FIELD

The present invention relates to a computer method and system for placing an order and, more particularly, to a method and system for ordering items over the Internet.

BACKGROUND OF THE INVENTION

The Internet comprises a vast number of computers and computer networks that are interconnected through communication links. The interconnected computers exchange information using various services, such as electronic mail, Gopher, and the World Wide Web ("WWW"). The WWW service allows a server computer system (i.e., Web server or Web site) to send graphical Web pages of information to a remote client computer system. The remote client computer system can then display the Web pages. Each resource (e.g. computer or Web page) of the WWW is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports that Web page. When that Web server receives the request, it sends that Web page to the client computer system. When the client computer system receives that Web page, it typically displays the Web page using a browser. A browser is a special-purpose application program that effects the requesting of Web pages and the displaying of Web pages.

Currently, Web pages are typically defined using HyperText Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

The World Wide Web is especially conducive to conducting electronic commerce. Many Web servers have been developed through which vendors can advertise and sell product. The products can include items (e.g., music) that are delivered electronically to the purchaser over the Internet and items (e.g., books) that are delivered through conventional distribution channels (e.g., a common carrier). A server computer system may provide an electronic version of a catalog that lists the items that are available. A user, who is a potential purchaser, may browse through the catalog using a browser and select various items that are to be purchased. When the user has completed selecting the items to be purchased, the server computer system then prompts the user for information to complete the ordering of the items. This purchaser-specific order information may include the purchaser's name, the purchaser's credit card number, and a shipping address for the order. The server computer system then typically confirms the order by sending a confirming Web page to the client computer system and schedules shipment of the items.

Since the purchaser-specific order information contains sensitive information (e.g., a credit card number), both vendors and purchasers want to ensure the security of such information. Security is a concern because information transmitted over the Internet may pass through various intermediate computer systems on its way to its final destination. The information could be intercepted by an unscrupulous person at an intermediate system. To help ensure the security of the sensitive information, various encryption techniques are used when transmitting such information between a client computer system and a server computer system. Even though such encrypted information can be intercepted, because the information is encrypted, it is generally useless to the interceptor. Nevertheless, there is always a possibility that such sensitive information may be successfully decrypted by the interceptor. Therefore, it would be desirable to minimize the sensitive information transmitted when placing an order.

The selection of the various items from the electronic catalogs is generally based on the "shopping cart" model. When the purchaser selects an item from the electronic catalog, the server computer system metaphorically adds that item to a shopping cart. When the purchaser is done selecting items, then all the items in the shopping cart are "checked out" (i.e., ordered) when the purchaser provides billing and shipment information. In some models, when a purchaser selects any one item, then that item is "checked out" by automatically prompting the user for the billing and shipment information. Although the shopping cart model is very flexible and intuitive, it has a downside in that it requires many interactions by the purchaser. For example, the purchaser selects the various items from the electronic catalog, and then indicates that the selection is complete. The purchaser is then presented with an order Web page that prompts the purchaser for the purchaser-specific order information to complete the order. That Web page may be prefilled with information that was provided by the purchaser when placing another order. The information is then validated by the server computer system, and the order is completed. Such an ordering model can be problematic for a couple of reasons. If a purchaser is ordering only one item, then the overhead of confirming the various steps of the ordering process and waiting for, viewing, and updating the purchaser-specific order information can be much more than the overhead of selecting the item itself. This overhead makes the purchase of a single item cumbersome. Also, with such an ordering model, each time an order is placed sensitive information is transmitted over the Internet. Each time the sensitive information is transmitted over the Internet, it is susceptible to being intercepted and decrypted.

SUMMARY OF THE INVENTION

An embodiment of the present invention provides a method and system for ordering an item from a client system. The client system is provided with an identifier that identifies a customer. The client system displays information that identifies the item and displays an indication of an action (e.g., a single action such as clicking a mouse button) that a purchaser is to perform to order the identified item. In response to the indicated action being performed, the client system sends to a server system the provided identifier and a request to order the identified item. The server system uses the identifier to identify additional information needed to generate an order for the item and then generates the order.

The server system receives and stores the additional information for customers using various computer systems so that the server system can generate such orders. The server system stores the received additional information in association with an identifier of the customer and provides the identifier to the client system. When requested by the client system, the server system provides information describing the item to the requesting client system. When the server system receives a request from a client system, the server system combines the additional information stored in association with the identifier included in the request to effect the ordering of the item.

BRIEF DESCRIPTION OF THE DRAWINGS

FIGS. 1A-1C illustrate single-action ordering in one embodiment of the present invention.

FIGS. 8A-8C illustrate a hierarchical data entry mechanism in one embodiment.

DETAILED DESCRIPTION OF THE INVENTION

The present invention provides a method and system for single-action ordering of items in a client/server environment. The single-action ordering system of the present invention reduces the number of purchaser interactions needed to place an order and reduces the amount of sensitive information that is transmitted between a client system and a server system. In one embodiment, the server system assigns a unique client identifier to each client system. The server system also stores purchaser-specific order information for various potential purchasers. The purchaser-specific order information may have been collected from a previous order placed by the purchaser. The server system maps each client identifier to a purchaser that may use that client system to place an order. The server system may map the client identifiers to the purchaser who last placed an order using that client system. When a purchaser wants to place an order, the purchaser uses a client system to send the request for information describing the item to be ordered along with its client identifier. The server system determines whether the client identifier for that client system is mapped to a purchaser. If so mapped, the server system determines whether single-action ordering is enabled for that purchaser at that client system. If enabled, the server system sends the requested information (e.g., via a Web page) to the client computer system along with an indication of the single action to perform to place the order for the item. When single-action ordering is enabled, the purchaser need only perform a single action (e.g., click a mouse button) to order the item. When the purchaser performs that single action, the client system notifies the server system. The server system then completes the order by adding the purchaser-specific order information for the purchaser that is mapped to that client identifier to the item order information (e.g., product identifier and quantity). Thus, once the description of an item is displayed, the purchaser need only take a single action to place the order to purchase that item. Also, since the client identifier identifies purchaser-specific order information already stored at the server system, there is no need for such sensitive information to be transmitted via the Internet or other communications medium.

Figure 1A:
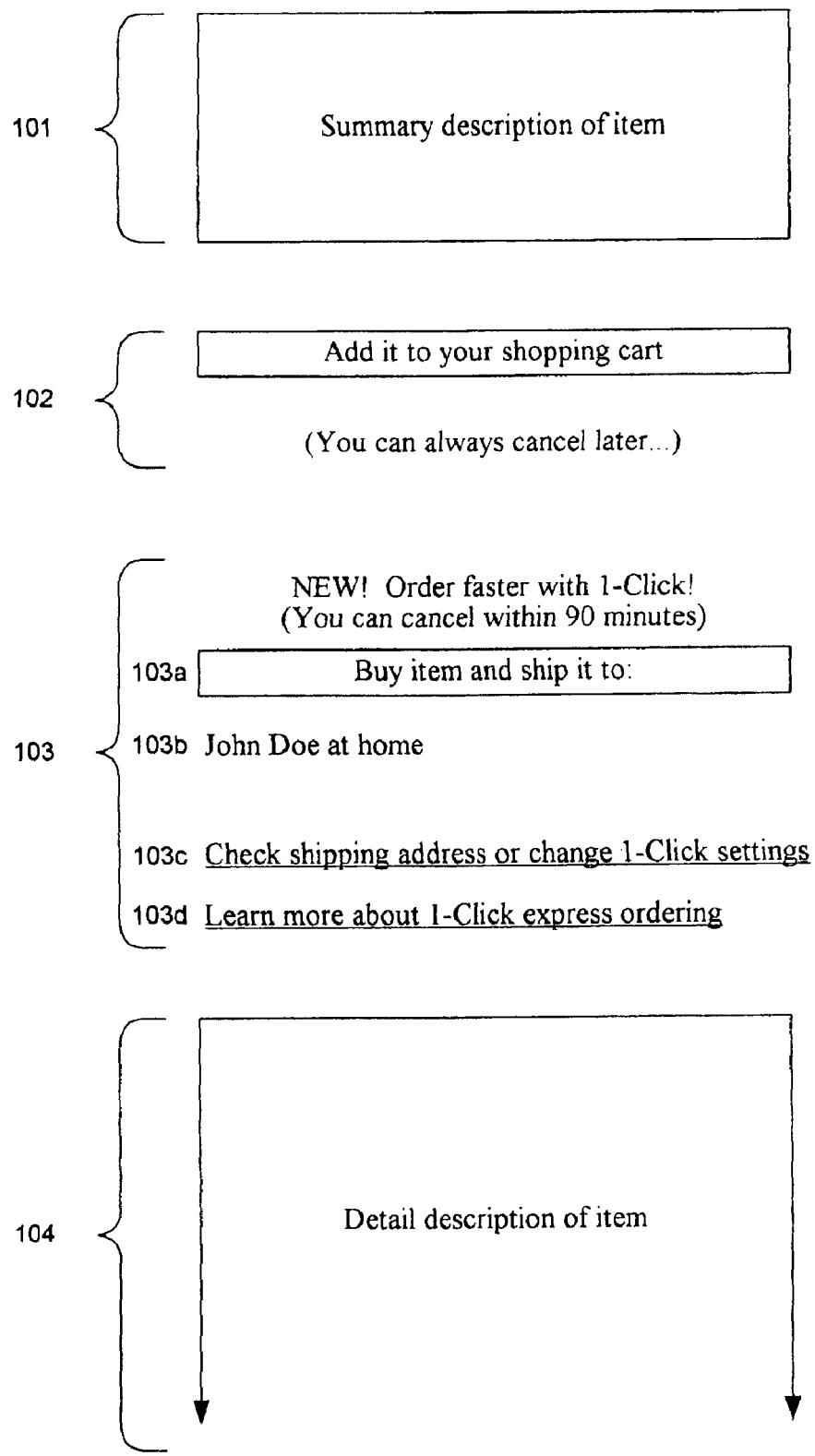

FIGS. 1A-1C illustrate single-action ordering in one embodiment of the present invention. FIG. 1A illustrates the display of a Web page describing an item that may be ordered. This example Web page was sent from the server system to the client system when the purchaser requested to review detailed information about the item. This example Web page contains a summary description section 101, a shopping cart section 102, a single-action ordering section 103, and a detailed description section 104. One skilled in the art would appreciate that these various sections can be omitted or rearranged or adapted in various ways. In general, the purchaser need only be aware of the item or items to be ordered by the single action and of the single action needed to place the order. The summary description and the detailed description sections provide information that identifies and describes the item(s) that may be ordered. The shopping cart section provides the conventional capability to add the described item to a shopping cart. The server system adds the summary description, the detailed description, and the shopping cart sections to each Web page for an item that may be ordered. The server system, however, only adds the single-action ordering section when single-action ordering is enabled for that purchaser at that client system. (One skilled in the art would appreciate that a single Web page on the server system may contain all these sections but the single-action ordering section can be selectively included or excluded before sending the Web page to the client system.) This example single-action ordering section allows the purchaser to specify with a single click of a mouse button to order the described item. Once the purchaser clicks the mouse button, the item is ordered, unless the purchaser then takes some action to modify the order. The single-action ordering section contains a single-action ordering button 103a, purchaser identification subsection 103b, and single-action ordering information subsections 103c and 103d. The purchaser information subsection displays enough information so that the purchaser can verify that the server system correctly recognizes the purchaser. To reduce the chances of sensitive information being intercepted, the server system sends only enough information so that the purchaser is confident that the server system correctly identified the purchaser but yet not enough information to be useful to an unscrupulous interceptor. The additional information subsections allow the purchaser to obtain various settings or obtain more information related to the single-action ordering. If the purchaser wants to verify the shipping address, the purchaser can select the "check shipping address" label. In response to this selection, the server system may require the purchaser to perform a "login" so that the identity of the purchaser can be verified before the shipping information is viewed or modified. The server system then sends a Web page to the client system for display and possible modification of the shipping address. In this way, the transmitting of the sensitive shipping address can be avoided unless requested by the verified purchaser.

When the purchaser selects the single-action ordering button, the client system sends a message to the server system requesting that the displayed item be ordered. After the server system processes the message, the server system provides to the client system a new Web page that confirms receipt of the single-action order. FIG. 1B illustrates the display of a Web page confirming a single-action order. The confirming Web page contains essentially the same information as the Web page describing the item (i.e., FIG. 1A) except that an order confirmation section 105 is displayed at the top of the Web page. The order confirmation section confirms that the order has been placed and provides an opportunity for the purchaser to review and change the single-action order. Alternatively, the confirming Web page can be identical to the Web page describing the item (i.e., FIG. 1A), except that the single-action ordering button is replaced with a message confirming the order.

If a single-action ordering is not currently enabled for the client system but could be enabled, then the server system can generate a Web page like FIG. 1A, except that the single-action ordering button 103a is replaced by a single-action ordering enable button. Such a replacement button could contain text instructing the purchaser to click on the button to enable single-action ordering. When the purchaser clicks on that button, the server system would send the Web page of FIG. 1A to be displayed. Single-action ordering can be enabled whenever the server system has stored sufficient purchaser-specific order information for that client system to complete a single-action order. If the server system does not have sufficient information, then when the purchaser selects the single-action ordering button, the server system can provide a Web page to collect the additional information that is needed. The server system may require the purchases to "login" so that the identify of the purchaser can be verified before the single-action ordering is enabled.

To help minimize shipping costs and purchaser confusion, the server system may combine various single-action orders into a multiple-item order. For example, if a purchaser orders one item using the single-action ordering and five minutes later orders another item using the single-action ordering, then those orders may be cost effectively combined into a single order for shipping. The server system combines the single-action orders when their expected ship dates are similar. For example, if one item is immediately available and the other item will be available in one day, then the two single-action orders may be cost-effectively combined. However, if the other item will not be available for two weeks, then the two single-item orders would not be combined. FIG. 1C illustrates the display of a Web page representing four single-action orders that have been combined into two separate multiple-item orders based on the availability of the items. The order information 106 indicates that item 1 and item 2, which will be available in three or fewer days, have been combined into one order. The order information 107 indicates that items 3 and 4, which will not be available within one week, are combined into a separate order. In one embodiment, the server system may combine single-action orders that are placed within a certain time period (e.g., 90 minutes). Also, the server system may combine or divide orders when the orders are scheduled for shipment based on the then current availability of the items ordered. This delayed modification of the orders is referred to as "expedited order selection" and is described below in detail.

Figure 2:
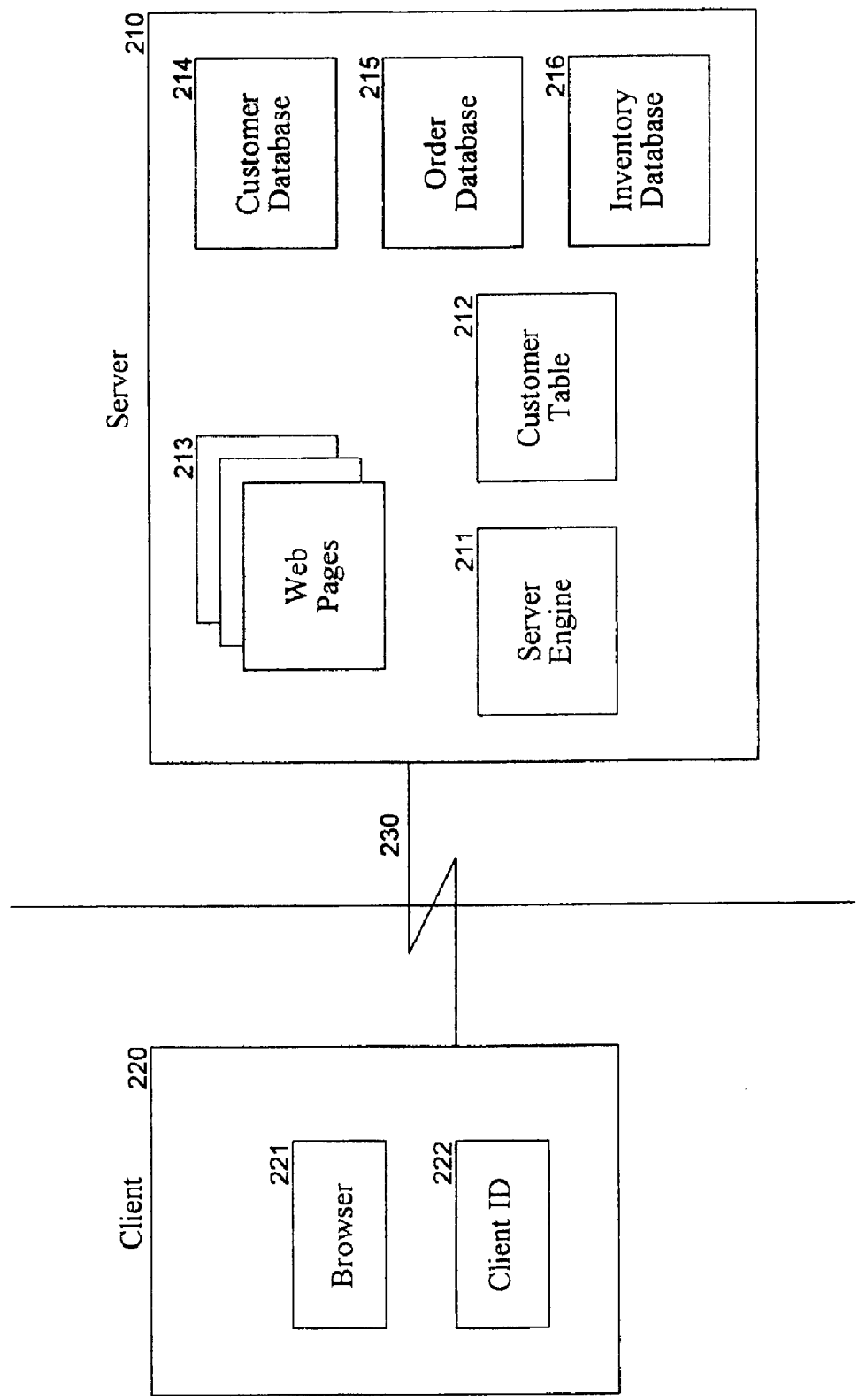
FIG. 2 is a block diagram illustrating an embodiment of the present invention.

FIG. 2 is a block diagram illustrating an embodiment of the present invention. This embodiment supports the single-action ordering over the Internet using the World Wide Web. The server system 210 includes a server engine 211, a client identifier/customer table 212, various Web pages 213, a customer database 214, an order database 215, and an inventory database 216. The server engine receives HTTP requests to access Web pages identified by URLs and provides the Web pages to the various client systems. Such an HTTP request may indicate that the purchaser has performed the single action to effect single-action ordering. The customer database contains customer information for various purchasers or potential purchasers. The customer information includes purchaser-specific order information such as the name of the customer, billing information, and shipping information. The order database 215 contains an entry for each order that has not yet been shipped to a purchaser. The inventory database 216 contains a description of the various items that may be ordered. The client identifier/customer table 212 contains a mapping from each client identifier, which is a globally unique identifier that uniquely identifies a client system, to the customer last associated with that client system. The client system 220 contains a browser and its assigned client identifier. The client identifier is stored in a file, referred to as a "cookie." In one embodiment, the server system assigns and sends the client identifier to the client system once when the client system first interacts with the server system. From then on, the client system includes its client identifier with all messages sent to the server system so that the server system can identify the source of the message. The server and client systems interact by exchanging information via communications link 230, which may include transmission over the Internet.

One skilled in the art would appreciate that the single-action ordering techniques can be used in various environments other than the Internet. For example, single-action ordering can also be in an electronic mail environment in which an item is described in an electronic mail message along with an indication of the single action that is to be performed to effect the ordering of the item. Also, various communication channels may be used such as local area network, wide area network, or point-to-point dial up connection. Also, a server system may comprise any combination of hardware or software that can generate orders in response to the single action being performed. A client system may comprise any combination of hardware or software that can interact with the server system. These systems may include television-based systems or various other consumer products through which orders may be placed.

Figure 3:
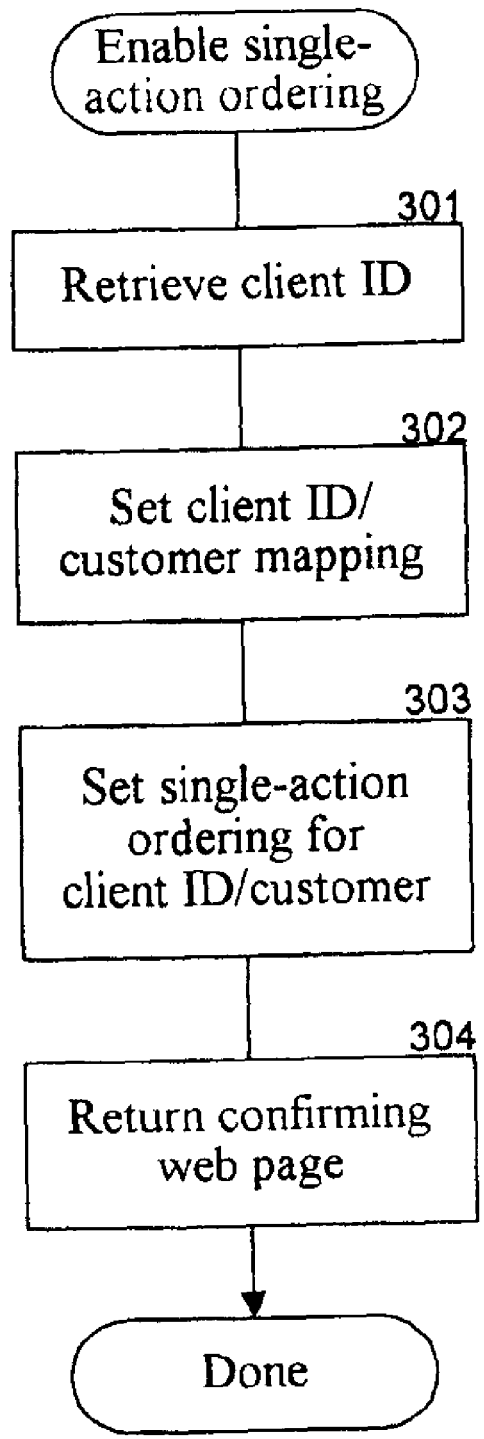
FIG. 3 is a flow diagram of a routine that enables single-action ordering for a customer.

FIG. 3 is a flow diagram of a routine that enables single-action ordering for a customer. To enable single-action ordering, a server system needs to have information about the customer that is equivalent to the purchaser-specific order information. The server system can obtain this information in various ways. First, the server system could ask the customer if they would like to have single-action ordering enabled. If so, then the server system could prompt the customer using a Web page for the purchaser-specific order information. Second, the server system could also save the purchaser-specific order information collected when an order is placed conventionally. The server system could, either automatically or with the customer's assent, enable single-action ordering. In step 301, the server system retrieves the client identifier that was sent by the client system. In step 302, the server system updates the client identifier/customer table to indicate that the generated client identifier has been associated with that customer. In step 303, the server system sets a flag indicating that single-action ordering is enabled for that client identifier and that customer combination. That flag may be stored in the client identifier/customer table. In step 304, the server system supplies a confirming Web page to the client system. The next time a purchaser attempts to order an item, the client system will supply its client identifier to the server system. If single-action ordering is enabled for that purchaser, the server system will assume that the purchaser is the customer associated with that client identifier in the client identifier/customer table. Thus, a purchaser may not want to allow the server system to enable single-action ordering if there is a possibility that someone else may use that same client system.

Figure 4:
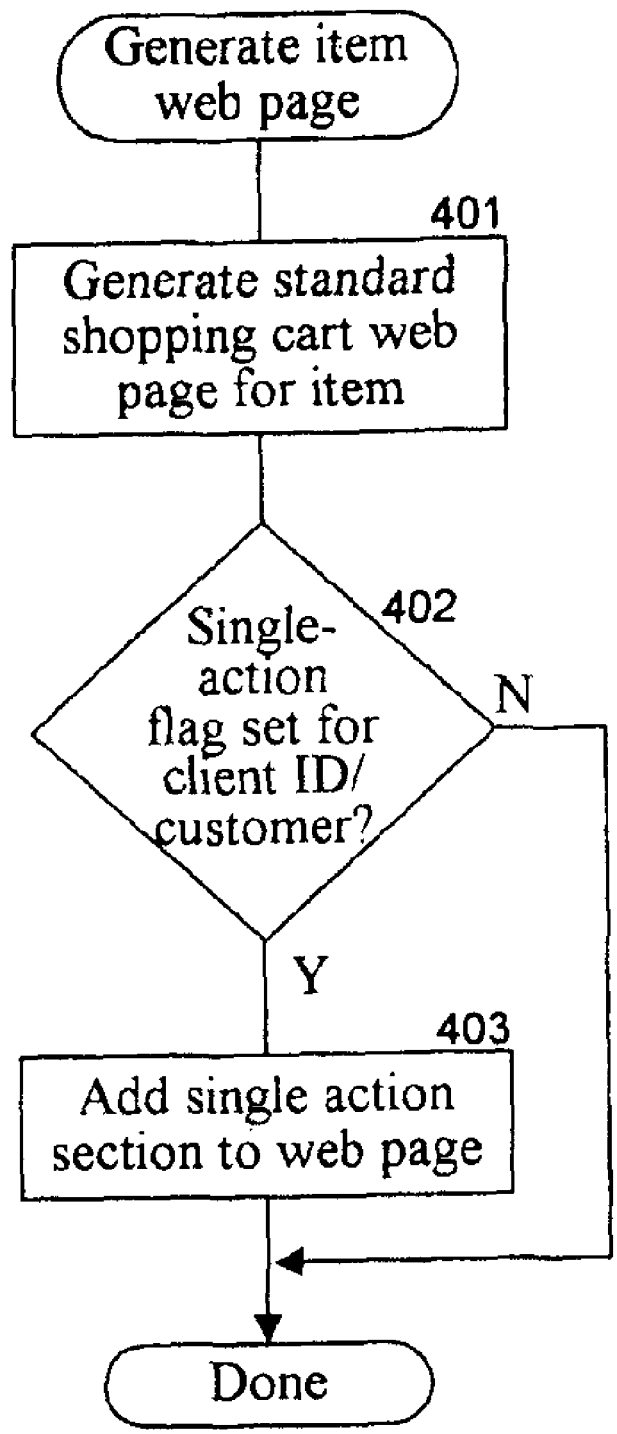
FIG. 4 is a flow diagram of a routine to generate a Web page in which single-action ordering is enabled.

FIG. 4 is a flow diagram of a routine to generate a Web page in which single-action ordering is enabled. When single-action ordering is enabled, the server system generates a Web page describing an item as is conventionally done and then adds a single-action ordering section. In one embodiment, the server system adds partial purchaser-specific order information to the section. This information may include the customer's name, a shipping address moniker selected by the purchaser (e.g., "at home"), and the last five digits of a credit card number or a nickname selected by the purchaser. Such partial information should be the minimum information sufficient to indicate to the purchaser whether or not the server system is using the correct purchaser-specific order information. In step 401, the server system generates a standard shopping cart-type Web page for the item. In step 402, if the single-action ordering flag has been set for the client identifier and customer combination, then the server system continues at step 403, else the server system completes. In step 403, the server system adds the single-action section to the Web page and completes.

Figure 5:
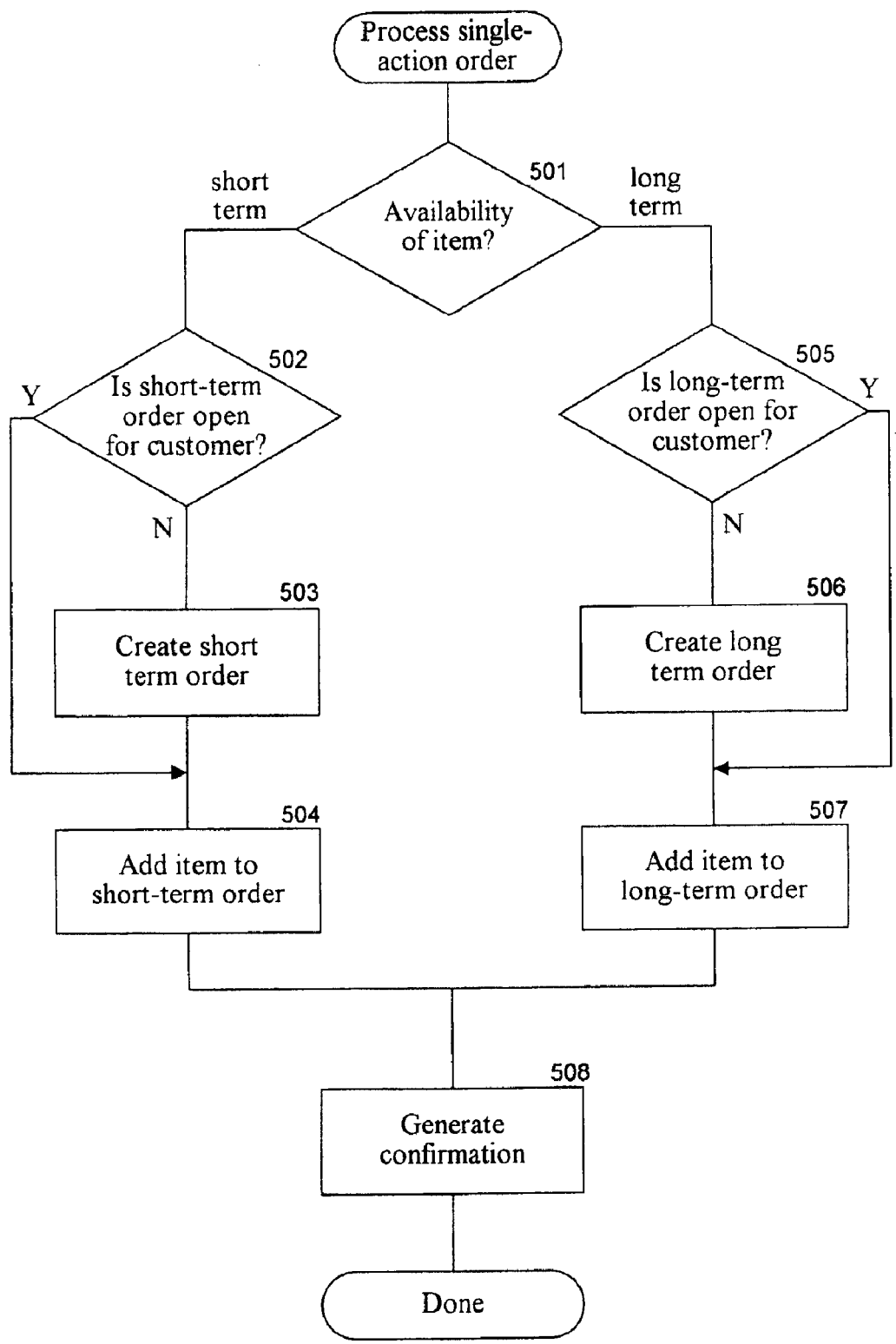
FIG. 5 is a flow diagram of a routine which processes a single-action order.

FIG. 5 is a flow diagram of a routine which processes a single-action order. When a purchaser performs the single action needed to place an order, the client system notifies the server system. The server system then combines the purchaser-specific order information for the customer associated with the client system with the item order information to complete the order. The single-action order may also be combined with other single-action orders and possibly with other conventionally placed orders to reduce shipping costs. In one embodiment, single-action orders can be combined if they are placed within a certain time period of each other (e.g., 90 minutes). This routine illustrates the combining of the single-action orders into a short-term order (e.g., available to be shipped in less than a week) and a long-term order (e.g., available to be shipped in more than a week). One skilled in the art would appreciate that the single-action orders can be combined in various ways based on other factors, such as size of shipment and intermediate-term availability. In step 501, if the item is expected to be shipped in the short term, then the server system continues at step 502, else the server system continues at step 505. In step 502, if a short-term order has already been opened for the purchaser, then the server system continues at step 504, else the server system continues at step 503. In step 503, the server system creates a short-term order for the purchaser. In step 504, the server system adds the item to the short-term order and continues at step 508. In step 505, if a long-term order has already been opened for the purchaser, then the server system continues at step 507, else the server system continues at step 506. In step 506, the server system creates a long-term order for the purchaser. In step 507, the server system adds the item to the long-term order. In step 508, the server system generates and sends the confirmation and completes.

Figure 6:
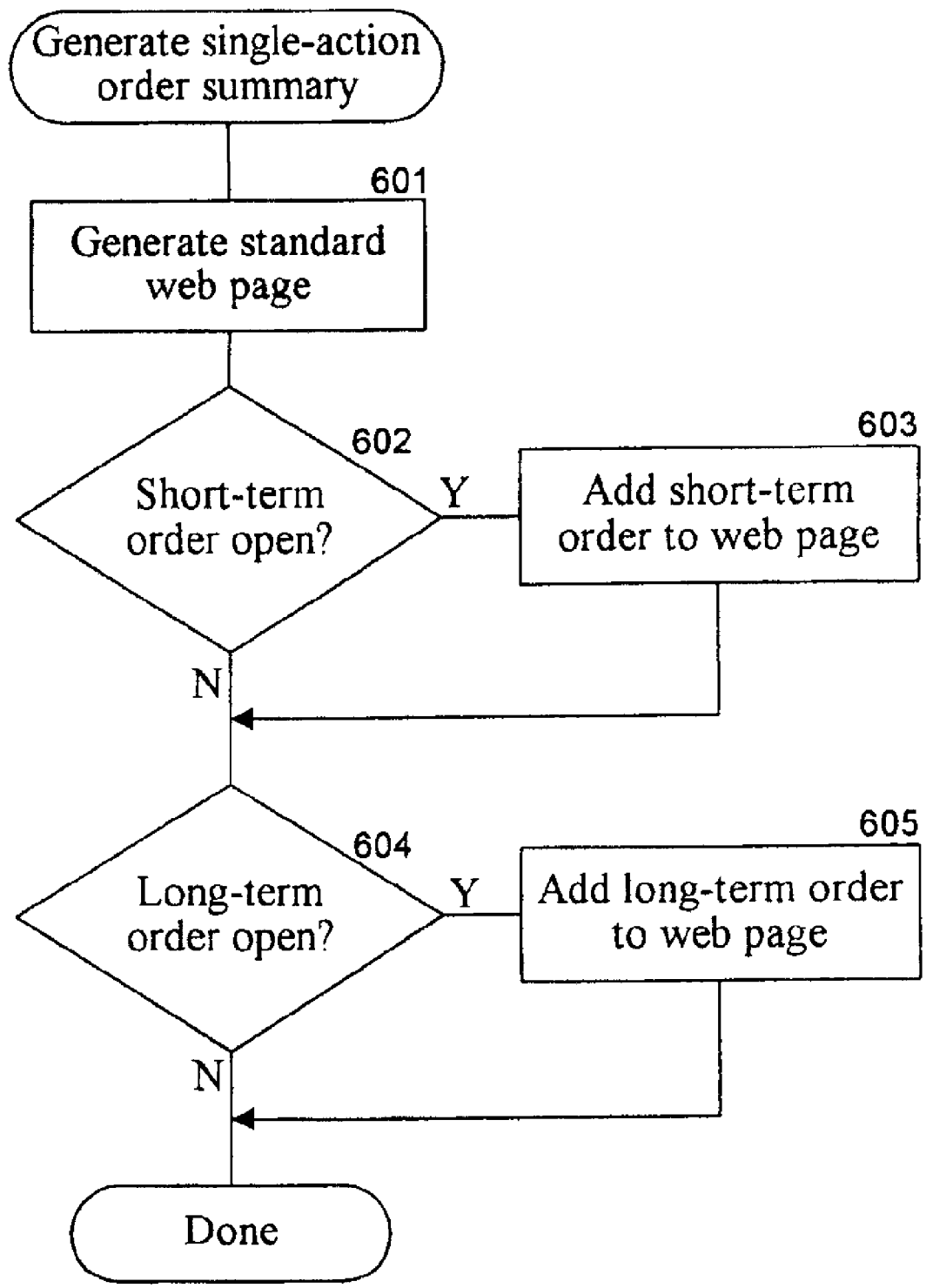
FIG. 6 is a flow diagram of a routine for generating a single-action order summary Web page.

FIG. 6 is a flow diagram of a routine for generating a single-action order summary Web page. This Web page (e.g., FIG. 1C) gives the user the opportunity to view and modify the short-term and long-term single-action orders. In step 601, the server system adds the standard single-action order information to the Web page. In step 602, if a short-term order is open, then the server system adds the short-term order to the Web page in step 603. In step 604, if a long-term order is open, then the server system adds the long-term order information to the Web page in step 605 and completes.

Figure 7:
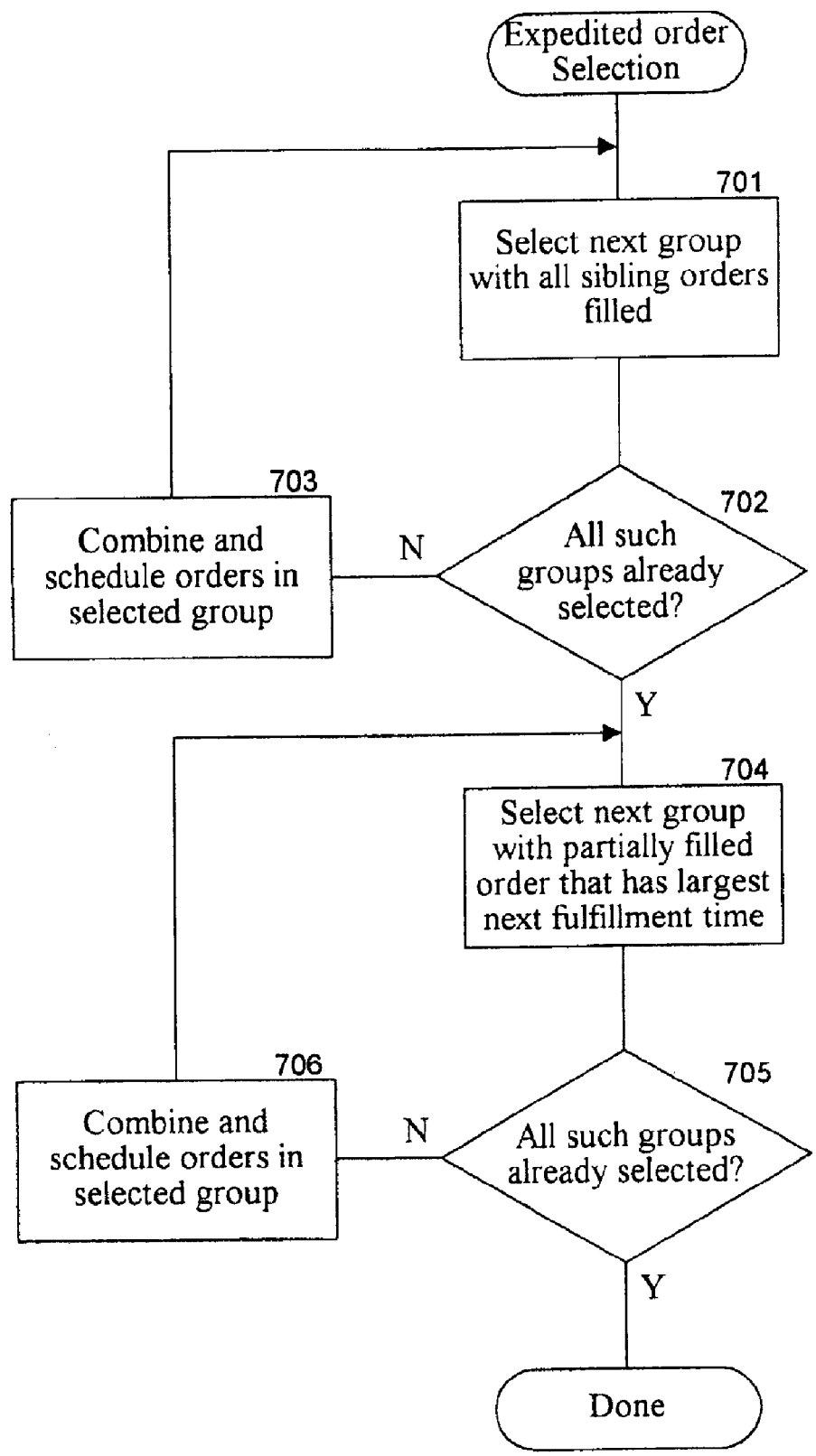
FIG. 7 is a flow diagram of a routine that implements an expedited order selection algorithm.

FIG. 7 is a flow diagram of a routine that implements an expedited order selection algorithm. The goal of the expedited order selection algorithm is to minimize the number of orders sent to each destination so that shipping costs are reduced. A destination may be a specific shipping address plus a specific purchaser's billing details. Orders that are sent to the same destination are known as "sibling orders." The algorithm has two stages. In the first stage, the algorithm schedules for shipment the orders for destinations for which all the sibling orders are filled. An order is filled when all its items are currently in inventory (i.e., available) and can be shipped. For each group of sibling orders, the algorithm combines those sibling orders into a single combined order so that only one order is currently scheduled for shipment to each destination. In the second stage, the algorithm combines and schedules groups of sibling orders for which some of the sibling orders are not filled or partially filled. The algorithm may split each partially filled sibling order into a filled sibling order and a completely unfilled sibling order. The algorithm then combines all the filled sibling orders into a single combined order and schedules the combined order for shipment. If any group has only one sibling order and that order is partially filled, then the algorithm in one embodiment does not split that order to avoid making an extra shipment to that destination.

During the second stage, the algorithm may select and schedule groups of sibling orders in a sequence that is based on the next fulfillment time for an item in the group. The next fulfillment time for a group of sibling orders is the minimum expected fulfillment time of the items in that group of sibling orders. For example, if a group of sibling orders has seven items that are not yet fulfilled and their expected fulfillment times range from 3 days to 14 days, then the next fulfillment time for that group is 3 days. The algorithm first schedules those groups of sibling orders with the largest next fulfillment time. For example, if 6 groups have next fulfillment times of 3, 5, 7, 10, 11, and 14 days, respectively, then the algorithm first selects and schedules the sibling orders in the group with the next fulfillment time of 14 days, followed by the group with the next fulfillment time of 11 days, and so on. By delaying the scheduling of groups with short next fulfillment times, the algorithm increases the chances of additional items becoming available (because of the shortness of the next fulfillment time) and thus combined with the scheduled order.

Steps 701-703 represent the first stage of the expedited order selection algorithm, and steps 704-706 represent the second stage of the expedited selection order algorithm. In steps 701-703, the algorithm loops selecting groups in which all sibling orders are filled and combining the orders. In step 701, the algorithm selects the next group with all sibling orders that are filled. In step 703, if all such groups have already been selected, then the algorithm continues with the second stage in step 704, else the algorithm continues at step 703. In step 703, the algorithm combines and schedules the orders in the selected group and loops to step 701. In step 704, the algorithm selects the next group of sibling orders that has the largest next fulfillment time. In step 705, if all such groups have already been selected, then the algorithm is done, else the algorithm continues at step 706. In step 706, the algorithm combines and schedules the orders in the selected group and loops to step 704. When the expedited order selection algorithm is being performed, new orders and new inventory may be received. Whenever such new orders and new inventory is received, then the algorithm restarts to schedule and combine the new orders as appropriate.

Although the algorithm has been described as having two stages, it could be implemented in an incremental fashion where the assessment of the first and second stages are redone after each order is scheduled. One skilled in the art would recognize that there are other possible combinations of these stages which still express the same essential algorithm.

FIGS. 8A-8C illustrate a hierarchical data entry mechanism in one embodiment. When collecting information from a user, a Web page typically consists of a long series of data entry fields that may not all fit onto the display at the same time. Thus, a user needs to scroll through the Web page to enter the information. When the data entry fields do not fit onto the display at the same time, it is difficult for the user to get an overall understanding of the type and organization of the data to be entered. The hierarchical data entry mechanism allows a user to understand the overall organization of the data to be entered even though the all data entry fields would not fit onto the display at the same time. FIG. 8A illustrates an outline format of a sample form to be filled in. The sample form contains various sections identified by letters A, B, C, and D. When the user selects the start button, then section A expands to include the data entry fields for the customer name and address. FIG. 8B illustrates the expansion of section A. Since only section A has been expanded, the user can view the data entry fields of section A and summary information of the other sections at the same time. The user then enters data in the various data entry fields that are displayed. Upon completion, the user selects either the next or previous buttons. The next button causes section A to be collapsed and section B to be expanded so that financial information may be entered. FIG. 8C illustrates the expansion of section B. If the previous button is selected, then section A would collapse and be displayed as shown in FIG. 8A. This collapsing and expanding is repeated for each section. At any time during the data entry, if an error is detected, then a Web page is generated with the error message in close proximity (e.g., on the line below) to the data entry field that contains the error. This Web page is then displayed by the client system to inform the user of the error. In addition, each of the data "entry" fields may not be editable until the user clicks on the data entry field or selects an edit button associated with the data entry field. In this way, the user is prevented from inadvertently changing the contents of an edit field. When the user clicks on a data entry field, a new Web page is presented to the user that allows for the editing of the data associated with the field. When editing is complete, the edited data is displayed in the data "entry" field. Because the fields of the form are thus not directly editable, neither "named-submit" buttons nor Java are needed. Also, the form is more compact because the various data entry options (e.g., radio button) are displayed only on the new Web page when the field is to be edited.

Although the present invention has been described in terms of various embodiments, it is not intended that the invention be limited to these embodiments. Modification within the spirit of the invention will be apparent to those skilled in the art. For example, the server system can map a client identifier to multiple customers who have recently used the client system. The server system can then allow the user to identify themselves by selecting one of the mappings based preferably on a display of partial purchaser-specific order information. Also, various different single actions can be used to effect the placement of an order. For example, a voice command may be spoken by the purchaser, a key may be depressed by the purchaser, a button on a television remote control device may be depressed by the purchaser, or selection using any pointing device may be effected by the purchaser. Although a single action may be preceded by multiple physical movements of the purchaser (e.g., moving a mouse so that a mouse pointer is over a button), the single action generally refers to a single event received by a client system that indicates to place the order. Finally, the purchaser can be alternately identified by a unique customer identifier that is provided by the customer when the customer initiates access to the server system and sent to the server system with each message. This customer identifier could be also stored persistently on the client system so that the purchaser does not need to re-enter their customer identifier each time access is initiated. The scope of the present invention is defined by the claims that follow.

The invention claimed is:

1. A computer-implemented method in a client system for ordering items, the method comprising:
   receiving, from a server system, by a computer of a client system a client identifier of the client system;
   persistently storing the client identifier at the client system; and
   for each item of a plurality of items:
      providing for display, at the client system, information identifying the item and an indication of a single action that is to be performed to place an order of the identified item, wherein the single action is an only action required by the client system to complete the order of the identified item without requiring the client system to confirm the order following performance of the single action; and
      in response to the single action being performed, sending to the server system a request to order the identified item and the client identifier, the request to order being a single-action order request indicated by the single action and the client identifier identifying account information of a user;
   wherein the sending causes the server system to determine how to combine and to combine into a single order the single-action order request indicated by the single action and one or more previous single-action order requests associated with the client identifier.

2. The method of claim 1 wherein the single order includes single-action order requests placed within a certain time interval of each other.

3. The method of claim 1 wherein the single order includes single-action order requests placed within a time interval of 90 minutes of other single-action orders.

4. The method of claim 1 wherein the single order includes combining single-action order requests based on availability of the items.

5. The method of claim 4 wherein the availability of items is categorized as short-term or long-term, wherein short-term corresponds to orders available to be shipped in less than one week from the request to order and long-term corresponds to orders available to be shipped in more than one week from the request to order.

6. The method of claim 4 wherein the availability is categorized as short-term or long-term, wherein short-term corresponds to orders in inventory and available to be shipped upon sending of the request to order and long-term corresponds to orders not available to be shipped upon sending of the request to order.

7. The method of claim 1 wherein the client system and the server system communicate via the Internet.

8. The method of claim 1 wherein the single action is clicking a mouse button for a cursor positioned over a predefined area of the displayed information.

9. The method of claim 1 wherein providing for display includes providing partial information supplied by the server system corresponding to the identity of the user of the client system.

10. The method of claim 1, wherein providing for display includes providing partial shipping information supplied by the server system.

11. The method of claim 1, wherein providing for display includes providing partial payment information supplied by the server system.

12. The method of claim 1, wherein the single order further comprises one or more additional orders associated with the client identifier of the client system.

13. The method of claim 1, wherein the single order includes sibling single-action order requests corresponding to orders with a common destination.

14. A computer-implemented method in a server system for receiving item orders, the method comprising:
  transmitting, from a server system, to a computer of a client system a client identifier of the client system for persistent storage at the client system;
  for each item of a plurality of items:
    providing for display, at the client system, information identifying the item and an indication of a single action that is to be performed to place an order of the identified item, wherein the single action is an only action required by the client system to complete the order of the identified item without requiring the client system to confirm the order following performance of the single action; and
    receiving, in response to the single action being performed at the client system, a request to order the identified item and the client identifier, the request to order being a single-action order request indicated by the single action and the client identifier identifying account information of a user; and
  determining how to combine and combining, at the server system, into a single order the single action order request indicated by the single action and one or more previous single-action order requests associated with the client identifier in response to receiving the single-action order request.

15. The method of claim 14, wherein the combining into the single order includes combining single-action order requests received at the server system within a certain time interval of each other.

16. The method of claim 14 wherein the combining into the single order includes combining single-action order requests received at the server system within a time interval of 90 minutes of each other.

17. The method of claim 14, wherein the combining into the single order includes combining single-action order requests based on availability of the items.

18. The method of claim 17, wherein the availability of items is categorized as short-term or long-term, wherein short-term corresponds to orders available to be shipped in less than one week from the request to order and long-term corresponds to orders available to be shipped in more than one week from the request to order.

19. The method of claim 17, wherein the availability is categorized as short-term, or long-term, wherein short-term corresponds to orders in inventory and available to be shipped upon sending of the request to order and long-term corresponds to orders not available to be shipped upon sending of the request to order.

20. The method of claim 14, wherein the client system and the server system communicate via the Internet.

21. The method of claim 14, wherein the single action is receiving a notification of a performance corresponding to clicking a mouse button for a cursor positioned over a predefined area of the displayed information.

22. The method of claim 14, wherein the single order further comprises one or more additional orders associated with the client identifier of the client system.

23. The method of claim 14, wherein the single order combines sibling single-action order requests corresponding to orders with a common destination.

24. The method of claim 14, wherein the combining into the single order further comprises:
  combining at a first stage those of the single-action order request indicated by the single action and the one or more previous single-action order requests in which all items are available for shipping into one or more groups of sibling orders for delivery to a common destination; and
  combining at a second stage those of the single-action order request indicated by the single action and the one or more previous single-action order requests in which not all items are available for shipping into one or more groups of sibling orders for later delivery.

25. The method of claim 1, wherein, following performance of the single action, the user is provided a limited period of time during which he can still perform a second action to cancel the order.

26. The method of claim 14, wherein the server system does not transmit over the internet any sensitive information of the user or the client system.

27. The method of claim 1, wherein the client system receives a confirmation that confirms that the order has been placed via the single-action order request and provides an opportunity for the user to review and change the order that was placed.

28. The method of claim 1, wherein an additional action is required only if the user wants to change or cancel the order that was placed.

* * * * *